(12) United States Patent
Punwani et al.

(10) Patent No.: US 12,047,708 B2
(45) Date of Patent: *Jul. 23, 2024

(54) SYSTEMS AND METHODS FOR TRIGGERING LIVESTREAM COMMUNICATIONS BETWEEN USERS BASED ON MOTIONS OF AVATARS WITHIN VIRTUAL ENVIRONMENTS THAT CORRESPOND TO USERS

(71) Applicant: Sophya Inc., Allston, MA (US)

(72) Inventors: Vishal Vijay Punwani, Victoria (CA); Emma Kathryn Giles, Boston, MA (US); Morgan Bruce DeWitt Talbot, Spokane, WA (US); Mark Liu, Cambridge, MA (US); Ayse Baybars, Pittsburgh, PA (US); Vinay Punwani, Cambridge, MA (US)

(73) Assignee: SOPHYA INC., Allson, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,932

(22) Filed: Feb. 3, 2023

(65) Prior Publication Data

US 2023/0188677 A1 Jun. 15, 2023

Related U.S. Application Data

(63) Continuation of application No. 17/505,375, filed on Oct. 19, 2021, now Pat. No. 11,589,008.
(Continued)

(51) Int. Cl.
*H04N 7/15* (2006.01)
*G06F 3/0484* (2022.01)
(Continued)

(52) U.S. Cl.
CPC .......... *H04N 7/157* (2013.01); *G06F 3/0484* (2013.01); *G06T 11/00* (2013.01); *G06T 13/80* (2013.01);
(Continued)

(58) Field of Classification Search
CPC .......... H04N 7/157; H04N 7/15; H04N 7/147
(Continued)

(56) References Cited

U.S. PATENT DOCUMENTS 5,736,982 A 4/1998 Suzuki
6,772,195 B1 8/2004 Hatlelid
(Continued)

FOREIGN PATENT DOCUMENTS

WO WO-2014199024 A1 * 12/2014 ............. G06Q 10/10

OTHER PUBLICATIONS

International Search Report issued by the Patent Cooperation Treaty dated Jan. 26, 2022. (2 pages).
(Continued)

*Primary Examiner* — Quoc D Tran
(74) *Attorney, Agent, or Firm* — Perkins Coie LLP

(57) ABSTRACT

Methods and systems described herein facilitate virtual interactions between users that more closely resemble their in-person counterparts. In particular, the methods and systems simulate in-person interactions in virtual environments through the use of complex spatial algorithms. For example, in some embodiments, the methods and systems provide avatar-based video conferencing systems in which avatars are connected by video/voice chat to any avatar based on one or more criteria.

18 Claims, 21 Drawing Sheets

Related U.S. Application Data

(60) Provisional application No. 63/093,769, filed on Oct. 19, 2020.

(51) Int. Cl.
*G06T 11/00* (2006.01)
*G06T 13/80* (2011.01)
*H04L 12/18* (2006.01)
*H04L 65/1069* (2022.01)
*H04L 65/403* (2022.01)

(52) U.S. Cl.
CPC ...... *H04L 12/1822* (2013.01); *H04L 65/1069* (2013.01); *H04L 65/403* (2013.01); *H04N 7/152* (2013.01)

(58) Field of Classification Search
USPC ............................................ 348/14.01–14.16
See application file for complete search history.

(56) References Cited

U.S. PATENT DOCUMENTS

| | | |
|---|---|---|
| 7,840,668 B1 | 11/2010 | Sylvain et al. |
| 8,671,346 B2 | 3/2014 | Hua et al. |
| 9,517,418 B2 | 12/2016 | Alkov |
| 10,319,410 B1 | 6/2019 | Townsend et al. |
| 10,963,648 B1 | 3/2021 | Bill |
| 11,010,129 B1 | 5/2021 | Rakshit |
| 2003/0137546 A1 | 7/2003 | Suh |
| 2006/0075055 A1* | 4/2006 | Littlefield ............... H04L 51/04 |
| | | 715/753 |
| 2007/0156664 A1 | 7/2007 | Norton et al. |
| 2010/0115426 A1 | 5/2010 | Liu |
| 2012/0131478 A1* | 5/2012 | Maor ...................... G06T 19/20 |
| | | 715/757 |
| 2012/0254858 A1 | 10/2012 | Moyers et al. |
| 2012/0324051 A1 | 12/2012 | Bhogal et al. |
| 2013/0132837 A1 | 5/2013 | Mead et al. |
| 2013/0190016 A1 | 7/2013 | Krishnakumar et al. |
| 2017/0195266 A1 | 7/2017 | Moyers |
| 2018/0124317 A1 | 5/2018 | Liu et al. |
| 2019/0095931 A1 | 3/2019 | Allen et al. |
| 2020/0128106 A1 | 4/2020 | McCormack |
| 2020/0388205 A1 | 12/2020 | Bae et al. |
| 2020/0394829 A1 | 12/2020 | Lee |
| 2021/0352244 A1* | 11/2021 | Benedetto ................ H04N 7/15 |
| 2021/0377062 A1 | 12/2021 | Stevens |
| 2022/0109810 A1* | 4/2022 | Kancharlawar ........ H04N 7/157 |
| 2022/0124285 A1 | 4/2022 | Punwani |

OTHER PUBLICATIONS

Notice of Allowance on related U.S. Appl. No. 18/357,444, dated Apr. 24, 2024.

\* cited by examiner

SYSTEMS AND METHODS FOR TRIGGERING LIVESTREAM COMMUNICATIONS BETWEEN USERS BASED ON MOTIONS OF AVATARS WITHIN VIRTUAL ENVIRONMENTS THAT CORRESPOND TO USERS

CROSS-REFERENCE TO RELATED APPLICATIONS

This application is a Continuation of U.S. patent application Ser. No. 17/505,375, filed Oct. 19, 2021, which claims the benefit of priority of U.S. Provisional Patent Application No. 63/093,769, filed on Oct. 19, 2020. The content of the foregoing application is incorporated herein in its entirety by reference.

BACKGROUND

Video conferencing systems capable of hosting conversations among numerous remote participants have become increasingly prevalent in recent years. Similarly, there has been an increase in the number and type of virtual environments that allow users to interact with one another through virtual avatars. Despite the increases in processing speed and graphical capabilities, these video conferencing systems and virtual environments, and the interactions of users within them, still fail to appropriately simulate in-person interactions.

SUMMARY

In view of this problem, methods and systems are described herein for simulating in-person interactions in virtual environments. In particular, the methods and systems described herein facilitate interactions between users that more closely resemble their in-person counterparts. For example, video conferencing systems and virtual environments struggle to intuitively facilitate the frequent and fluid initiation, joining, and leaving of small-group conversations that characterize in-person social interactions in a variety of contexts. As an example, while these systems allow synchronous conversations with multiple participants, they feature inherently socially unintuitive mechanisms for joining and leaving conversations as part of an overall video conference.

For example, a user of a conventional video conferencing system typically joins a conversation at a prearranged time, and may initially lack important contextual information about the participants present and the topic and tone of conversation—information that would, in a physical context, frequently be gained at a distance upon physical approach through visual (e.g., persons present, body language, facial expressions) and auditory (e.g., overheard conversation snippets, emotive sounds such as laughter) cues. Leaving a conversation in a conventional video conferencing system is typically instantaneous, which can be jarring if it occurs unexpectedly—perhaps more so than someone simply walking away from a physical conversation. As another example, conventional video conferencing systems rely on mosaic displays of multiple users all talking on a single audio channel. This format makes individual conversations difficult. While some conventional video conferencing systems also have features enabling splitting a conversation into two or more smaller conversations, these mechanics suffer from the same awkwardness and rigidity as joining and leaving an overall video conferencing session, with the addition of interruptions to the on-going session as users announce their arrival and exit.

One approach to overcoming awkwardness and rigidity is to merge conventional video conferencing systems with virtual environments that allow users to interact with one another through virtual avatars. In such cases, a user has an avatar that moves about a virtual environment and initiates video conferencing sessions with users of other avatars based on the respective avatars being within a certain proximity to each other. However, these systems suffer from a lack of intuitiveness and consistency when initiating, joining, or leaving conversations involving multiple users.

Moreover, the use of a proximity-based solution raises several novel technical problems. First, the proximities that trigger an interaction in a proximity-based system may be difficult to determine (e.g., leading to users struggling to cram their avatars together) or may overlap with proximities for other interactions (e.g., leading to confusion about which interaction a user is joining or leaving). For example, a first user might be within the proximity of a second user (e.g., triggering an interaction between the first user and the second user), who in turn is in the proximity of a third user (e.g., triggering an interaction between the third user and the second user), but the first user and the third user are not within each other's proximities and, therefore, are not added to an interaction. This creates a confusing conversation environment in which users may not have the same perception of who is in a given conversation. Second, conversations may be inadvertently disconnected when an avatar moves slightly outside the proximity radius, especially when two or more participants attempt to move their avatars about the virtual world together. While one solution to such a problem may be to freeze the state or place of the avatars that are parties to an interaction, this solution reintroduces the rigidity discussed above.

To overcome these technical problems, a system may implement permanently displayed webcam feeds from all avatars, with the webcam feed positioned above or near the avatar itself. Alternatively, a system may use spatial sound technology to make audio feeds from avatars spread across a large area of the virtual environment audible to everyone, with attenuation depending on distance and other factors such as avatar orientation. However, these solutions introduce additional drawbacks. For example, these solutions still suffer from ambiguity regarding who is in a conversation with whom at what time (e.g., there is often no clear delineation regarding who is in a specific conversation and who is not, who might be eavesdropping with an avatar nearby, etc.), and conversations involving many users may suffer from position-dependent attenuated audio leading to an inconsistent experience and some users being difficult to hear. Thus, there is a clear benefit to an avatar-based system in which avatars are either connected to each other or not, with limited or no audio or video shared outside this explicit connection structure, but in which joining and leaving conversations is fluid, intuitive, unambiguous, and inclusive of the same set of participants from the perspective of each user.

Accordingly, in order to overcome the aforementioned problems, and without the drawbacks mentioned above, the methods and system describe herein simulate in-person interactions in virtual environments through the use of complex spatial algorithms. For example, in some embodiments, the methods and systems provide avatar-based video conferencing systems in which avatars are connected by video/voice chat to another avatar based on one or more criteria such as the proximity of the avatars to each other within the virtual environment.

For example, one criterion may be related to the satisfaction of a "chaining" algorithm, which connects a first user to a second user whose avatar is within a set radius of the first user's avatar (or otherwise connected based on avatar orientation, explicit video chat request, or some other method) and also to all other users who are connected to the second user. This algorithm may enable a large number of participants, whose avatars are not all within a predetermined proximity, to be connected to and converse with all of the other participants, eliminating the problem of incompletely overlapping conversations described above. Another criterion may be based on the system generating a "join area" and detecting an avatar entering that area. For example, when a new avatar enters the join area of a conversation, the avatar is connected to all avatars in that conversation rather than only those in close proximity. The system may further refine the join area by making its location based on the positions of the avatars currently in conversation with each other.

Furthermore, in order to alleviate inadvertent or unwanted connections on smaller screens (e.g., on a mobile device) and in denser virtual environments, the system may trigger communications based on the motion of avatars. For example, the system may monitor the motion of an avatar and only allow new connection while avatars are not in motion. Thus, inadvertent or unwanted connections based on avatars passing through an area without any intention of stopping are avoided.

In some aspects, systems and methods for triggering livestream communications between users based on motions of avatars within first virtual environment that correspond to the users are described. For example, the system may generate for simultaneous display a first virtual environment on a first user interface and a second user interface, wherein the first user interface corresponds to a first user, wherein the second user interface corresponds to a second user, and wherein the first user is located remotely from the second user. The system may generate for display a first avatar in the first virtual environment, wherein the first avatar corresponds to the first user. The system may generate for display a second avatar in the first virtual environment, wherein the second avatar corresponds to the second user. The system may determine, for the first avatar, a first velocity in the first virtual environment. The system may determine, for the second avatar, a second velocity in the first virtual environment. The system may determine one or more join areas based on the first velocity or the second velocity. The system may compare the one or more join areas to one or more conversation initiation criteria to determine whether to initiate a conversation between the first user and the second user. The system may, in response to determining to initiate the conversation between the first user and the second user, initiate the conversation between the first user and the second user, wherein the conversation comprises a livestream communication between the first user and the second user.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, the methods and systems relate to virtual environments for simulating in-person interactions between users through the use of avatars. It should be noted that, as described herein, embodiments describing users and avatars may be used interchangeably. That is, a user may interact with another user based on a respective avatar interacting with another respective avatar in the virtual environment. As referred to herein, a virtual environment may comprise a virtual rendering in which avatars may interact. The virtual environment may include two-dimensional and three-dimensional assets as well as virtual reality and/or other media content. The virtual environment may be accessed through a user device such as a computer, mobile device, or wearable electronic device. Furthermore, the system may receive inputs from a user that causes an avatar corresponding to the user to navigate and/or interact with the virtual environment and/or other avatars in the virtual environment. For example, in some embodiments, the system may generate for simultaneous (or substantially simultaneous) display a virtual environment on a first user interface and a second user interface. The first user interface may correspond to a first user and the second user interface may correspond to a second user who is located remotely (e.g., over a computer network) from each other.

Figure 1A:
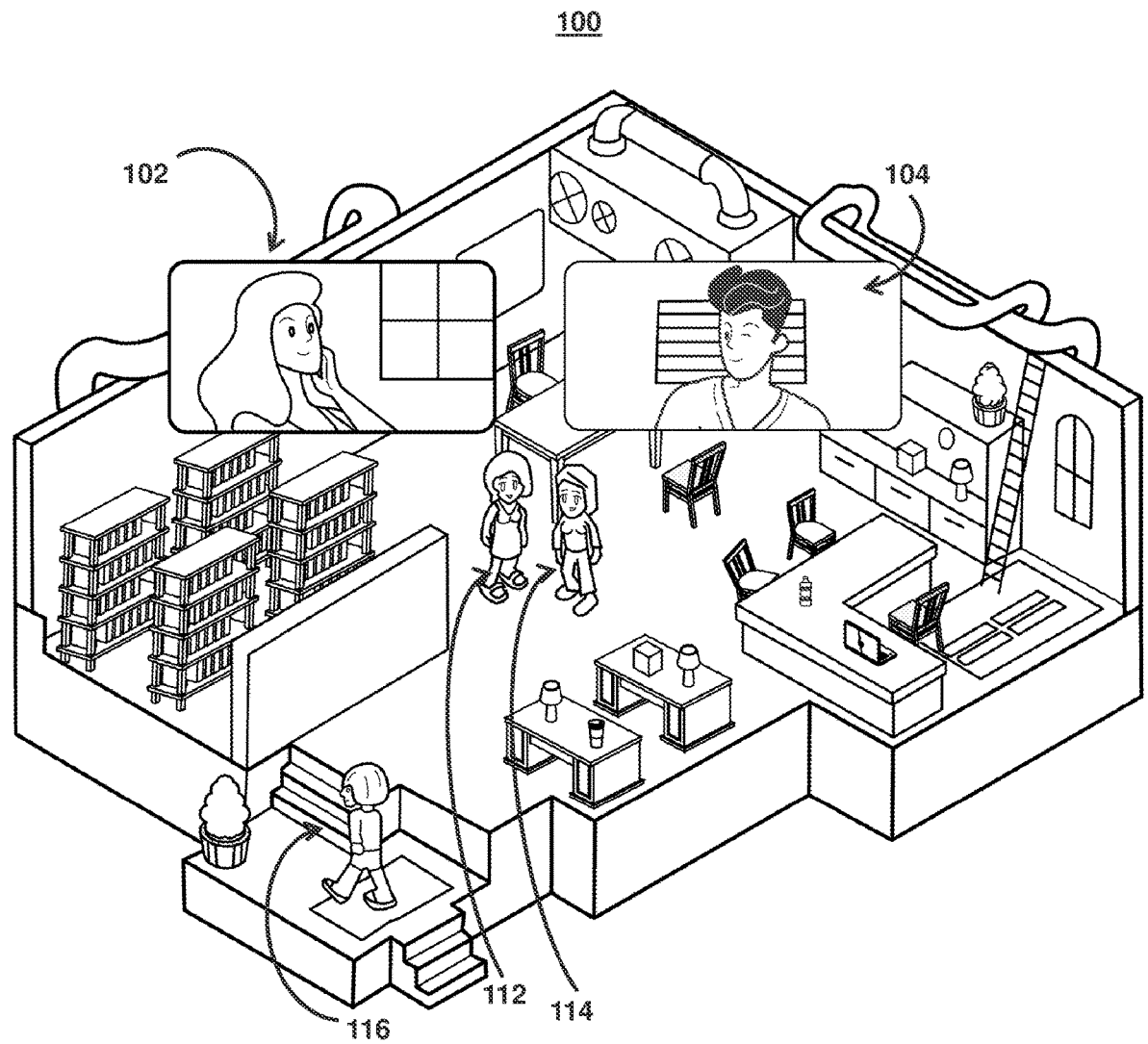
FIGS. 1A-C show an illustrative virtual environment for simulating in-person interactions, in accordance with one or more embodiments.
Figure 1B:
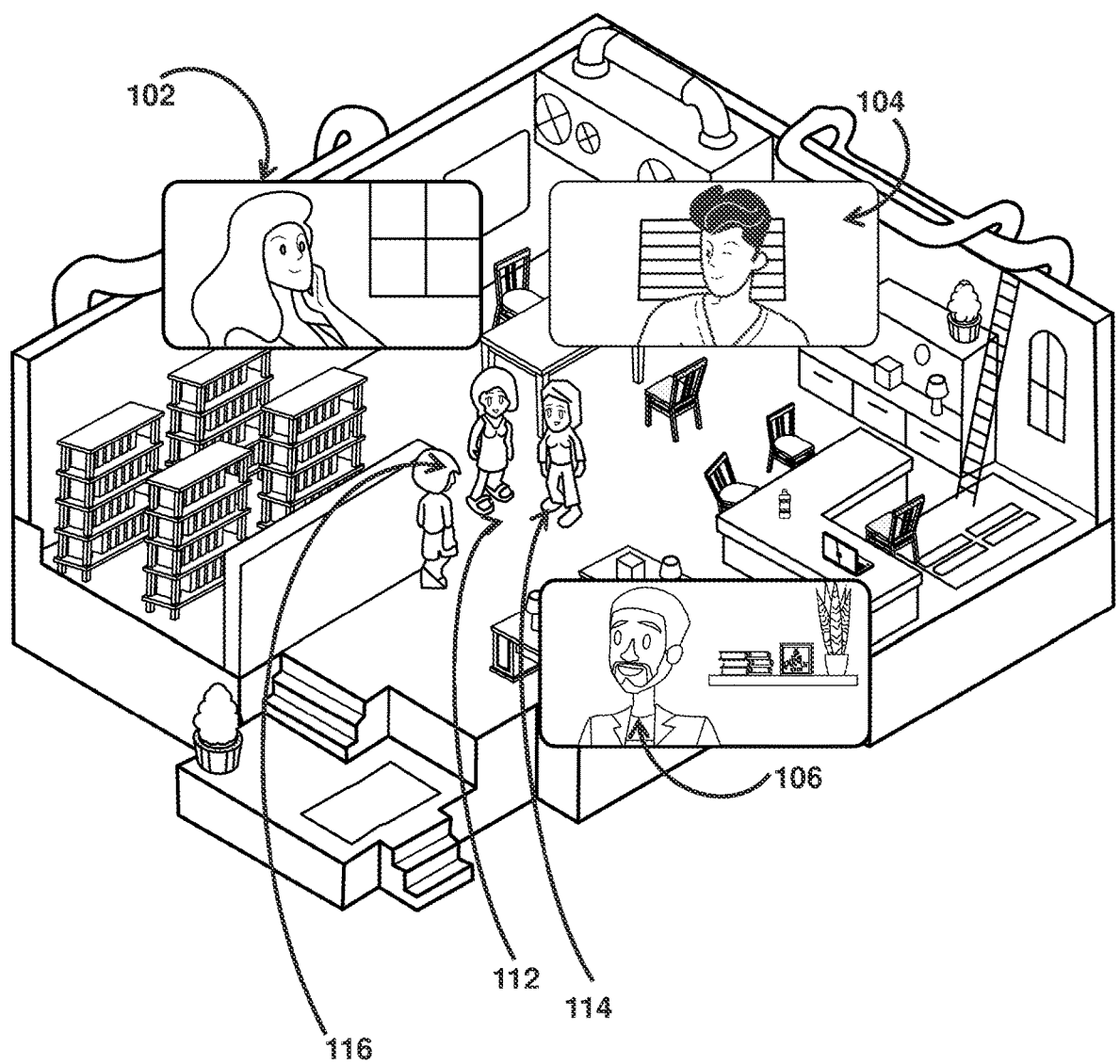
Figure 1C:
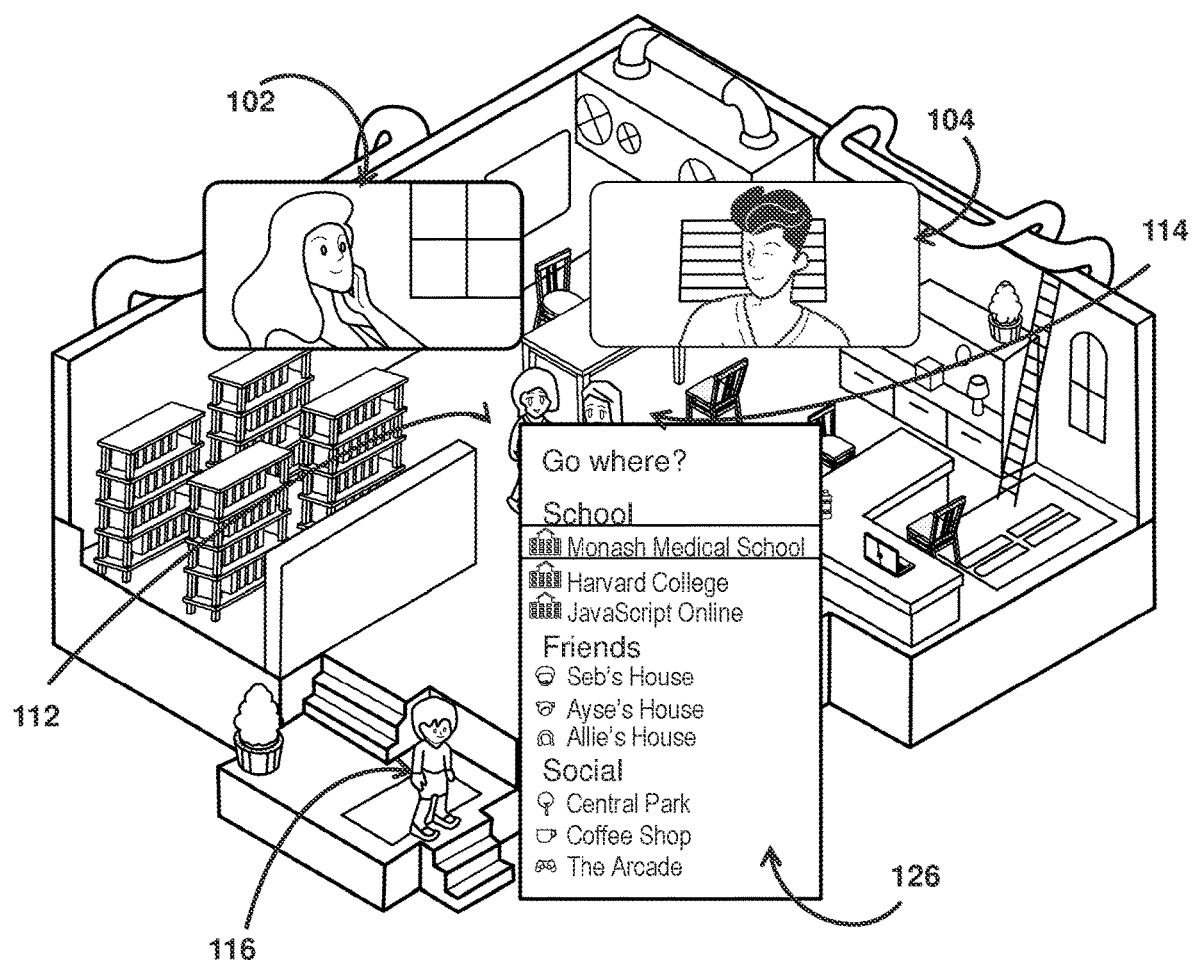

FIGS. 1A-C show an illustrative virtual environment for simulating in-person interactions, in accordance with one or more embodiments. For example, FIG. 1A may show virtual environment 100 in a user interface. As referred to herein, a user interface may comprise a mechanism for enabling a user to view, navigate, and/or interact with content. The user interface may receive user inputs (e.g., via a remote control, mouse, trackball, keypad, keyboard, touch screen, touch pad, stylus input, joystick, voice recognition interface, or other user inputs) and/or may present content in return. In some embodiments, a user interface may be incorporated into a device; while in other embodiments, a user interface may be accessible by a device (e.g., a user interface generated by a software application).

A virtual environment may include a networked application that allows a user to interact with both the computing environment and the work of other users. For example, virtual environment 100 may comprise a networked common operating space. Furthermore, virtual environment 100 may allow one user to communicate (e.g., via video conferencing, email, chat, and/or web-based document sharing applications) with one or more users. In some embodiments, virtual environment 100 may comprise an immersive virtual environment such that it creates a psychological state in which the individual perceives himself or herself as existing within virtual environment 100. This immersion may be provided through the ability of a user to interact, through a virtual avatar, with the virtual avatars of other users.

Additionally or alternatively, virtual environment 100 may create an immersion through a thematic background and access to related applications and/or third parties (e.g., shopping applications for third-party providers, etc.). In some embodiments, the virtual embodiment may comprise a component virtual environment that comprises a plurality of component virtual environments. Each component virtual environment may comprise one or more rules for communications between users (e.g., environment rules). Furthermore, the system may allow users to enter and/or exit each of the component virtual environments to enter and/or exit another virtual environment. Upon entering a new virtual environment, the user may be subject to new environment rules. For example, the component virtual environments may not be mutually accessible by translational avatar movement alone (e.g., moving an avatar around one of the component virtual environments). Instead, to transition from one virtual environment to another, the system may provide special commands or transition points (e.g., join/exit locations) around a component virtual environment. By navigating through a transition point, the avatar may move to a different component virtual environment. This component virtual environment may include a hub environment that connects one or more other component virtual environments. Alternatively or additionally, the system may provide instantaneous "teleportation" or some other special mode of transport (e.g., via a user selection of a menu option or a user input of a special command). In some embodiments, the system may allow other users to call or pull avatars into a single component virtual environment (e.g., based on special commands, user inputs, and/or a required access level).

In some embodiments, a user may be able to initiate, via the system, communications with users in one or more virtual environments (e.g., one or more of a plurality of component virtual environments) to share content. In some embodiments, the system may require a user input and/or specific user access in order to initiate a communication between users across a plurality of virtual environments. For example, the system may normally restrict communications between users to users that are in the same virtual environment. However, in some situations, the system may allow one or more users to initiate a multi-way conversation or one-way broadcast that includes avatars in multiple separate virtual environments simultaneously. The broadcast may be a video/voice/text feed from a single user or multiple users at once, and the system may include screen sharing from one or more of them.

As described herein, the system may generate content (e.g., a virtual environment) and may also allow users to share content. As referred to herein, the term "content" should be understood to mean an electronically consumable content or content that may be transmitted through an electronic format. For example, content may include audio, video, textual, and/or graphical content. Furthermore, the content may include user generated content, non-user generated content such as that received from a third-party source (including television programming, on-demand programs, internet content (e.g., streaming content, downloadable content, webcasts, etc.), video clips, screen sharing, interactive presentations, spreadsheets, audio, content information and/or metadata, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user devices, but can also be part of a live performance.

For example, the system may allow a user to initiate a conversation that includes all avatars, or a subset of avatars (e.g., based on a filtering criterion and/or user selection), that are present in separate virtual environments. Alternatively or additionally, in another embodiment, the system may provide a broadcast of a user's (or a group of users') video/voice/text feed such that the feed is visible to all users, or a subset of users, present in multiple separate virtual environments without initiating a multi-way conversation.

For example, it may be desirable to have multiple virtual environments that represent different environments but that are associated with one another (e.g., based on common characteristics of the virtual environment, avatars that frequent the virtual environments, and user credentials of users corresponding to avatars in a virtual environment). For example, one virtual environment may comprise a virtual workplace, while another virtual environment may include a virtual office space and/or a completely separate virtual technology lab. In such cases, the system may enable webcam, microphone, and/or chat broadcasts from one or more individual users to users with avatars spread across multiple virtual environments.

As referred to herein, environment rules may refer to one or more rules corresponding to a given virtual environment that indicate how users and/or avatars may interact in the virtual environment. For example, an environment rule may indicate how a user enters/exits a virtual environment (e.g., an environment transition rule). An environment rule may indicate how a user communicates with another user (or how an avatar communicates with another avatar in a virtual environment) (e.g., an environment communication rule). The environment communication rule may indicate how a user enters/leaves a communication and/or one or more dynamics of the conversation (e.g., what platform is used for the conversation, what types of conversations are allowed, what formats for conversations are used, etc.). An environment rule may indicate how an avatar moves and/or what route an avatar takes in the virtual environment (e.g., an environment movement rule). In another example, an environment rule may define the boundaries of the virtual environment and/or limitations on movements within the boundaries. That is, the environment rule may provide a grid map of the virtual environment, in which the grid map indicates cell properties (e.g., what actions may take place, etc.) for each grid portion of the virtual environment. For example, an environment rule (e.g., based on the grid map) may indicate the presence of a wall or table (e.g., a virtual table in the virtual environment). Despite both objects sharing an environment rule indicating that an avatar may not pass through the wall or table, the objects may have different environment rules corresponding to whether a join area may include or pass through the object. For example, while the system may determine that a join area extends through or is enhanced to encompass the table, the system may determine that a join area does not extend beyond or encompass a wall. As such, the system simulates a real-world environment in which users at a table may communicate, but users on opposite sides of a wall may not.

Virtual environment 100 may also include one or more virtual avatars (e.g., avatar 112). As referred to herein, an avatar may include a graphical representation of a user or the user's character or persona. For example, the virtual avatar may be a navigable virtual avatar. As referred to herein, a navigable virtual avatar may comprise a graphical representation that navigates a virtual environment in response to user inputs. In some embodiments, the avatar may include characteristics to distinguish one avatar from another (e.g., unique clothes, items, graphical stylings, etc.). For example, these characteristics may be selected by a user or may be selected automatically by the system. In some embodiments, the system may select these characteristics based on actions and/or events occurring in the virtual environment. For example, the system may alter the appearance of an avatar based on actions of the avatar (e.g., attending a designated event in the virtual environment) or user (e.g., currently interacting with another user or joining a conversation with another user). In some embodiments, the system may further provide visual, textual, graphical, and/or audio cues to indicate different scenarios as the avatar navigates the virtual environment (e.g., indicating that an avatar is within a specific join distance from another avatar).

In FIG. 1, avatar 112 is shown as a three-dimensional form; however, in some embodiments, avatars may appear as two-dimensional representations. In some embodiments, the system may receive user inputs allowing a user to navigate an avatar around virtual environment 100 in order to join or leave a group/conversation currently shown in virtual environment 100. For example, the virtual environment may provide a graphical representation that allows avatars to navigate towards or away from other avatars in order to initiate a conversation. For example, as the avatars traverse virtual environment 100, the system may determine one or more join areas for each avatar.

As referred to herein, a "join area" comprises an area within a virtual environment that enables (or triggers) a user to connect with another user. For example, the system may determine, for a first avatar, a first position in the first virtual environment. The position (and/or join area) may be defined in terms of a cell or cells in a grid map of the virtual environment or may be defined in another quantitative or qualitative measurement (e.g., Cartesian coordinates). The position (and/or join area) may be absolute (e.g., corresponding to a fixed number of cells or pixels on a screen), but may also be relative (e.g., corresponding to a position of the grid or a portion of the pixels). The system may also determine, for the second avatar, a second position in the first virtual environment. The system may then determine one or more join areas based on the first position or the second position. For example, the system may determine a first join area for the first user and determine whether the second user is within that join area. Alternatively or additionally, the system may determine a first and second join area for the first and second users, respectively, and determine whether (or by how much) the areas overlap. The system may then compare the one or more join areas to one or more conversation initiation criteria to determine whether to initiate a conversation between the first user and the second user. As further described below, the conversation initiation criteria may include a distance between the first and second avatar, whether respective join areas of the avatars overlap, and/or other criteria based on the users (e.g., user profile information), environment (e.g., environment rules), current circumstances (e.g., whether a user is already connected in another conversation), etc.

For example, as shown in FIG. 1, virtual environment 100 currently includes three users. Each user is represented in virtual environment 100 by their respective avatar (e.g., avatars 112, 114, and 116). As shown in FIG. 1, avatars 112 and 114 are currently engaged in a conversation and/or are part of a group. Accordingly, video mosaics 102 and 104 are shown. Video mosaic 102 (corresponding to avatar 112) and video mosaic 104 (corresponding to avatar 114) are currently displayed. These may be video conferencing display windows that allow users to communicate in an audio/video manner. Additionally, the audio/video manner may represent a video of a user and, thus, contrast with the graphical style of virtual environment 100. Users may communicate with each other by exchanging communications with each other and/or between respective avatars. These communications may include establishing conversations.

As referred to herein, a "conversation" may include a group of users/avatars who are connected to each other to exchange communications (e.g., video/voice/text/audio communications via a peer-to-peer livestream between two or more users). For example, a conversation may comprise a peer-to-peer livestream communication between the first user and the second user (which may be facilitated by a platform providing the virtual environments). When connected during a conversation, the one or more users that are part of the conversation establish a session in which communications may be exchanged. These communications may be exchanged such that other users within the virtual environment are fully excluded from the communications. That is, the system may ensure that audio, video, textual, or other content may be consumed only by users who are parties to the conversation. Furthermore, the system may present these communications within the user interface presenting the virtual environment and/or may tag the location of the presentation to a position of an avatar in the virtual environment.

Alternatively or additionally, these communications may be exchanged such that other users within the virtual environment are partially excluded from the communications. That is, the system may ensure that audio, video, textual, or other content may be consumed by users that are not parties to the conversation, but the content consumed by users that are not parties to the conversation occurs with different characteristics than it does for users that are parties to the session.

As referred to herein, a "conversation characteristic" of a communication may comprise any qualitative or quantitative metric that distinguishes one communication from another. The conversation characteristic may indicate a quality of the content. For example, users that are not parties to the conversation may hear audio for the conversation at a lower volume or quality. Alternatively, audio may be presented in a different format (e.g., users that are not parties to the session may only see graphics indicating that audio communications are being exchanged, and the users that are not parties to the conversation may not be able to hear or access the audio content itself).

Additionally or alternatively, the conversation characteristic may indicate a format in which a user engages (or is restricted from engaging) in a conversation. For example, the conversation characteristics may comprise the rights attributed to users to exchange in the communications. For example, users that are not parties to the conversation may be able only to receive audio for the conversation and may not be able to transmit audio for the conversation (e.g., simulating the users being able to overhear or eavesdrop on conversations, but not interrupt). Alternatively, users that are not parties to the conversation may only see icons, graphics, or emojis as opposed to receiving audio communications.

A conversation characteristic may also include a conversation position (e.g., a point in the virtual environment corresponding to the conversation). For example, the conversation position may represent position in a virtual environment, for which navigating an avatar to, may cause a user to join a conversation. In some embodiments, the conversation position may correspond to an object (e.g., a table) in a virtual environment. In some embodiments, the conversation position may correspond to a median, mean, or center point of a conversation join area. Alternatively or additionally, the conversation position may comprise a set of coordinates or dimensions that correspond to the conversation join area (e.g., an area in a virtual environment, for which navigating an avatar to, may cause a user to join a conversation).

For example, in FIG. 1A, avatars 112 and 114 may be in a conversation. This is contrasted with avatar 116, who is not in the conversation with avatars 112 and 114. It should be noted that FIG. 1A may represent a user interface as seen by a user corresponding to avatars 112 or 114. For example, because avatar 112s and 114 are currently in a conversation, their respective video mosaics (e.g., 102 and 104) are displayed. In some embodiments, these video mosaics are not viewable by users not in the conversation. For example, avatars 112 and 114 (and/or their respective users) may be considered "connected." As referred to herein, connected users include users and/or avatars that are part of a conversation (and/or group). In some embodiments, multiple users may be connected through a user in one group that may be connected with other users and/or other groups. In some embodiments, the connections of one user in a group may not be common to all users in the group. For example, a user may be connected to two different groups that may include other users that are not connected.

In some embodiments, the system may use one or more criteria for determining whether two users (and/or avatars) are connected. For example, the system may determine one or more characteristics about a user or avatar and compare those one or more characteristics to one or more conversation initiation criteria to determine whether a user is connected. As referred to herein, a "connection characteristic" may include any information about a user or an avatar that bears on whether the user is connected to one or more conversations and/or a level at which the user is connected (e.g., fully, partial, etc.). These characteristics may be compared against conversation initiation criteria. As referred to herein, "conversation initiation criteria" comprise any criteria that may be used (or compared against a conversation characteristic) to determine whether to connect users. These characteristics may include a position (or join area location) of an avatar in a virtual environment as well as any data that distinguishes one avatar from another. This information may also include selections by a user (or avatar) and/or other inputs (e.g., audio, textual, etc.). For example, connection characteristics may include where an avatar is currently located, what connections an avatar currently has, what on-screen selections a user has made, what words or phrases (e.g., via typing into a chat feature or speaking via an audio input) a user has input, etc. Additionally, connection characteristics may include past actions (or inactions) of a user. For example, the system may retrieve a user history of the user in the present session of the virtual environment and/or other previous sessions to generate a user profile of the user. The user profile may include connection characteristics of the user that may be used to determine whether a user should join or leave a group.

In some embodiments, connection characteristics may be compared against conversation maintenance criteria. As referred to herein, "conversation maintenance criteria" may comprise any criteria that may be used (or compared against a conversation characteristic) to determine whether to maintain a connection between users. Conversation maintenance criteria and conversation initiation criteria may be the same or different. For example, both conversation initiation criteria and conversation maintenance criteria may comprise whether join areas for respective avatars are overlapping and/or whether two avatars are a threshold distance from each other. Furthermore, both conversation initiation criteria and conversation maintenance criteria may be dynamically altered based on changes to connection characteristics, environment rules, etc.

Furthermore, the system may vary a join area based on whether the user is joining or leaving a conversation. The join and leave areas may have different areas. The use of the different sizes of join and leave areas (e.g., the user of different conversation initiation criteria and conversation maintenance criteria) may reduce inadvertent joining and leaving events. For example, a small join area can be used to make it more difficult to inadvertently connect to another avatar, while a large leave area can make it easier to remain in a conversation that one is already a part of.

For example, prior proximity-radius systems have used the same distance between two avatars for both joining and leaving conversations—if one avatar (e.g., a first user) moves within this distance of another (e.g., a second user), a connection is initiated between them (e.g., the first user and the second user), but if they (e.g., the first user and the second user) then move further than this distance apart, the connection is severed (e.g., between the first user and the second user). Effectively, each avatar has a circle (e.g., or other shape) surrounding it—other avatars (e.g., a third user) that enter this circle are connected to the avatar (e.g., the first user and the second user), and avatars that exit the circle are disconnected. For example, the system may generate two separate join areas, one area (which may be a circle or other shape) associated with a first avatar (e.g., a first user) into which a second avatar (e.g., a second user) must enter in order to be connected to the first avatar (e.g., first user), and another, typically larger area associated with the first avatar (e.g., first user) that a second avatar (e.g., second user) must exit in order to be disconnected from the first avatar (e.g., first user).

For example, as non-connected avatars move around a virtual environment, the system checks whether they (e.g., the first user and the second user) are within the "join areas" of each other. If the system determines that they (e.g., the first user and the second user) are, the system initiates a conversation between them (e.g., the first user and the second user). Once two or more avatars are connected in a conversation, the system determines whether they have moved outside the "leave areas" of each other, and disconnect their conversation if they have. As referred to herein, a "leave area" comprises an area within a virtual environment that enables (or triggers) a user to disconnect from another user.

The system may generate the leave area as a function of the join area. For example, the system may determine a "leave distance" as a linear or nonlinear function of a join distance. Alternatively or additionally, the system may determine whether or not an avatar is within a join or leave area of another avatar (or conversation) and/or whether or not the join/leave areas overlap. For example, the system may determine to connect two avatars (e.g., a first and second user) only if they (e.g., a first and second user) are both within each other's join areas. Alternatively or additionally, the system may determine a first avatar (e.g., first user) to be connected to a second avatar (e.g., second user) that enters the first avatar's join area, without requiring the first avatar to also enter the second avatar's join area. Alternatively or additionally, the system determines to disconnect two avatars from one another only if the system determines that they are both outside each other's leave areas. Alternatively or additionally, the system determines that a first avatar may be disconnected from a second avatar that exits the first avatar's leave area, without requiring the first avatar to also exit the second avatar's leave area.

For example, with radius-proximity systems that have equivalent join and leave conversation distances, it is common for two avatars to rapidly and unintentionally move in and out of each others' conversation distances (especially when both avatars are moving together), creating rapid connections and disconnections that can interfere with effective verbal communication. Having a leave area larger than a corresponding join area can mitigate this by making it easier for avatars to remain connected in a conversation once they have initially joined, even if they stray slightly beyond the initial join area(s) of each other or of the present conversation.

One of the technical problems with radius proximity systems is that it is easy for an avatar to inadvertently join a conversation, and with chaining, possibly unintentionally linking multiple others into the same conversation. If the join area is set or auto-scaled to be very small, it makes it more difficult to join a conversation unintentionally—without having to make the leave area similarly small (which would make it difficult for avatars to remain in a conversation they are already part of while moving around).

In some embodiments, a user profile may also include other information that is not related (directly or indirectly) to the virtual environment. For example, the system may determine social networks and/or other sources of content that may be relevant to a user and provide data feeds associated with those content sources. It should be noted that any information included in a user profile may be based on active monitoring (e.g., requesting the user to enter information into a profile) or passive monitoring (e.g., tracking information about a user without the user making an explicit decision that it is being used to generate a user profile). Such information may include current statuses, current group affiliations (e.g., third-party "friend" designations, etc.). The system may use this information to determine whether a user joins or leaves a conversation (e.g., these characteristics may be compared against both conversation initiation criteria and conversation maintenance criteria). For example, in response to detecting that two users share a social media connection, the two users may be added to a conversation if a conversation initiation criterion corresponds to the automatic connection of social media connections.

In some embodiments, the system may determine a shape or size of a join area based on a user profile (e.g., user settings for a shape or size), conversation characteristics (e.g., such as a number or percentage of users in a conversation, a predetermined importance of a conversation, etc.), an environment rule (e.g., objects in the environment, boundaries in the environment, and/or other rules relating to the shape or size of a join area in a given virtual environment). In some embodiments, the shape or size may further be determined by a direction of an avatar, whether the avatar is moving or stationary (or otherwise navigating about the virtual environment and/or interacting with other avatars, objects, etc. in the virtual environment), whether other users have already joined a conversation, and/or whether other join areas for other conversations are present.

As shown in FIG. 1B, virtual environment 100 has now changed due to user interactions. For example, avatar 116 has now moved closer to avatars 112 and 114. In response, a user associated with avatar 116 has joined a group with users associated with avatars 112 and 114. For example, video mosaic 106 has now appeared. Accordingly, a user associated with avatar 116 may now use video mosaic 106 to communicate with users associated with avatars 112 and 114. For example, the system may connect avatars by video/voice chat to any avatar based on one or more criteria. For example, one criterion may relate to the satisfaction of a "chaining" algorithm, which connects a first user (e.g., avatar 112) to a second user (e.g., avatar 114) whose avatar is within a set radius of the first user's avatar (or otherwise connected based on avatar orientation, explicit video chat request, or some other method) and also to all other users who are connected to the second user. Accordingly, a third user (e.g., avatar 116) may only need to be within a proximity to the first user to be "chained" to the second user.

This algorithm may facilitate conversations among a large number of participants, whose avatars are not all within a predetermined proximity, to be connected to all of the other participants, eliminating the problem of incompletely overlapping conversations described above.

As referred to herein, "chaining" users refers to the addition of one user to a conversation with another user. For example, if a first avatar and a second avatar B are connected, and a third avatar connects to the first avatar or the second avatar, then the third avatar is also automatically connected to both avatars. This may occur even without the presence of one or more of the avatars (or without one or more of the avatars meeting one or more conversation initiation criteria). For example, when a new connection between a first avatar and a second avatar is formed (e.g., initiating a conversation), the system may initiate additional connections between the first avatar and any avatars to which the second avatar is connected, and vice versa. Conversely, in some embodiments, for an avatar in a conversation to leave that conversation, it must meet (or fail to meet) one or more conversation maintenance criteria to be disconnected from all avatars in that conversation.

For example, if the system has generated for display on respective user interfaces for the first user and the second user a conversation, wherein the conversation comprises a peer-to-peer livestream communication between the first user and the second user, the system may add additional users to the conversation based on either the first avatar or the second avatar. For example, the system may determine, for the first avatar, a first position in the first virtual environment. The system may then determine, for the third avatar, a third position in the first virtual environment. The system may add, without user input, the third user to the conversation based on the first position and the third position (e.g., irrespective of the position of the second avatar). As such, the system may automatically include a first user in a conversation with a second user based on: (i) the first user being within a join area of a third user; and/or (ii) the third user already being in a conversation with the second user.

Accordingly, the system provides several technical benefits. Namely, all users have the same perception of who is connected to whom. That is, it is not possible for a first avatar to be connected to a second avatar and third avatar without the second avatar being connected to the third avatar. Moreover, a group of avatars does not need to all be in close proximity to each other to maintain a conversation (as would be required in a strict radius-proximity system). Instead, the avatars may spread out over a larger area so that it is easier to see/differentiate the avatars themselves. This is particular helpful in densely populated virtual environments, where a dense number of avatars makes not only viewing which avatars are present but selecting among the avatars (e.g., using various user input devices) difficult or impossible.

For example, in a radius-proximity system without chaining, it is possible to have one avatar connected to others who are not necessarily connected to each other, creating partially overlapping conversations that lead to confusion and misunderstanding. This is particularly problematic when conversations featuring video feeds are created as users may be talking over each other with little coordination. Furthermore, creating a conversation with a large number of users in a radius-proximity only system is inherently difficult, because all users' avatars must be packed within a small radius of each other—or the radius must be made larger, which increases the likelihood of inadvertently including extra nearby avatars. Chaining enables large conversations with relatively spread-out or oddly-arranged avatars, without undue likelihood of inadvertently including extra avatars.

Additionally or alternatively, the system may use various conversation initiation criteria when chaining avatars. For example, the system may provide absolute thresholds (e.g., binary tests that determine whether or not an avatar may join a conversation) or apply weights to various factors. The weights may be used to generate a score or rank (or prediction in machine learning/AI embodiments) that are used to determine whether or not to add a user to a conversation.

For example, the system may provide chaining with an absolute distance limit, such that if a non-connected avatar (e.g., first user) meets spatial criteria (e.g., distance, join area coverage and/or overlap, etc.) for being connected to a conversation (e.g., between a second user and a third user), but is greater than a threshold distance away from any one of the avatars already in the conversation (e.g., the second user or the third user), the system will prevent an avatar (e.g., the first user) from joining the conversation (e.g., between a second user and a third user). The system may provide prompts and/or other indicators to the first user, but may prevent the first user from joining the conversation unless the first user moves within the threshold distance of all current conversation avatars (e.g., corresponding to the second user and the third user), or moves within a conversation join area and/or with a threshold distance to a conversation position for the conversation.

By doing so, the system limits the spatial spread of avatars in a conversation, preventing inadvertent connection of large numbers of avatars, or connections between avatars that may not be visible to each other on a user's screen. The absolute distance limit may be constant, or auto-scaled based on avatar density, virtual environment size, or other parameters.

Alternatively or additionally, the system may provide chaining with a conversation size limit, such that once a conversation includes a certain number of avatars (which may be constant or auto-scaled based on various parameters, such as computational resources available or number/density of avatars) an additional avatar is unable to join unless an avatar currently included in the conversation leaves. In such cases, prior to adding an avatar (e.g., a first user to a conversation), the system may compare a current number of users in the conversation to a threshold limit. If the system determines that the current number is equal or exceeds the threshold limit, the system does not add the avatar. If the system determines that the current number is below the threshold limit, the system adds the avatar.

Alternatively or additionally, the system may provide chaining with a time delay, such that a first avatar may be connected to a second avatar only after staying within that second avatar's join area for a certain amount of time. The amount of time needed may be a function of the number of avatars connected to the second avatar, which makes it less likely that an avatar will inadvertently connect to a large number of other avatars via chaining.

During chaining, the system may determine one or more conversation characteristics of a conversation and automatically apply those to a user being chained to the conversation. For example, the system may determine that a first user in a conversation has limited rights in the conversation, and the system may provide the second user that is being chained to the first user those limited rights. Alternatively, the system may determine conversation characteristics with the conversation itself and apply those conversation characteristics to the second user.

In some embodiments, the system may determine whether to connect one or more users based on a distance between their respective avatars in the virtual environment. For example, the system may use a radius-proximity system to determine when to join users in a conversation and/or when users should leave a conversation. As referred to herein, a radius-proximity system is a system (e.g., in an avatar-based video conferencing system) in which two avatars are connected to each other based on one being within a set distance of the other. For example, the system may determine a distance between two avatars. Additionally or alternatively, the system may determine join areas based on an area defined by a circle around the avatar having a radius of a predetermined amount.

The system may use various metrics to determine distance (e.g., pixels, grid-based allocations of the virtual environment, etc.). Additionally, the distance may be dynamically adjusted based on a size of a virtual environment and/or the density of avatars in the virtual environment. In addition, the radius-proximity system may be based on one or more shapes, and each shape may be irregular and/or dynamically altered. The system may use the radius-proximity system to determine join areas and leave areas for a given conversation. Another criterion may be based on the system generating a join area and detecting an avatar entering that area. For example, when a new avatar enters the join area of a conversation, the system may connect the entering avatar to all avatars in that conversation rather than only those in close proximity. The system may further refine the join area by making its location based on the positions of the avatars currently in conversation with each other. In some embodiments, a join area may be based on an environment rule of the virtual environment and/or a conversation characteristic for the conversation.

It should be noted that embodiments related to join areas may also be applied to leave areas. For example, while a join area may be a two-dimensional area or three-dimensional volume for a given avatar or connected group of avatars such that a non-connected avatar entering the area/volume may be connected to the avatar or group of avatars, a leave area may be a two-dimensional area or three-dimensional volume for a given avatar or connected group of avatars such that a non-connected avatar entering the area/volume may exit a connection to the avatar or group of avatars. For example, in virtual environment 130, avatar 116 may have entered the join area for the conversation between avatars 112 and 114. In some embodiments, the system may use the radius-proximity system for defining the join area. Additionally or alternatively, the join area may be dynamically altered based on a length of time in a conversation, movement of avatars in the conversation, a number of avatars in the conversation, a size and/or density of the virtual environment, etc.

For example, chaining and group-based join areas may introduce additional problems in some circumstances, especially when the overall density of avatars in a given area is high; users with avatars very distant from each other could be unintuitively and undesirably connected by an inadvertently formed chain of participants. This may be addressed in a number of ways. Firstly, the number of users who can be connected together may be limited. An additional, larger maximum distance limit could also be imposed, such that new avatars joining the conversation must be within the maximum distance of all avatars currently in the conversation in order to join, which may limit the total range of the connected group. For example, conversation characteristics for a conversation may dynamically change and/or may dynamically change in relation to each other. For example, one conversation characteristic (e.g., a number of users in a conversation) may affect another conversation characteristic (e.g., a distance/size corresponding to a join area for the conversation).

Additionally, the proximity radius within which two avatars may be of each other in order to initiate a connection between them could be automatically scaled based on any number of criteria, such as the dimensions of the virtual environment or the density of avatars within the space or within a connected group of avatars. For example, having the distance between two avatars needed to join a conversation be smaller than the distance needed to leave a conversation can reduce the likelihood of inadvertently initiating a conversation (an especially important problem with chaining), while also making it easier to remain in a conversation while moving around once the conversation has been initiated (due to the larger "leave distance"). Users can be given further control over the joining and leaving of conversations by incorporating the orientation of the avatar within the virtual environment—a single, non-connected avatar might, for example, have a sector-shaped join area extending out in front of it, such that it will only initiate conversations with avatars in the direction it is facing. Considering avatar motion offers additional control—for example, by preventing any new conversations from being initiated between avatars that are currently moving, in order to prevent connections between groups of avatars and other single avatars or groups that are just "passing through" an area with no intention of stopping for a conversation.

In contrast, as shown in FIG. 1C, avatar 116 may have left the join area and/or left a leave area for the conversation between avatars 112 and 114. As referred to herein, a leave area may be a two-dimensional area (or three-dimensional volume) for a given avatar or group of avatars connected to each other in a conversation, such that if an avatar in the conversation moves outside the leave area, the system will disconnect the avatar from one or more other avatars. For example, the leave area may be an area that a given avatar must remain within in order to remain connected to the set of avatars for which the leave area is calculated. In some embodiments, the system may use the radius-proximity system for defining the leave area. Additionally or alternatively, the join and leave areas may be dynamically altered based on a length of time in a conversation, movement of avatars in the conversation, a number of avatars in the conversation, a size and/or density of the virtual environment, etc. In some embodiments, the leave and join areas for multiple conversations may overlap and the system may apply one or more criteria for determining which conversation or conversations the avatar is to join/leave.

In some embodiments, the system may have distinct "join areas" and "leave areas" for individual avatars. For example, as non-connected avatars (e.g., avatar 116) move around a virtual environment, the system checks whether they (e.g., the first user and the second user) are within the "join areas" of each other. If the system determines that they (e.g., the first user and the second user) are, the system initiates a conversation between them (e.g., the first user and the second user). Once two or more avatars are connected in a conversation, the system checks whether they have moved outside the "leave areas" of each other and disconnects their conversation if they have.

In some embodiments, connection distances and join/leave areas may be direction-dependent and/or include auto-scaling. For example, the system may first determine a direction at which an avatar is facing and adjust the connection distances and join/leave areas based on the direction.

Additionally or alternatively, the system may determine whether the avatar is turning and/or moving towards or away from a conversation group in order to determine whether the user should join/leave. For example, the system may first determine a direction at which an avatar (e.g., avatar 116) is facing and adjust the connection distances and join/leave areas based on the direction. The system determines a join and/or leave area scaling factor, wherein the join and/or leave area is a (linear or nonlinear) function of overall avatar density in the virtual environment.

Another problem with the basic chaining and group-based join area methods is that, in certain cases, the departure of a single avatar who served to connect nearby avatars to each other could undesirably sever the connection between remaining avatars in a conversation. This problem can be alleviated in several ways. Avatars already connected to one another in conversation could be disconnected from each other only if they are moving while also meeting other criteria (such as being far away from each other without a chain/group of avatars in between), meaning that users can remain in conversations initiated via long chains by simply not moving their avatars. An additional refinement can be made such that avatars in this situation can move towards each other (or toward any member of the remaining group, or toward a calculated centroid of the group, etc.) while remaining connected, but not away from each other (or away from any member of the group, a calculated centroid, etc.). This allows avatars in conversations initiated by long chains who find themselves far apart from each other but still conversing to move into a tighter group to continue a conversation, while also maintaining an outside appearance of being in conversation with one another by being in proximity. Some embodiments cause the avatars in this situation to be moved closer to one another automatically (when an option to do this is enabled) to maintain or restore the appearance of a group in proximity to one another. A related set of features enables avatars to optionally follow one another, making automatic movements to maintain proximity (and/or avoid meeting criteria to be disconnected from one another) in response to movements initiated by user input; this allows avatars to easily move together as part of a group without becoming disconnected.

In FIG. 1C, avatar 116 has also entered a leave area for the virtual environment 140. For example, this leave area is designated by a graphical element (e.g., a staircase). Virtual environments may include one or more graphic elements to designate additional ways to move, navigate, and/or interact within a virtual environment. For example, a staircase may correspond to an entry/exit path for a virtual environment; whereas, a product or storefront may represent a location within the virtual environment at which to access a third party (e.g., a virtual store). Additionally or alternatively, graphical elements may be used to provide computer navigation tools (e.g., a jukebox in a virtual environment may allow a user to access music stored on a device). For example, in response to detecting the location of avatar 116, the system has generated pop-up 126, which provides options for allowing the user to navigate to other virtual environments and/or applications.

The initiation, joining, and leaving of conversations in a physical social environment is often dependent on context and the status or activities of participants. For example, students might have a conversation while eating lunch between classes; an employee may approach a coworker taking a break at the office water cooler for casual conversation, and a person who sees their coworker focused intently on a work task may avoid initiating a potentially distracting conversation with them. The methods and systems herein described include mechanisms for a first user's status and activities to be broadcast to other users, by way of graphics or other indicators associated with the first user's avatar or displayed in a centralized interface visible to the other users. This offers contextual information that is helpful in evaluating whether to initiate or join a conversation, and potentially suggest initial topics of conversation or an overall context in which the conversation is being initiated. Status information for each user is derived from their activities in the virtual world (e.g., conversations or other interactions with other participants, interactions with virtual objects, tools, games, integrations with external services from within the virtual environment, or other activities). For example, a participant who just ordered food for delivery by interacting with an object in the virtual world may be automatically assigned a status "eating lunch from restaurant X," or a participant streaming music through a virtual jukebox may be assigned the status "listening to music." Each user in the virtual environment may have multiple or composite statuses, such as "In a private conversation, listening to music, and eating lunch." Additional status information for each participant may be derived from computer-connected sensors such as microphones and cameras. Speech sounds picked up through a microphone may indicate that the participant is in active conversation, and the system may contain additional information such as the emotional tone of the participant's speech. Similarly, computer vision analysis of a participant's webcam feed may yield information about that participant's facial expression or emotional status. Computer vision analysis of a user's webcam images may also indicate that user's activity in the real world (e.g., eating, talking, away from computer), which can then be broadcast as a status in the In the user interface for virtual world, the status indicators may take the form of text, icons, or other graphics associated with individual avatars/users in some way, with status-indicating graphics possibly in proximity to the respective users' avatars and/or possibly collected in a separate centralized interface. In some embodiments, a user's facial expression predicted by computer vision analysis of their webcam images may be represented as a facial expression visible on their avatar and/or as an emoji or other emotional status indicator visible on or near the avatar or in a separate centralized interface. In some embodiments, other aspects of a user's status may be reflected in the appearance or behavior of their avatar. For example, the avatar of a user who is eating might display an eating animation. In addition to inferred or automatically detected aspects of a user's status, in some embodiments, the user may also be able to deliberately set or modify their status or elements of it that will be displayed to other users. Additionally, aspects of a user's status may be reflected in aspects of the webcam and microphone feed from that user. For example, in some embodiments, if computer vision analysis of a user's webcam feed suggests that the user is not presently near their webcam or attending to their device, that user's microphone may be muted and/or their webcam feed turned off, such that other users cannot see or hear images and sounds picked up by their device.

In some embodiments, the system may automatically select avatars based on certain statuses (e.g., with certain settings, status indicators, etc.). For example, the system may receive a user selection of a group of avatars, such that any avatars that are inside the selected area and/or do not have the status "busy" are selected for some further action (e.g., initiation of a private meeting). Similarly, the system may apply statuses to connection criteria (e.g., a user's status determines their join area (e.g., if they are "busy" or "doing deep work", the system reduces their join area), so an avatar would need to be right next to them to start a conversation (to avoid distracting them unless really necessary). In another example, the system may allow external control to be exerted on any avatar that has a given status (e.g., "waiting for meeting," "waiting for instructions," etc.).

For example, some social interactions in the physical world take place around purchasing behaviors, such as buying food from a restaurant or browsing items in a store. While facilitating virtual worlds with cluster-based video conferencing, the methods and systems described herein enable purchasing behaviors and interactions surrounding these purchasing behaviors to take place within the virtual environment and video conferencing environment. For example, a group of users might enter a virtual store (using their avatars) representing a real business and containing various items for purchase, represented visually as graphics. They would gain all of the benefits of a proximity video chat (such as talking with each other and with staff of the store who may have their avatars present, and exploring the store's offerings in a visually engaging way), but would also be able to initiate purchases with the external business directly through the virtual store. If a first avatar interacts with an item in the virtual store and receives additional information about it, that information may, in some embodiments, also be made visible to other users who are connected to the first user in conversation. As another example, a group of users could enter a virtual restaurant corresponding to a real restaurant or restaurant chain. The virtual environment could provide a pleasing environment (e.g., music audible to any users with avatars in the restaurant, appropriate visuals surrounding the avatars, a virtual table for the avatars to sit at), and allow the users to place food orders for delivery directly from within the virtual restaurant. When the food is delivered to each user, virtual representations of the food each user ordered could be displayed on the virtual table at which the avatars are sitting—and the avatars could begin displaying eating animations, possibly initiated or influenced by computer vision analysis of user webcam images. In other contexts, such as a virtual office, users may access food ordering services (for example) by interacting with specific visual entities, such as a virtual refrigerator or virtual booth representing a food delivery service. A similar pattern of replicating shared visual and auditory experiences involved in purchasing behaviors among connected avatars could be replicated for a variety of goods and services interactions, such as rideshares, supermarkets, and retail stores. For user groups associated with an employer or organization, purchases made using the platform could be linked to a reimbursement system—for example, employees could be enabled to easily make work-related purchases from within a virtual workplace that would be automatically reimbursed. Additional integrations could enable delivery of value from external businesses directly through the app. For example, interacting with a virtual television could lead to integration with entertainment streaming services, enabling users engaged in video chat to watch movies and television as a group—with avatars connected to each other in conversation by the criteria described herein sharing a view of entertainment content. As another example, interacting with virtual headphones or a virtual speaker could trigger integrations with music streaming services, such that background music can be streamed into the virtual environment for one or more users to listen to—with users who are connected to one another in conversation sharing an audio stream of music or other audio-based content.

Figure 2:
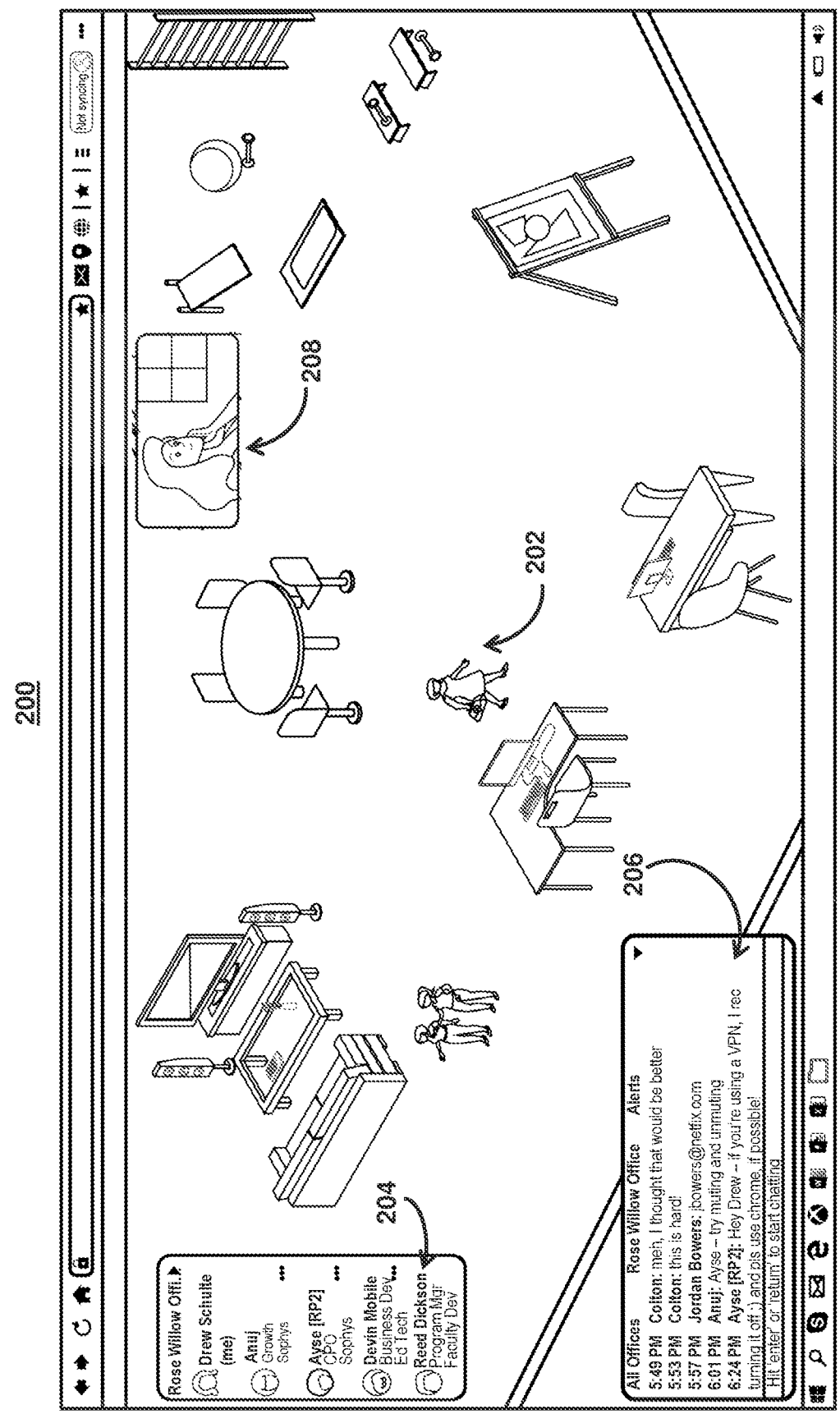
FIG. 2 shows another illustrative virtual environment for simulating in-person interactions, in accordance with one or more embodiments.

FIG. 2 shows another illustrative virtual environment for simulating in-person interactions, in accordance with one or more embodiments. Virtual environment 200, which is displayed in a web interface, shows avatar 202 for user 208 (represented in a video mosaic). Additionally, virtual environment 200 includes other features for allowing users to navigate a virtual environment and communicate with other users. For example, virtual environment 200 includes status bar 204, which describes the status of users within virtual environment 200. For example, status bar 204 may indicate the users that are in a conversation and/or present in virtual environment 200. Status bar 204 may also provide calendar and activity information for one or more users.

Virtual environment 200 also includes chat box 206. Chat box 206 may allow users to discuss activities with one or more groups, share/present documents, and/or provide one or more other functions in virtual environment 200. It should be noted that virtual environment 200 may include additional pop-up and/or menu options that may be selected by a user. Additionally, one or more of these pop-ups or menus may move around the screen based on a location of avatar 202 or other menus (e.g., in order to not block a user's view).

In some embodiments, virtual environment 200 may provide for broadcasting to all users. For example, one or more users' webcam/audio feeds may be made visible to all (or a large subset of) users who have avatars in one or more virtual environments, with or without a multi-way connection, such that the broadcaster(s) are shown the webcam/audio feeds of the users they are broadcasting to. For example, as opposed to conventional systems that allow broadcasting to a single virtual room or virtual environment, the present system may broadcast to avatars in two or more separate virtual environments simultaneously.

In some embodiments, a user may use on-screen menus to initiate private conversations. For example, one potential problem with avatar video conferencing is the need for private conversations that users not initially included cannot join or can join only by sending a request to those already participating in the conversation. With no private conversation options, it would be possible for a user's avatar to enter any conversation within a virtual environment by moving to within range of a group of other avatars or it might be possible for the avatar to join a conversation without warning by joining the virtual world at that location, "teleporting" to the location of one of the participants, joining via a long contiguous chain of avatars, etc. Existing solutions to this problem typically involve designated regions or structures of a virtual environment for private conversations, such as virtual conference rooms, booths, or dining tables. These solutions are limited in two ways. First, it is sometimes desirable to quickly initiate a private conversation without avatars having to travel to a designated location. Second, there may be a limited number of designated areas for private conversation in a virtual world with many participants.

In some embodiments, a user may manually select, one by one, a set of avatars in their immediate vicinity (for example, by clicking or tapping the avatars). One or more additional buttons or controls initiates a private conversation with these participants. In some embodiments, a set of avatars is automatically selected by virtue of being included in the present conversation with a user. The user may select a single button or other control to "convert" the current conversation to a private conversation. In some embodiments, a user may draw a shape on a device screen (using a mouse, stylus, or other input device) that surrounds a subset of avatars who will be selected to be included in a private conversation. The drawn shape may have preset properties with controls to transform its dimensions (e.g., an ellipse), or it may be freeform. Freeform drawn shapes may still complete a selection if the shape is not fully enclosed—for example, a straight or curved line may be inferred between the two ends of the drawn line to complete the shape within which avatars will be selected. In some embodiments, a user can draw a freeform line such that any avatars that the line touches (or passes within some threshold distance of) will be included in the selection.

It should be noted that these embodiments of selecting participants are not limited to the initiation of private conversations and may be used to select a set of avatars for any purpose in the virtual environment. For example, a set of avatars could be selected to be transported to another virtual location, to be included in a game or other activity in the virtual environment, to be invited to an event, to be sent a message, to be requested to follow the avatar of the user making the selection, etc.

Figure 3:
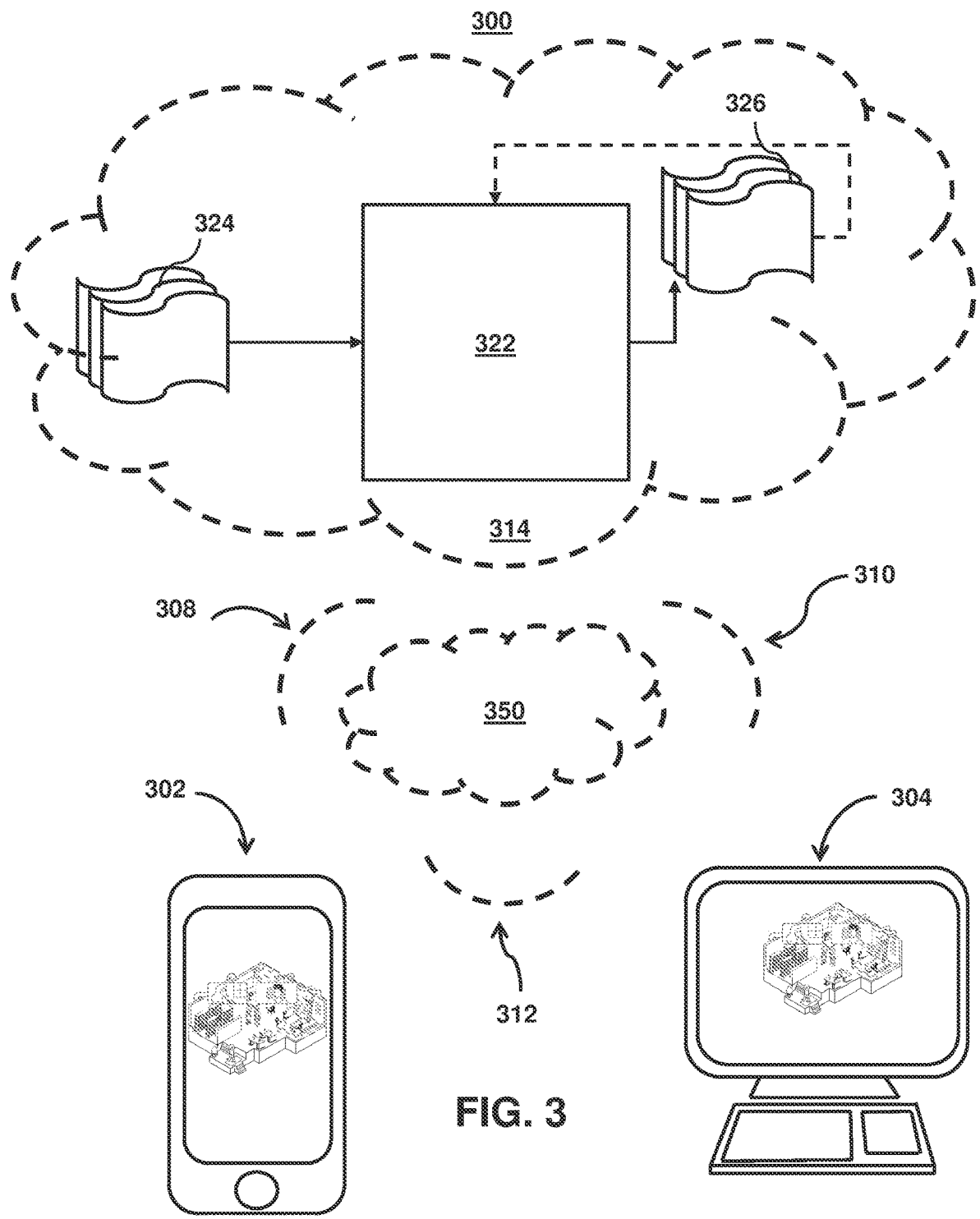
FIG. 3 shows an illustrative system diagram for simulating in-person interactions, in accordance with one or more embodiments.

FIG. 3 shows an illustrative system diagram for simulating in-person interactions, in accordance with one or more embodiments. As shown in FIG. 3, system 300 may include client device 302, client device 304, or other components. Each of client devices 302 and 304 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 302 and 304 may include a desktop computer, a server, or other client device. Users may, for instance, utilize one or more client devices 302 and 304 to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of client device 302, those operations may, in some embodiments, be performed by components of client device 304. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 308, 310, and 312. Communication paths 308, 310, and 312 may include the internet, a mobile phone network, a mobile voice or data network (e.g., a 4G or LTE network), a cable network, a public switched telephone network, or other types of communications network or combinations of communications networks. Communication paths 308, 310, and 312 may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 300 may use one or more predictions to determine characteristics for simulating virtual embodiments (e.g., whether a user should join or leave a conversation in a virtual environment, a size of a join area, one or more connection characteristics, one or more conversation initiation criteria, etc.). For example, as shown in FIG. 3, system 300 may determine whether a user (or a group of users) meets one or more criteria using server 322. The determination may be output (e.g., video mosaic 102 (FIG. 1)) on client device 304. The system may also use one or more machine learning models such one or more neural networks (e.g., as discussed in relation to FIGS. 4-5) or other machine learning models.

As an example, with respect to FIG. 3, server 322 may take inputs 324 and provide outputs 326. The inputs may include multiple data sets such as a training data set and a test data set. The system may collect data concerning avatar position and movement; mouse position, movement, and clicking actions; and/or eye tracking using computer vision analysis of webcam images from use of an avatar-based video conferencing system with a rules-based framework (e.g., one of the other methods described herein) to be used as training data. The data sets may represent characteristics of users and/or avatars in virtual environments as well as characteristics of users outside of the virtual environment (e.g., collected from a user profile of past user history). For example, the data may be labeled for supervised learning (e.g., a human labeler visualizes the data and indicates which connections should be made at which times) or unlabeled for unsupervised learning. In the case of supervised learning, a machine learning algorithm, such as a deep neural network or recurrent neural network, compares its output to human-generated labels during the training process. In unsupervised learning, during the training process, the machine learning model compares its avatar connectedness output (e.g., which avatars successfully connected) to a future state of avatar connectedness (e.g., which avatars are connected to each other several seconds after the current time point), attempting to predict the connections that will be initiated by subsequent movements of the avatars within whatever rules-based connection/disconnection framework is being used (e.g., what avatar actions lead to a successful connection). In some embodiments, prediction of future connections by machine learning or other methods may be used to load potential connections in advance (with or without notifying the user of this prediction and preparation) in order to reduce perceived latency of the connection being initiated at the time the connection is initiated in earnest.

For example, the system may predict what connections might take place in the near future (e.g. using ML, the trajectory of avatars moving towards each other or each other's join areas, or a slightly larger "pre-join area" surrounding the actual join area) and then begins the process of initiating the video/audio connection in advance (e.g., without necessarily displaying these for the users) so that the actual connection appears to happen instantaneously when the connection criteria are met (otherwise, there is latency as the connection is initiated). For example, the system may anticipate loading one or more assets, content, and/or configuration files in order to allow for seamless webcam interactions. In some embodiments, the system may pre-fetch data files and/or user settings in order to provide the seamless webcam interactions.

In one use case, outputs 326 may be fed back to server 322 as input to train a machine learning model (e.g., alone or in conjunction with user indications of the accuracy of outputs 326, labels associated with the inputs, or other reference feedback information). In another use case, the machine learning model may update its configurations (e.g., weights, biases, or other parameters) based on its assessment of its prediction (e.g., outputs 326) and reference feedback information (e.g., user indication of accuracy, reference labels, or other information). In another use case, where the machine learning model is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

For example, the system may use supervised learning (e.g., featuring labeled data) or unsupervised learning for determining whether to join/leave a group. The system may use a machine learning algorithm to determine the connection matrix among avatars resulting in avatars joining/leaving conversations. The system may use a machine learning algorithm to determine the connection matrix among avatars, with imposed constraints based on the other methods described herein—for example, there may only be a possibility of an avatar joining a conversation if it is within the join radius of one of the already connected avatars or is within the join area of the conversation, etc.—once this minimum criterion is met, the machine learning algorithm makes the final decision to connect or not (other constraints may be imposed on the decision to disconnect an avatar from a current conversation).

System 300 also includes API layer 350. In some embodiments, API layer 350 may be implemented on client device 302 or client device 304. Alternatively or additionally, API layer 350 may reside on one or more cloud components 314. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications is in place.

In some embodiments, the system architecture may use a microservice approach. Such systems may use two types of layers—front-end layer and back-end layer—where microservices reside. In this kind of architecture, the role of the API layer 350 may provide integration between the front-end layer and back-end layer. In such cases, API layer 350 may use RESTful APIs (exposition to front-end layer or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as a standard for external integration.

Figure 4:
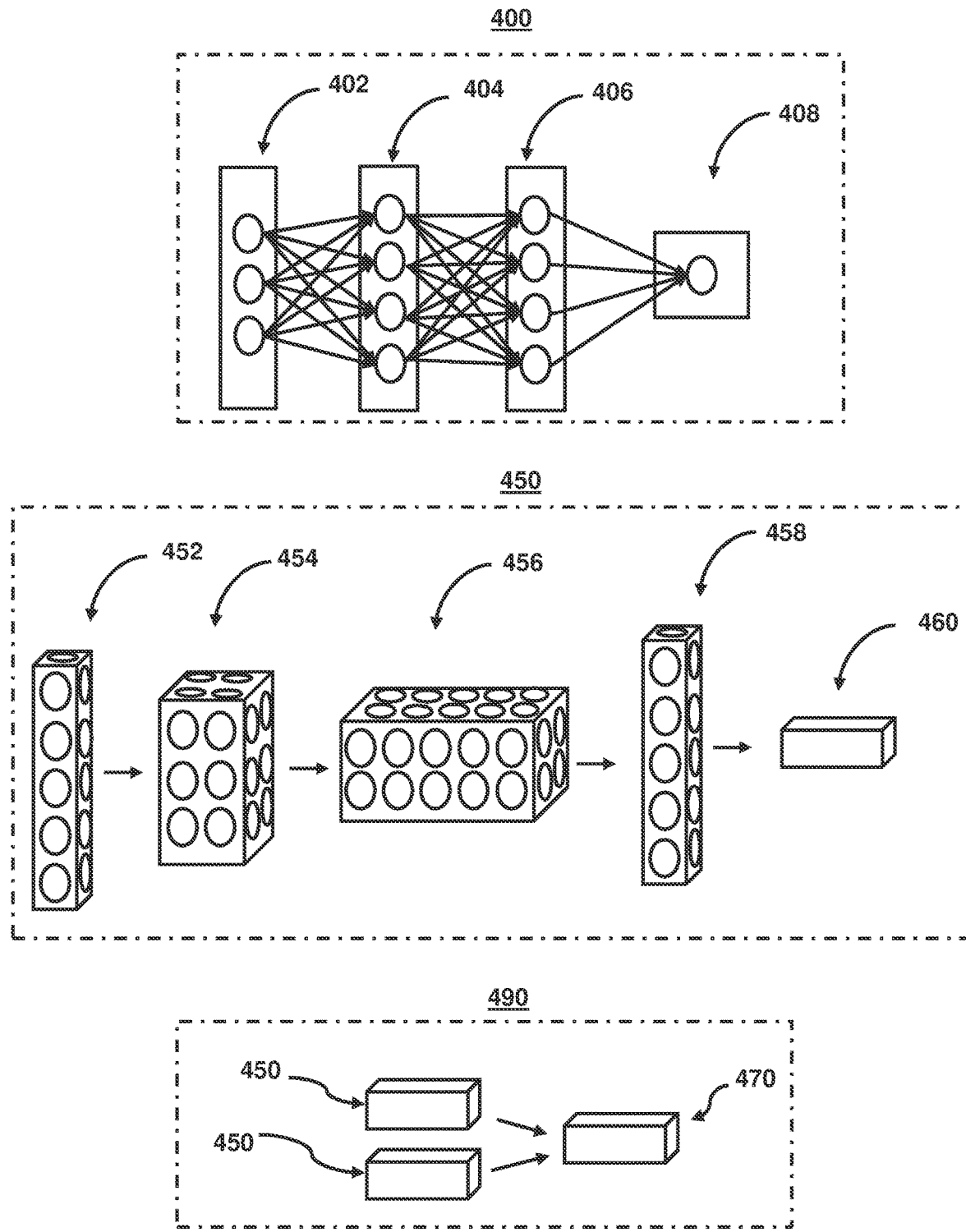
FIG. 4 shows an illustrative architecture of a machine learning model, in accordance with one or more embodiments.

FIG. 4 shows an illustrative system diagram for simulating in-person interactions, in accordance with one or more embodiments. For example, in some embodiments, the system may use "conversation group inference," which is determined based on one or more machine learning and/or deep learning models. For example, the system may use a recurrent neural network (e.g., as described in FIG. 5), deep reinforcement learning, or other machine learning algorithm (e.g., as described in FIG. 3) to predict which avatars a given avatar should be connected with in a video conferencing session. As described herein, this system may be trained on previously collected data (e.g., characteristics) about avatar position and movements and how users adjusted their avatars' position to achieve the desired set of avatars in a conversation, and/or human-generated labels accompanying such data. Machine learning, in this context, may enable conversations to be initiated and disconnected in ways that are more in line with users' intentions, including ways that might be difficult to capture with the rules-based approaches also described herein.

Model 400 illustrates an artificial neural network. Model 400 includes input layer 402. User characteristics may be entered into model 400 at this level. Model 400 also includes one or more hidden layers (e.g., hidden layer 404 and hidden layer 406). Model 400 may be based on a large collection of neural units (or artificial neurons). Model 400 loosely mimics the manner in which a biological brain works (e.g., via large clusters of biological neurons connected by axons). Each neural unit of model 400 may be connected with many other neural units of model 400. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. Model 400 may be self-learning and trained, rather than explicitly programmed, and can perform significantly better in certain areas of problem solving, as compared to traditional computer programs. During training, output layer 408 may correspond to a classification of model 400 (e.g., whether a given user characteristic corresponds to joining or leaving a group) and an input known to correspond to that classification may be input into input layer 402. In some embodiments, model 400 may include multiple layers (e.g., where a signal path traverses from front layers to back layers). In some embodiments, backpropagation techniques may be utilized by model 400 where forward stimulation is used to reset weights on the "front" neural units. In some embodiments, stimulation and inhibition for model 400 may be more free-flowing, with connections interacting in a more chaotic and complex fashion. Model 400 also includes output layer 408. During testing, output layer 408 may indicate whether a given input corresponds to a classification of model 400 (e.g., whether a user wishes to join or leave a group).

FIG. 4 also includes model 450, which is a convolutional neural network. The convolutional neural network is an artificial neural network that features one or more convolutional layers. Convolutional layers extract features from an input image. Convolution preserves the relationship between pixels by learning image features using small squares of input data—for example, the relationship of a location of one or more avatars on screen and/or their relationship to each other. As shown in model 450, input layer 452 may proceed to convolution blocks 454 and 456 before being output to convolutional output 460. In some embodiments, model 450 may itself serve as an input to model 400.

In some embodiments, model 450 may implement an inverted residual structure where the input and output of a residual block (e.g., block 454) are thin bottleneck layers. A residual layer may feed into the next layer and directly into layers that are one or more layers downstream. A bottleneck layer (e.g., block 458) is a layer that contains few neural units compared to the previous layers. Model 450 may use a bottleneck layer to obtain a representation of the input with reduced dimensionality. An example of this is the use of autoencoders with bottleneck layers for nonlinear dimensionality reduction. Additionally, model 450 may remove non-linearities in a narrow layer (e.g., block 458) in order to maintain representational power. In some embodiments, the design of model 450 may also be guided by the metric of computational complexity (e.g., the number of floating-point operations). In some embodiments, model 450 may increase the feature map dimension at all units to involve as many locations as possible instead of sharply increasing the feature map dimensions at neural units that perform downsampling. In some embodiments, model 450 may decrease the depth and increase the width of residual layers in the downstream direction.

In some embodiments, model 400 or model 450 may be a Siamese neural network (e.g., model 490) that uses the same weights while working in tandem on two different input vectors to compute comparable output vectors. For example, in a Siamese artificial neural network, model 400 may include two convolutional neural networks (e.g., two of model 450) that are not two different networks but are two copies of the same network (e.g., model 450). For example, two inputs may pass through model 490 to generate a fixed-length feature vector for each input. If the two inputs belong to the same classification (e.g., whether a user should join or leave a group), then their feature vectors will also be similar; while if the two inputs have different classifications, then their feature vectors will be different. The system may then generate a similarity score generated by an output sigmoid layer (e.g., layer 470) to detect and predict a classification. Furthermore, as one illustrative example of the algorithm used, the system may rely on a Siamese neural network and/or other neural network that uses the same or similar weights while working on two different input vectors to compute comparable output vectors, typically in tandem.

Figure 5:
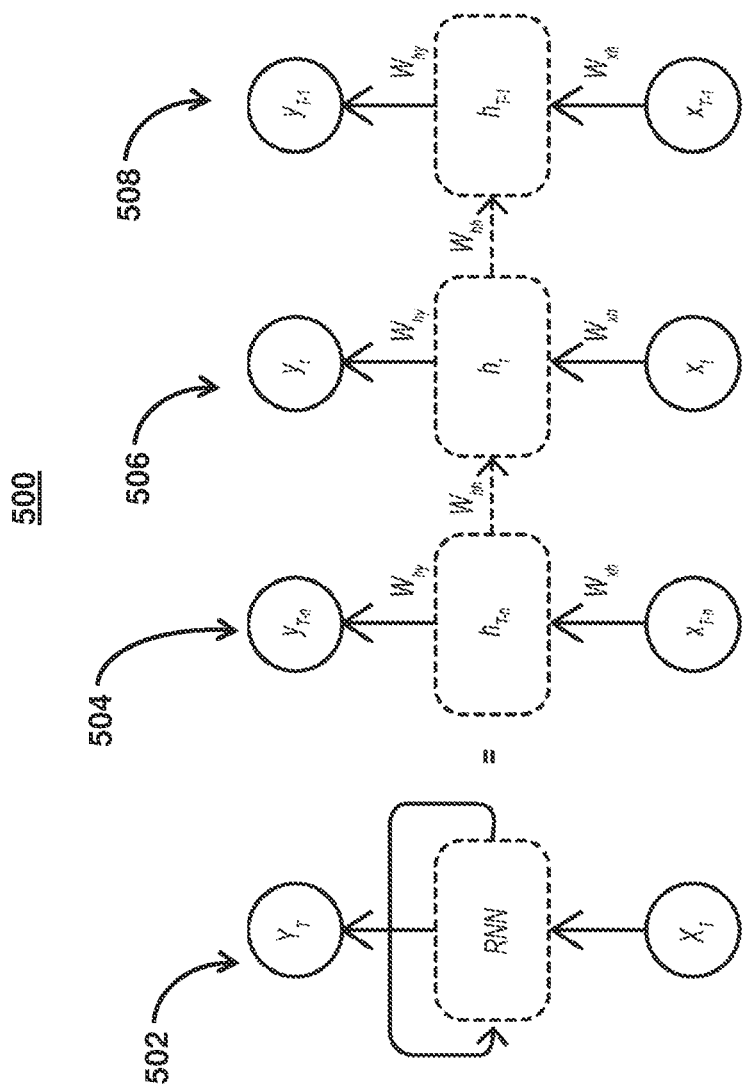
FIG. 5 shows an illustrative architecture of a machine learning model, in accordance with one or more embodiments.

FIG. 5 shows an illustrative architecture of a machine learning model, in accordance with one or more embodiments. For example, FIG. 5 shows model 500, a recurrent neural network, which is a class of artificial neural networks where connections between nodes form a directed graph along a temporal sequence. This allows it to exhibit temporal dynamic behavior. For example, in the present case, the system may determine characteristics that have a temporal element such as whether two avatars are moving closer together, whether two users are already engaged in a conversation, whether detected keywords in a conversation of users indicates the users are about to leave, etc. Model 500 may be used to classify user characteristics as corresponding to a given classification (e.g., a user wishing to join a group).

In model 500, a network of neuron-like nodes are organized into successive layers (e.g., layers 504, 506, and 508). Each node in a given layer is connected with a directed (one-way) connection to every other node in the next successive layer. Each node has a time-varying real-valued activation, and each connection has a modifiable real-valued weight. Nodes are either input nodes (receiving data from outside of the network), output nodes (yielding results), or hidden nodes (that modify the data as it moves from input to output). For supervised learning in discrete time settings, sequences of real-valued input vectors arrive at the input nodes, one vector at a time. At any given time step, each non-input unit computes its current activation (result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence may be a label classifying the digit. In reinforcement learning settings, no teacher provides target signals. Instead, a fitness function or reward function is occasionally used to evaluate model 500's performance, which influences its input stream through output units connected to actuators that affect the environment. Each sequence produces an error as the sum of the deviations of all target signals from the corresponding activations computed by the network. For a training set of numerous sequences, the total error is the sum of the errors of all individual sequences.

FIGS. 6A-D show illustrative diagrams related to join areas for avatars, in accordance with one or more embodiments. For example, the system may generate join areas, which may comprise areas about an avatar that may be used to determine whether or not the avatar is connected with another avatar and/or conversation. In some embodiments, virtual environments may be divided into portions or cells, and a join area may be defined (or defined in part) by the portion or cell. For example, the system may determine a grid map of a virtual environment, wherein the grid map defines a plurality of cells that comprise the virtual environment and/or one or more cell properties (e.g., indicating whether or not a cell may be included in a join area) for each cell of the plurality of cells. The system may determine a subset of cells in the grid map that comprise a join area based on a position, a join area criterion, and/or the one or more cell properties for each of the plurality of cells in the grid map.

Figure 6A:
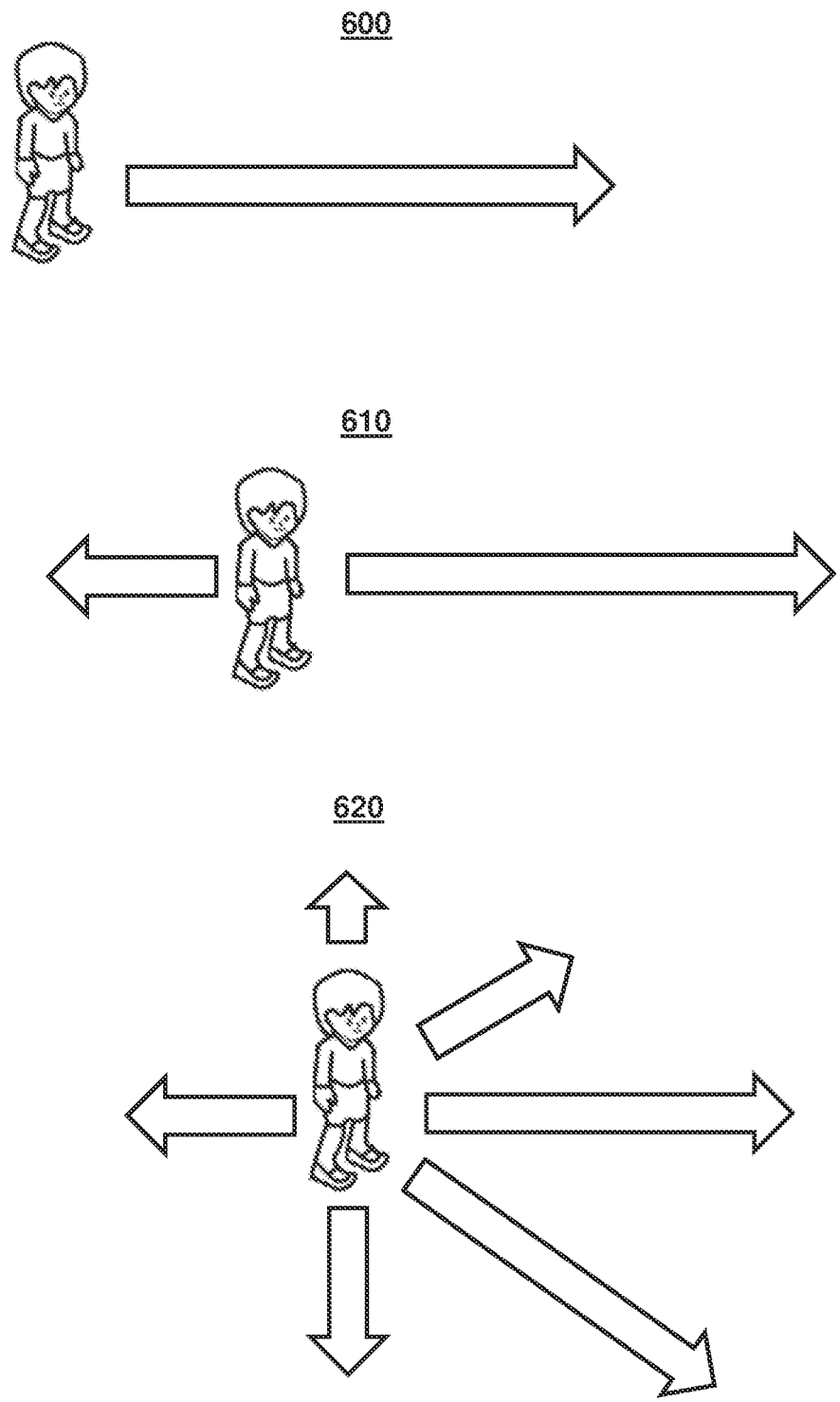
FIGS. 6A-D show illustrative diagrams related to join areas for avatars, in accordance with one or more embodiments.

For example, as shown in diagram 600 of FIG. 6A, a join area for an avatar may comprise a given area of an avatar based on the avatar's position. The join area may extend for some distance. The distance may be in one direction (e.g., corresponding to the trajectory of the avatar) or the distance may be equal in all directions (e.g., a radial distance about the avatar). The distance may also be reduced based on environment rules (e.g., indicating an object or wall that obstructs the join area in one direction). For example, in radius-proximity systems, the connection distance is roughly uniform regardless of the direction an avatar is facing, creating something resembling a "connection circle" around each avatar within which another avatar must go in order to connect to that avatar. For example, the connection distance may be a function of the angle relative to the direction in which the avatar is facing, creating a variably shaped "join area" in the vicinity of the avatar. In some embodiments, the connection distance may be constant (e.g., in one direction or all directions). However, a uniform join area may be counter initiative to a user as users in real-life do not enter conversations occurring behind them.

Accordingly, the system may use non-uniform join areas. For example, for each non-connected avatar, the system may determine whether any other avatar is within the join distance (which may also be a "join shape" or "join area"), which is a function of angle relative to the direction the avatar is facing. If so, the system connects the avatars in a conversation. For each connected avatar, check whether other avatars connected to it remain within the leave distance of the first avatar (or, "leave shape" or "leave area")—if not, disconnect the conversation. In some embodiments, the join shape/area or leave shape/area may be an arbitrary shape or volume in 2D or 3D space.

In some embodiments, the join area may feature different distances in different directions. For example, as shown in diagram 610, the distance may be larger in the direction the avatar is facing or moving. Alternatively or additionally, the distance may extend in all directions (or one or more directions) about the avatar, but have a length based on the trajectory of the user as shown in diagram 620.

For example, the system may determine that a join distance (e.g., for a first user) is the same as, or separate from, a leave distance, and one or both of which are a function of angle relative to the direction the avatar (e.g., a first user) is facing. The system may determine that a join and/or leave distance is a function of angle, such that the join or leave distance in front of the avatar (e.g., the direction the avatar (e.g., of a first user) is facing) is larger than the join or leave distance behind the avatar. The system may determine that a first avatar (e.g., first user) must be within the join area of a second avatar (e.g., second user), and in which that second avatar must also be within the join area of the first avatar, in order to establish a connection between them. The system may determine that a first avatar must be within the join area of a second avatar (or vice versa) to initiate a connection between them, without a requirement for them both to be within each others' join areas.

For example, users can initiate or leave conversations based on the direction their avatars are facing, rather than only the distance between their avatar and others—this gives users more control over their joining and leaving behavior. Enabling conversations to be initiated at longer distances in front of the user's avatar mirrors a phenomenon in the physical world where conversations are easier to initiate when one is facing toward another person than facing away from them—because our mouths are on the front of our heads and sound tends to project forward (visual cues also play a role). Having the join distance in front of the avatar be larger than that behind or to the side of the avatar preferentially includes avatars that the avatar is moving towards (a behavior which may be naturally related to a desire to initiate a conversation with those avatars) when the avatar is in motion.

The join area may also change based on interactions with other avatars and based on whether or not an avatar is engaged in a conversation. For example, as shown by join area 630 of FIG. 6B, an avatar may have a join area that comprises a radial proximity about a user. However, when the avatar connects to another avatar (e.g., in a conversation), the join area may increase as a function of the number of avatars in the conversation and/or the positions of the avatars in the conversation as shown by join area 632. For example, join area 632 may represent a conversation join area for a conversation between two avatars. The area and shape of join area 632 may be based on center point of join area 632 (which itself may be based on a position of the avatars in join area 632).

Figure 6B:
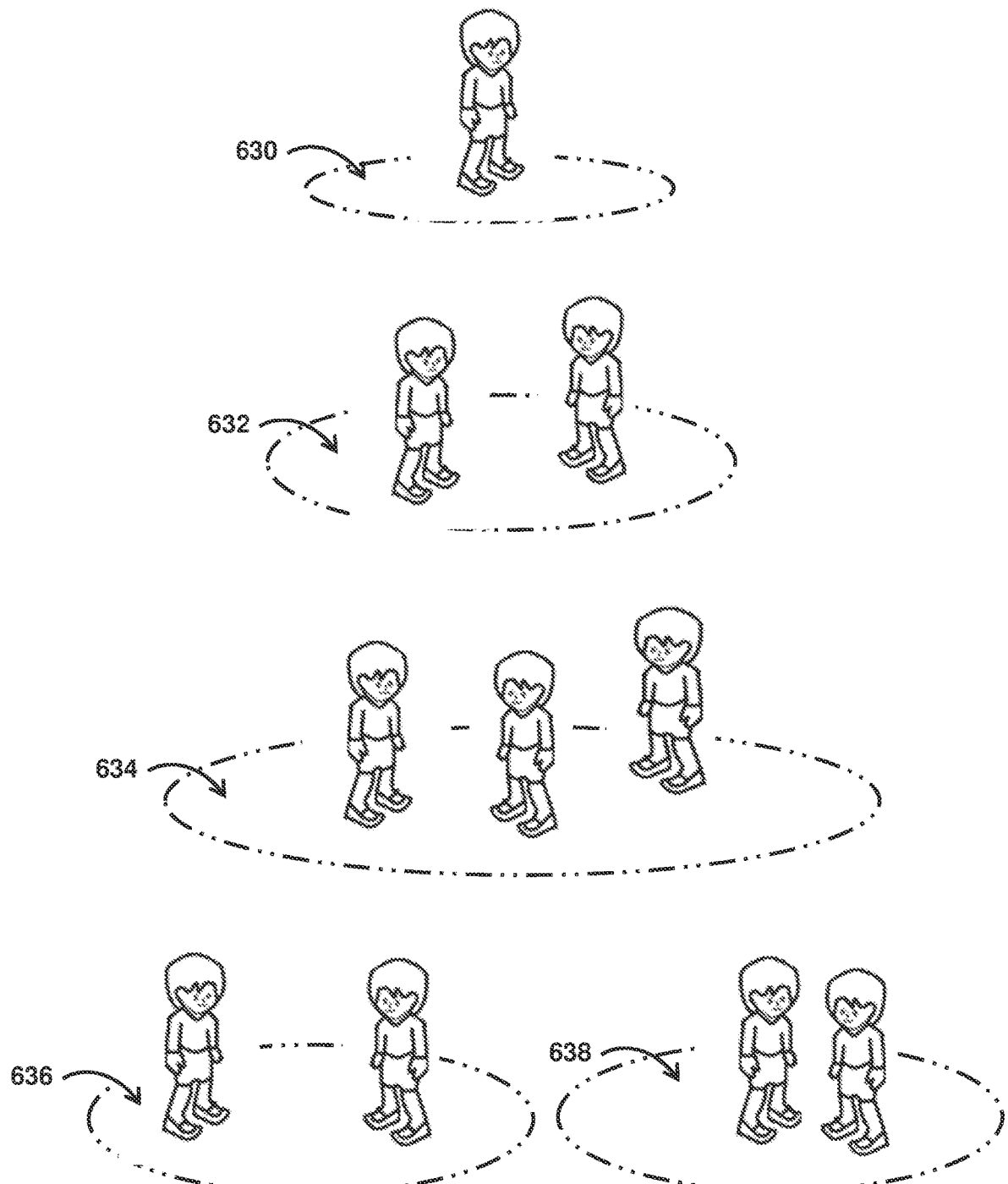

The system may iteratively increase the size of a join area based on a number of avatars that have joined a conversation. For example, as shown in FIG. 6B, join area 634 has increased in size as an additional avatar has joined the conversation. In contrast, as avatars leave the conversation, the size of the join area may be reduced. For example, join area 636 and join area 638 may be smaller than join area 634.

For example, the minimum distance between avatars needed to initiate or maintain a conversation (or a scaling factor of a non-circular join/leave area) may be scaled automatically based on the density of avatars and/or other criteria. For example, the connection distance/area size may be automatically modified to suit different contexts and avatar densities, possibly with some modulating input from users. The system may use auto-scaling connection distances/area sizes to replicate a phenomenon in the physical world where close proximity might be needed for a conversation in a crowded environment, but a conversation with more spread-out participants might be feasible in a more sparsely populated area. In a crowded environment, it may not be desirable to initiate a conversation with more distant participants because of confusion regarding who an individual is addressing. Conversely, in a sparsely populated environment, it may not be desirable to require extremely close proximity between avatars to initiate a conversation, because this may be unintuitive and/or visually unappealing. Without auto-scaling, join/leave areas might feel too small or too large for a given setting/density of avatars—leading to difficulty initiating conversations in sparsely populated environments, and difficult avoiding inadvertent connections in a densely populated environment. Auto-scaling join/leave areas helps ameliorate a problem with chaining, such that unwanted connections are inadvertently created in a crowded environment, which may then lead to even more unwanted connections.

For example, the system may determine a join and/or leave area scaling factor, wherein the join and/or leave area is a (linear or nonlinear) function of overall avatar density in the virtual environment. Alternatively or additionally, the system may determine a join and/or leave area scaling factor as a function of avatar density in one area of a virtual environment, such as the virtual room a user is in or the current area visible on a user's screen. Alternatively or additionally, the system may determine a join and/or leave area scaling factor as a function of avatar density within a conversation to be joined/left. Alternatively or additionally, the system may determine a join and/or leave area scaling factor is a function of any combination. Alternatively or additionally, the system may determine a join and/or leave area scaling factor as a function of any combination of the above, and also a one or more user preferences relating to join and/or leave area size. For example, a user may select an ordinal "large", "medium", or "small" join or leave area, select values on a continuous scale, or nominal join/leave area sizes and/or shapes designed for specific contexts, such as "classroom small groups" or "cocktail party." The user preference for join/leave area size may be set by individual users, by a group of users (e.g., all those in a conversation), or by a manager of a virtual environment or part of a virtual environment. Alternatively or additionally, the system may determine a scaling factor range limit (or minimum/maximum join/leave area size) beyond which the join/leave area is not permitted to scale automatically (e.g., creating a conversation join area that is not too small and/or not too large).

In some embodiments, the system may predict future connections in order to prepare these connections in advance to reduce perceived connection latency once the predicted connections are to be fully initiated. Prediction methods could include machine learning, statistical, or rule-based methods, including enlarged or modified versions of join areas ("pre-join areas") used for proximity-based prediction of future connections.

In some embodiments, the system may generate indicators (e.g., "join indicators") that indicate conversations that may be joined (or may not be joined). The join indicators may appear on a user interface corresponding to an avatar that is not in a conversation. Alternatively or additionally, the system may generate join indicators on user interfaces of all users in a virtual environment. Through the use of join indicators, users may be able to determine which conversations are available and which conversations they will join.

Figure 6C:
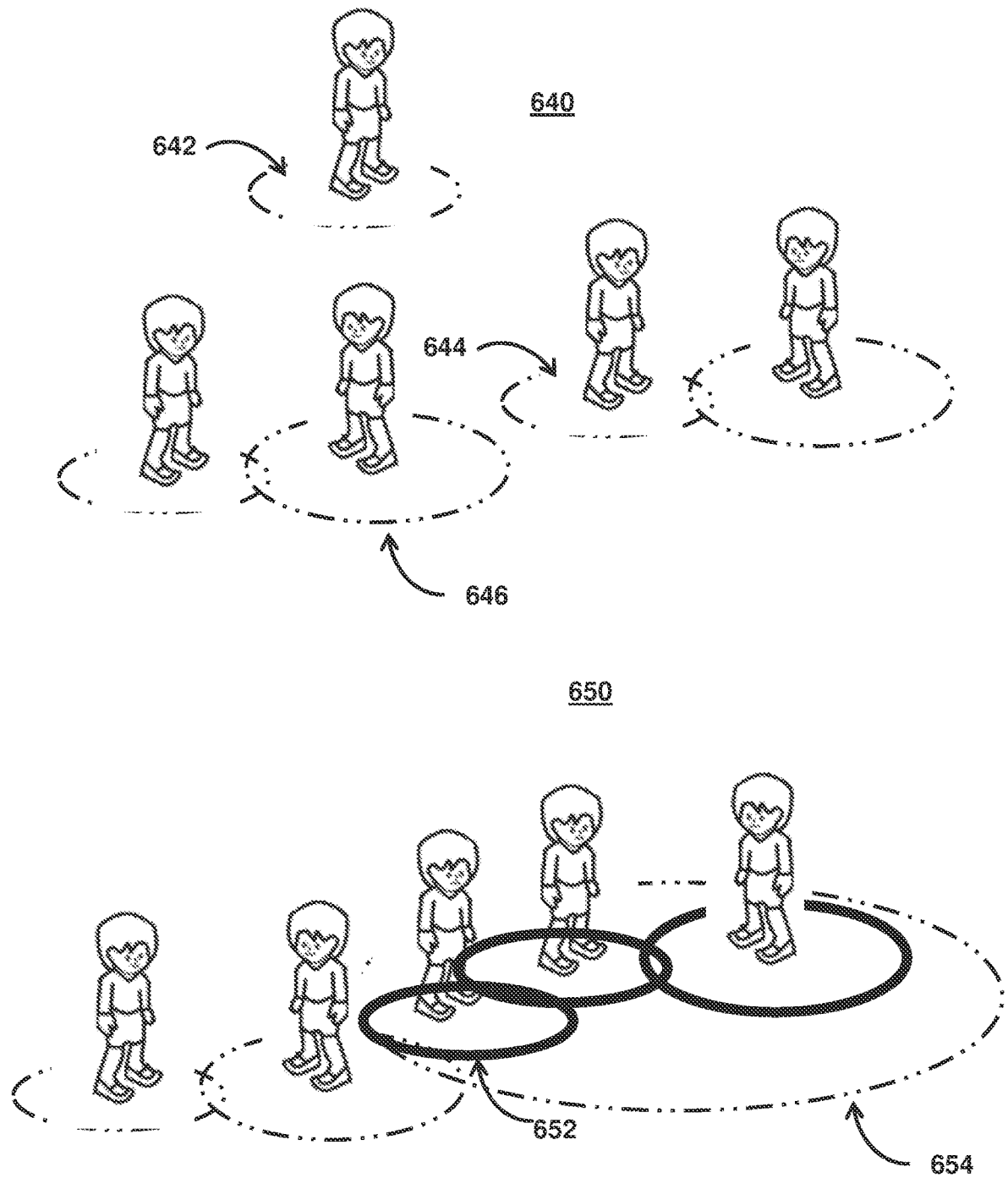

For example, as shown in diagram 640 of FIG. 6C, an avatar (e.g., corresponding to join area 642) is approaching two other join areas (e.g., join area 646 and join area 644). Join area 646 and join area 644 may comprise two distinct conversations. Furthermore, by navigating between them, as shown in diagram 650, an avatar's join area may overlap two different conversations. The system may generate a join indicator (e.g., join indicator 652) that indicates to a user that the avatar has entered a conversation join area (e.g., conversation join area 654) for a conversation. Furthermore, the system may switch the indicator among different conversations. The user may then select which conversation to join. It should be noted that a join indicator may comprise any visual, audio, textual, and/or graphic distinction that allows a user to distinguish between different joining options.

Figure 6D:
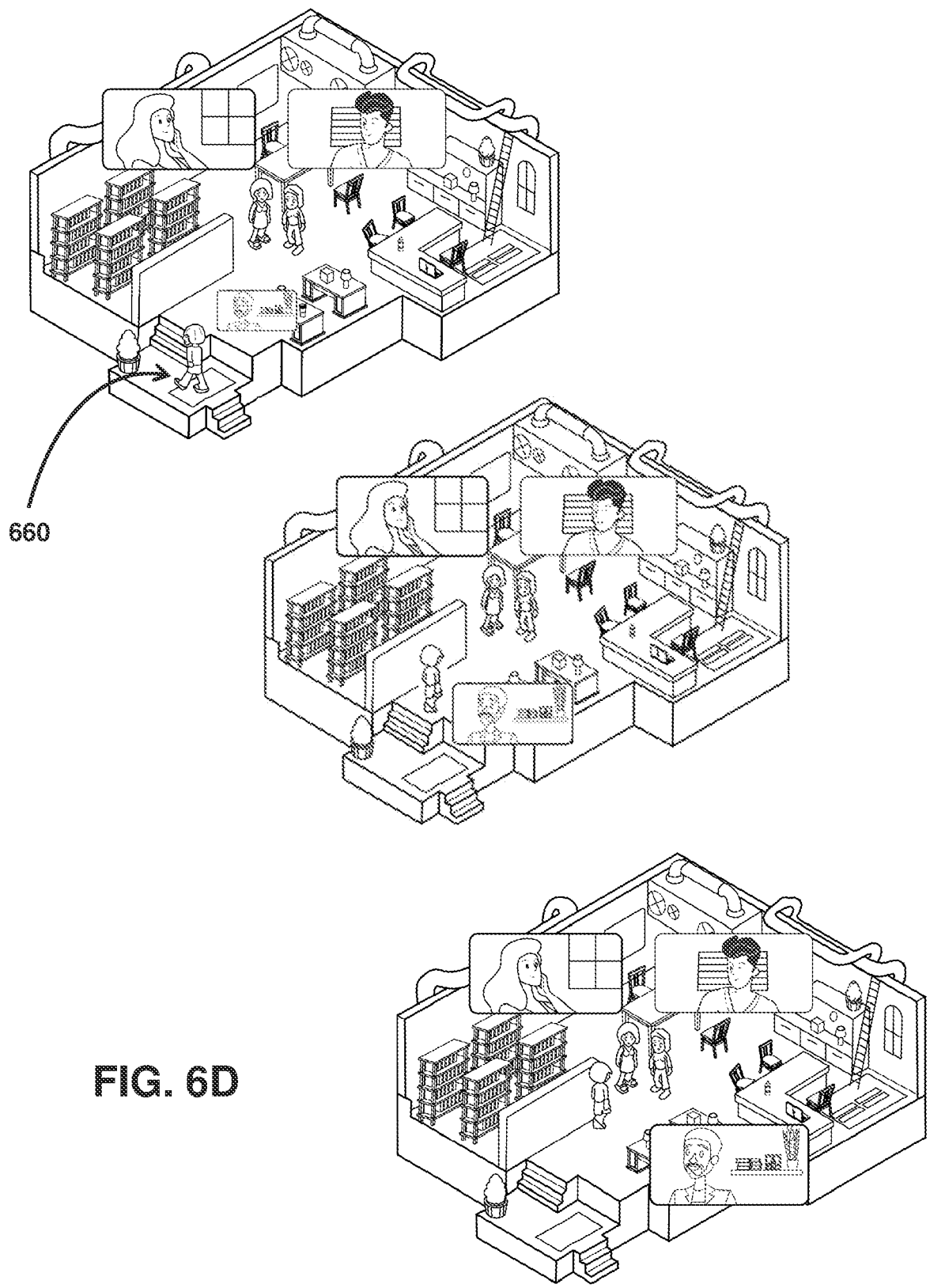

In some embodiments, the join indicator may be dynamically generated and/or change based on current conditions. For example, as shown in FIG. 6D, as avatar 660 approaches a conversation join area, an indicator (e.g., appearing as a video feed of the user corresponding to avatar 660) may graphically alter by increasing in size. Additionally or alternatively, the user corresponding to avatar 660 may view of hear aspects of various conversations (e.g., with different conversation characteristics). For example, the user corresponding to avatar 660 may hear a conversation's audio at a low level to simulating walking into a real-life conversation. Upon joining a conversation, the system may modify the conversation characteristics (e.g., give the user full audio and video information). Additionally or alternatively, the system may remove the join indicator for the user corresponding to avatar 660 on all other user interfaces (e.g., user interfaces of users not party to the conversation).

In some embodiments, all avatars connected to one another are connected to the same set of avatars. For example, if a first avatar is connected to a second avatar, and the second avatar is connected to a third avatar, the first avatar is be connected to third avatar. In this method, a conversation join area is generated based on the positions of all avatars in a conversation, such that any non-connected avatar that enters the join area will join the conversation and be connected to all avatars in that conversation. The join area may be recalculated dynamically, by the system, based on the movement of connected avatars in the corresponding conversation, and when avatars join or leave the conversation. For example, the system may calculate the properties of a two-dimensional shape based on the positions of all avatars currently in a given conversation. As avatars not in the conversation move about the virtual environment, the system may check whether they have passed within this two-dimensional shape—if they have, the system connects them to the conversation.

For example, the system may generate a custom conversation join shape that is smaller than the large and irregular effective join shape created by all of the avatars' proximity radii in a conversation, making it more difficult to inadvertently join a conversation. The shape can be calculated to reflect the overall shape of a group of avatars in conversation, leading to an intuitive mechanic where a non-connected avatar must enter the rough shape formed by the participating avatars of the conversation in order to join. The shape can also be displayed explicitly as a shape projected on the floor of the virtual world, providing a helpful and visually pleasing representation of the area a non-connected avatar must enter to join a conversation. This solves the technical problem in preventing partially overlapping conversations. Additionally, it may be needed to help solve a technical problem with chaining where it is too easy to inadvertently join a conversation with a large number of participants.

The system may use various techniques to calculate the conversation join area. For example, the system may determine that the conversation join area is a convex hull polygon surrounding all of the avatars in a group, generated by one of many algorithms such as Graham's scan as described in Graham, Ronald L. "An efficient algorithm for determining the convex hull of a finite planar set." Info. Pro. Lett. 1 (1972): 132-133, which is hereby incorporated by reference in its entirety. The system may determine that the conversation join area is a concave hull polygon surrounding all of the avatars in the group, generated by one of many algorithms such as α-concave hull as described in Asaeedi, Saeed, Farzad Didehvar, and Ali Mohades. "α-Concave hull, a generalization of convex hull." Theoretical Computer Science 702 (2017): 48-59, which is hereby incorporated by reference in its entirety.

The system may also use parameters dictating the degree of concavity allowed in the chosen shape (e.g., the alpha parameter in α-concave hull) may be constant or auto-scaled based on factors such as local avatar density or density of avatars in the conversation and/or virtual environment.

The system may determine that the conversation join area is a polygon generated by either of the above methods, with rounded corners (e.g., using Bezier curves) or following some other smoothing operation. The system may determine that the conversation join area is scaled in size by a scaling factor (e.g., total size multiplied by 1.1, such that a small area outside each outlying avatar is included, or by 0.9, such that outlying avatars are excluded from the join area while still remaining in the conversation).

The system may determine that the conversation join area is scaled up or down in size by an amount such that the edges of the polygon do not pass within a minimum fixed distance of outlying avatars that formed vertices of the original polygon. The fixed distance can be enforced to create a polygon smaller or larger than the original polygon by the fixed amount.

The system may determine that the conversation join area is a circle or ellipse with a center calculated by some measure of central tendency (such as the mean ("centroid") or median of all avatar x values and mean or median of all y values in a cartesian system), and a size, eccentricity, and orientation based on measures of spread around the measure of central tendency (such as multiples of a calculated standard distance, which may be a two-dimensional equivalent of a standard deviation, to form a circle, or ellipses generated by principal component analysis).

The system may determine that the conversation join area shape is the total area covered by all of the participants' initial join shapes (as in chaining), but with some modification to the join shapes, which may or may not depend on their position within the conversation or other factors such as the number or spatial density of avatars in the conversation or surrounding area. For example, avatars' initial join shapes may be scaled down in size by some factor once they are in a conversation. As another example, avatars' initial conversation join area shapes may be scaled in size by a factor linearly or nonlinearly dependent on their distance from a point calculated by a measure of central tendency of the conversation as a whole (e.g., centroid), possibly such that more outlying avatars in the conversation have more scaled-down join shapes that contribute to the conversation's overall join shape.

In some embodiments, if only two avatars are in a conversation, a conversation join area shape may be composed of the combined initial/independent join areas of the two avatars (which may be circles, or distance as a function of angle relative to direction facing as detailed below, etc. other shapes for individual avatars) or an ellipse with foci at the positions of the two avatars.

In some embodiments, the system may set a maximum dimension of the conversation join area such that it is limited in size by an absolute or autoscaling value (e.g., scaled by size of virtual environment or avatar density within the virtual environment or the present conversation) or by instituting a time delay to join, such that a first avatar may be connected to a group of avatars only after staying within the group's join area for a certain amount of time. The amount of time needed may be a function of the avatars in the group. This makes it less likely that an avatar will inadvertently connect to a large group of avatars, if it is only briefly within the join area.

Figure 7A:
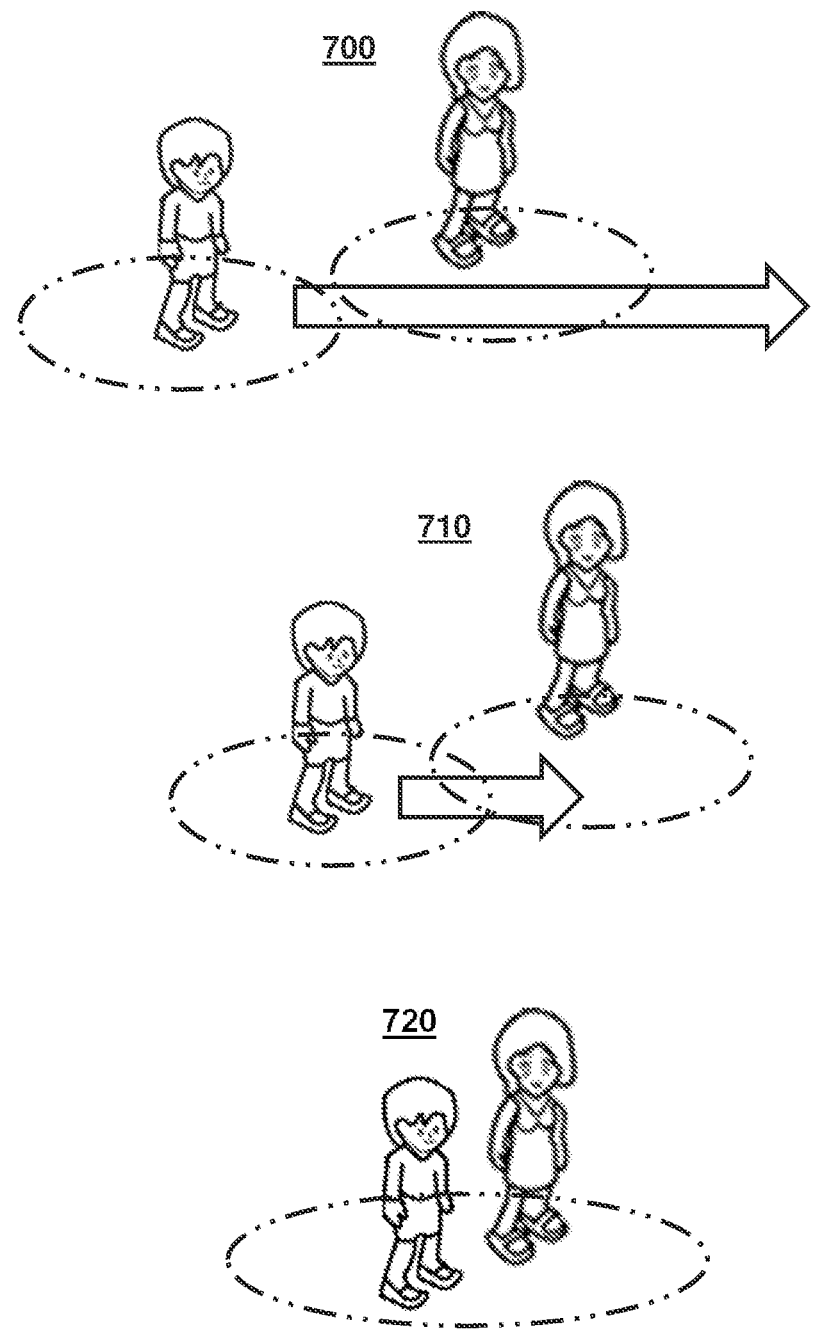
FIGS. 7A-C show illustrative diagrams related to avatar connections based on motion, in accordance with one or more embodiments.
Figure 7B:
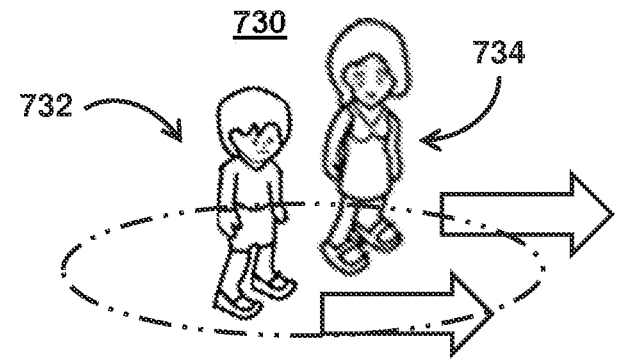
Figure 7B:
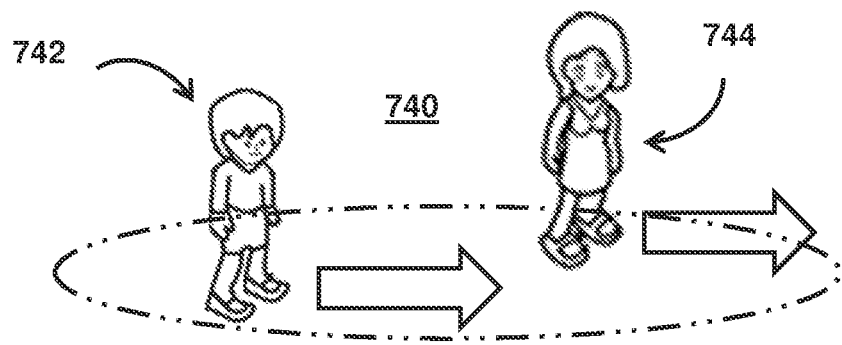
Figure 7B:
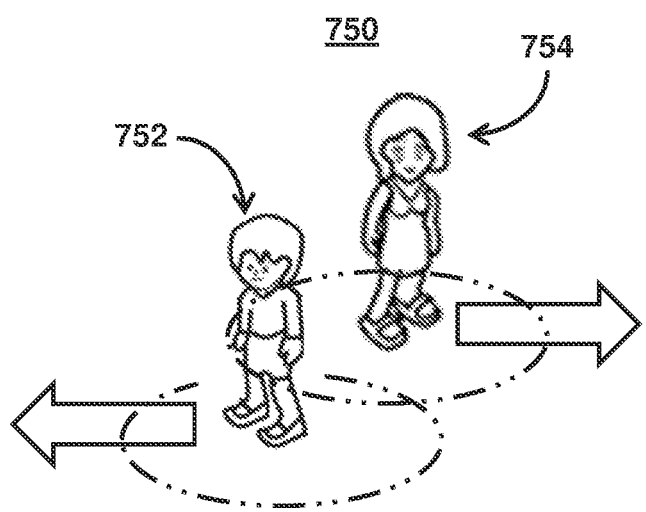
Figure 7C:
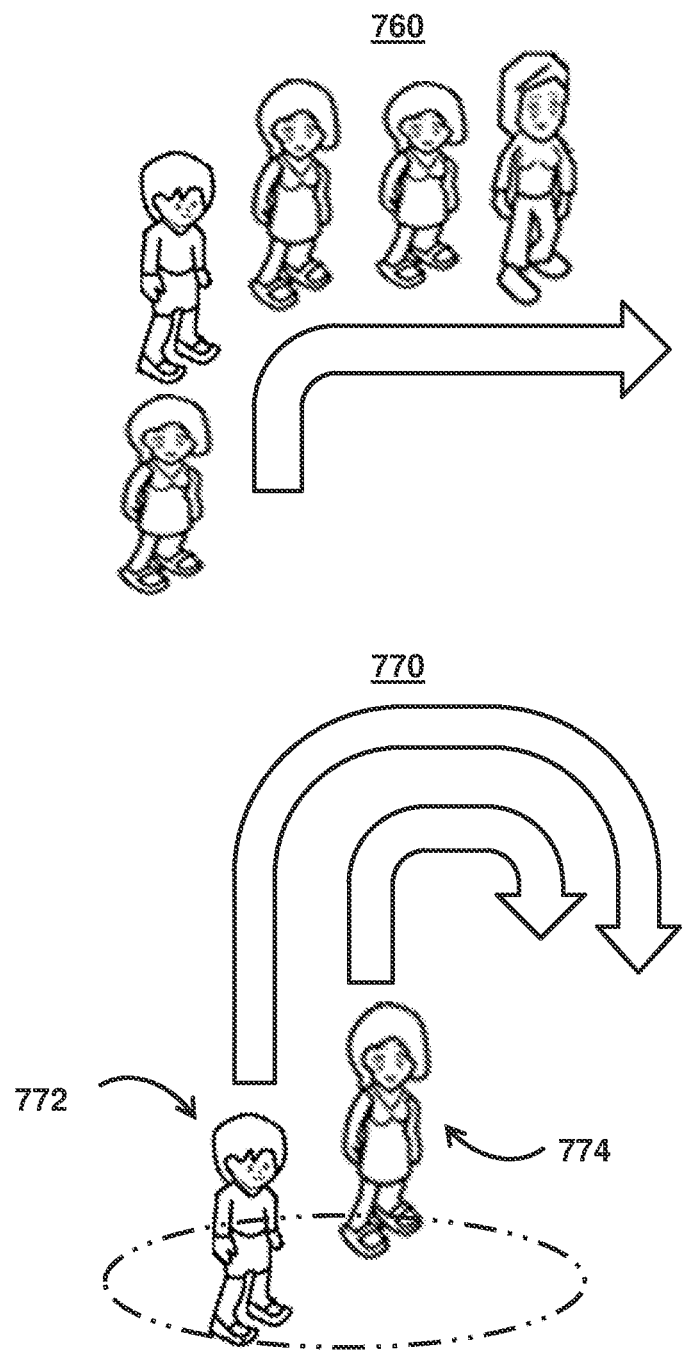

FIGS. 7A-C show illustrative diagrams related to avatar connections based on motion, in accordance with one or more embodiments. For example, the system may monitor the motion of avatars in the virtual environment, and initiative conversations only in instances when the motion of an avatar indicates that a connection is likely wanted.

For example, as shown in FIG. 7A, an avatar may remain in motion through the join area of another avatar (e.g., as shown in diagram 700) without initiating a conversation. However, if the avatar stops in the join area (e.g., the velocity of the avatar is zero) as shown in diagram 710, the system may initiate a conversation as shown in diagram 720.

For example, the system may determine that an avatar may only be newly connected to another avatar while the avatar (or both avatars) is motionless. The system may perform this by determining whether avatars meet conversation initiation criteria (e.g., join distance, join area, trajectory) to be connected to one another only for avatars that are not in motion. Alternatively or additionally, the system may preclude any new connections among a set of avatars in which one or more is in motion. For example, the system may determine translational motion (as opposed to rotational motion) is "motion" that precludes new connections. The system may calculate translational motion based on velocity of an avatar in the virtual environment. The system may use rotational motion (e.g., indicating that an avatar is changing a direction it is facing) to determine whether to add rotating avatar to a conversation or an avatar, near a rotating avatar in a group, to the group. The system may also allow join events for other types of motion (e.g. an animation of an avatar eating) or preclude based on other motion (e.g., an animation of an avatar using a cell phone).

As shown in FIG. 7B, the system may also determine motion-based disconnections. For example, as shown in diagram 730, avatar 732 and avatar 734 may maintain a conversation while in motion if both avatars are moving in close proximity and/or in the same direction. For example, the system may ensure that avatars may only be disconnected from one another when moving or when moving in certain directions. For example, once a connection between a set of avatars has been initiated (e.g., a conversation initiated), the system does not end the connection or evaluate whether the connection should be ended in the absence of any movement by any of the connected avatars. The system may do this regardless of any movements or disconnections of avatars outside the conversation. If one or more of the avatars in the conversation move, the system may perform calculations based on the direction of avatar movement to determine whether disconnection should occur. By doing so, the system ensures that connections between avatars are more stable/persistent once initiated, with disconnection between any two avatars requiring movement by at least one of them (e.g., two avatars cannot be disconnected from each other purely due to movement of a third avatar). This also helps to minimize disruptions caused by avatars joining and leaving conversations.

By doing so, the system may limit the number of inadvertent conversations. For example, a first avatar walking past a second avatar without stopping does not initiate a potentially unwanted conversation—avatars can travel through a crowded space without connecting to/disconnecting from a series of video calls, which might be socially undesirable while also wasting computational resources. Only allowing new connections among translationally stationary avatars may improve software efficiency and performance, such that the presence/absence of new connections must only be determined computationally for the subset of avatars that are not in translational motion. For example, if new connections between avatars are allowed while one or more of the avatars are in motion, this increases the likelihood of inadvertent or unwanted connections—especially when an avatar is passing through an area without any intention of stopping for a conversation. These inadvertent connections would be especially disruptive in a chaining or conversation group-based join area system, where inadvertent proximity to one avatar could cause a connection with a large number of other avatars connected to it.

In some embodiments, the system may maintain the conversation if the avatars (e.g., avatar 742 and avatar 744 maintain the same trajectory and are within a conversation join area (which may move with the avatars) as shown in diagram 740.

However, if the avatars move in opposite directions or trajectories as in diagram 750, the system may end a conversation between the avatars (e.g., avatar 752 and avatar 754). For example, the system may disconnect a first avatar (e.g., a first user) from a second avatar only if moving away from the second avatar's position or a point representing the center (e.g., centroid) of the second avatar's join or leave area, with "away" defined as a direction offset from a direction directly toward the second avatar's position or join or leave area center by greater than some constant or variable angle (e.g., 90 degrees or more).

Additionally or alternatively, the system may disconnect a first avatar (e.g., a first user) from a group of other avatars only if moving away from a point representing the center of the group of others, such as a measure of central tendency incorporating the position of all avatars in that group, or a point representing the center of that group's join or leave area(s).

Additionally or alternatively, the system may disconnect a first avatar (e.g., a first user) from a group of avatars only if moving away (same definition of "away" as above) from a certain number or percentage of avatars in that group. In one embodiment, moving away from one or more avatars in the group is sufficient to consider disconnection based on other criteria, and in another embodiment, an avatar must be moving away from all members of the group simultaneously in order to consider disconnection (or anything in between, e.g., moving away from 50% or more of group members enables disconnection).

As shown in FIG. 7C, the system may also use automatic movement (e.g., movement with user input) of avatars to maintain cohesion between avatars in a conversation. For example, the system may detect avatars that are already in conversation with each other, but who cease to meet certain criteria for remaining connected (e.g., a distant pair of avatars that formerly had a chain of avatars between them in a chaining paradigm). In response, the system may automatically move the avatars closer to one another to maintain the connection between them and/or to maintain the appearance of being in close enough proximity to be in conversation with one another.

The system may do this by determining whether connected avatars meet some criteria for being disconnected (e.g., conversation maintenance criteria) from one another, but should not actually be disconnected based on additional criteria. For example, the system may initiate an automatic movement of one or both of the avatars such that they move to a position where they will no longer meet the criteria for being disconnected from one another. If the user of an avatar initiates a movement while the avatar is moving automatically, the system may override the automatic movement and make the movement indicated by the user's input instead.

By doing so, the system provides a way for avatars who remain in conversation with one another, but might be distant from one another due to a former chain or group-based join area, to restore the outward appearance of being in proximity to one another, allowing other parties to infer that they remain in conversation.

For example, the system may move avatars such that they follow one another as shown in diagram 760. For example, when an option is enabled for a first avatar, if the first avatar is connected to a second avatar and the second avatar makes a movement that takes it beyond a certain threshold distance of the first avatar (e.g., related to distances specified in conversation maintenance criteria) or outside the leave area for that avatar, the system may initiate an automatic movement of the first avatar towards the second avatar, or in the same direction as the second avatar, to avoid exiting the leave area of the second avatar. If movement is directed towards the second avatar, the first avatar may continue orienting/moving toward the second avatar, with its direction updated dynamically, as long as the second avatar is moving away from the first avatar. By doing so, the system enables avatars to remain in conversation with one another as they move about a virtual environment together, with one avatar controlling the movement of the entire group.

For example, the system may determine that when one avatar in a connected group moves as a result of user input, the other avatars (at least, those who have the option enabled) are moved automatically in the same direction immediately.

The system may determine that when one avatar in a conversation moves as a result of user input, the other avatars move towards that avatar immediately. Alternatively, the system may not move the other avatars immediately, but instead move them when the initially moving avatar moves far enough that conversation maintenance criteria may not be met. Additionally or alternatively, the system may determine that when multiple avatars in a conversation move as a result of user input simultaneously, each avatar makes movements towards or in the same direction as the initially moving avatar that is closest to them.

For example, the system may interpret multiple user inputs from multiple users that are the same to help route avatars. In one example, the system may determine that when multiple avatars in a conversation move as a result of user inputs simultaneously, the other avatars in the group move towards whichever avatar started to move first. In another example, the system may determine that when multiple avatars in a connected group move as a result of user input simultaneously, the other avatars in the group move towards the avatar previously designated as having priority over other moving avatars through some ranking or leadership system.

Additionally or alternatively, a user may select to have the system cause their avatar to follow another avatar, and/or the user may select to have the system cause a prompt for other users to follow their avatar.

In some embodiments, the system automatically moves (e.g., without user input), connected avatars who meet conversation initiation criteria and/or conversation maintenance criteria, toward a calculated center of their positions (e.g., a mean (centroid) or median of vector position components), until they are within a certain threshold distance of at least one other avatar in the group, or until user input overrides this action.

In some embodiments, the system may maintain a spatial arrangement of avatars in a conversation. For example, avatar 772 and avatar 774 take differing routes, but may maintain the spacing and trajectory relative to each other; therefore, simulating how users would "walk and talk" in real-life situations. For example, the system may automatically move, connected avatars and/or orient them toward a calculated center of their positions (or each other) until they meet criteria to initiate a new connection with each other (e.g., they are within each others' join areas) or until a user input overrides this action. Additionally or alternatively, the system may maintain the existing connection rather than initiating a new connection.

Figure 8:
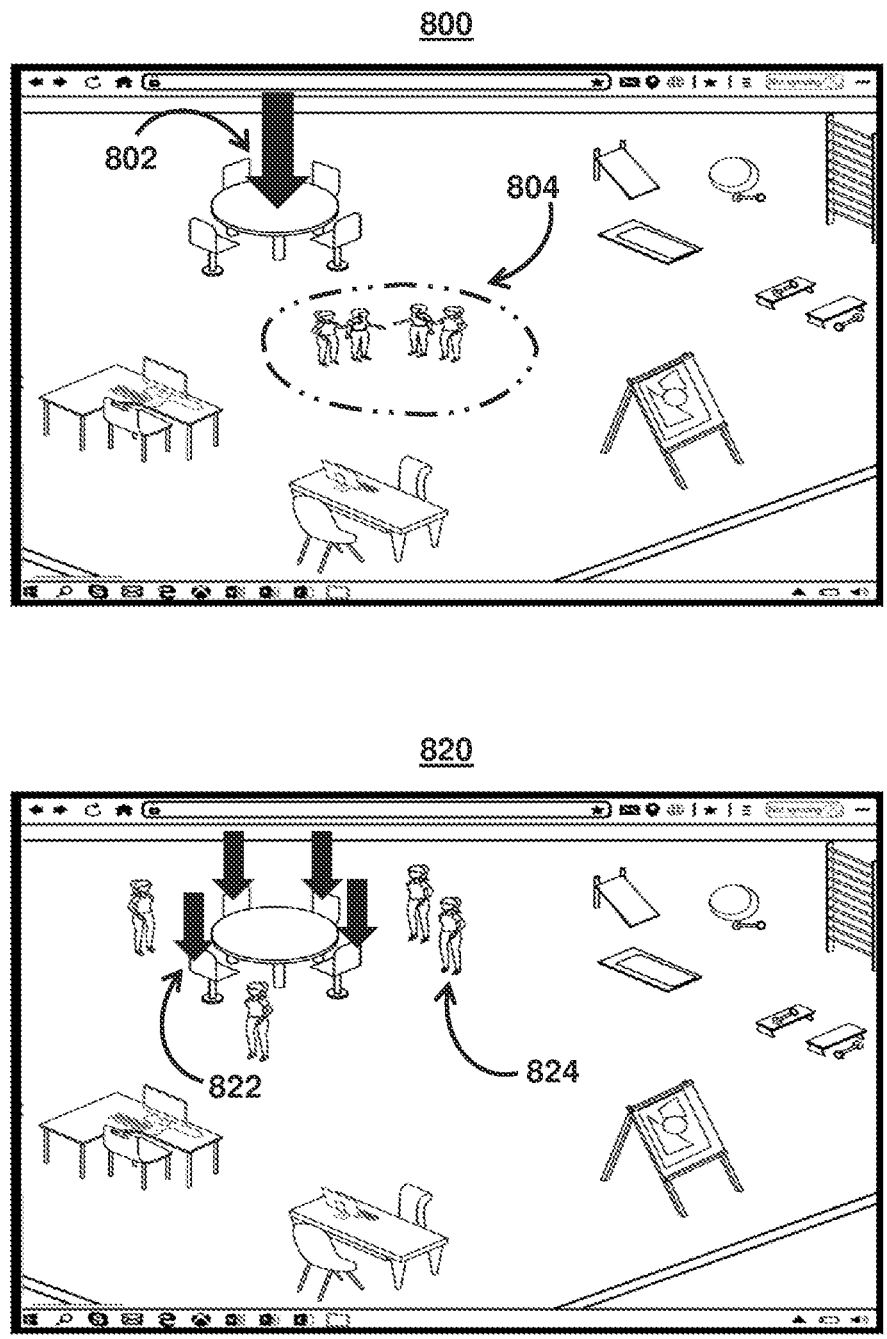
FIG. 8 shows illustrative user interfaces related to external avatar control and situational dynamics, in accordance with one or more embodiments.

FIG. 8 shows illustrative user interfaces related to external avatar control and situational dynamics, in accordance with one or more embodiments. For example, while the system may support users navigating avatars about a virtual environment in order to initiate conversations, the system may also allow one or more users to select (e.g., via auxiliary input devices such as a mouse, touchpad, etc.) one or more avatars for automatic inclusion in a conversation. The system may also support the automatic movement of the avatars in the virtual environment in order to maintain the immersion of the user. For example, the system may provide several methods for selecting a group of avatars, for inclusion in a private conversation or any other activity (e.g., transport to another location, inclusion in a game or other activity, invited to an event, send a message, send requested to follow an avatar, etc.). The system may provide these via a user interface that enables one or more avatars in a virtual environment to be selected simultaneously.

By providing this functionality, the system may more rapidly initiate specific interactions (e.g., beyond automatically connecting to conversations via avatar interactions) with multiple users and do so with interactions beyond a single avatar at a time. Notably, conventional platforms have no intuitive and/or expedient way to engage multiple avatars in a shared activity in the context of avatar video chat without the presence of a virtual structure (e.g. table, conference room), beyond automatically initiating communications based on proximity or other factors. Being able to precisely and quickly select multiple avatars is particularly important for initiating a private conversation within a public setting.

For example, as shown in user interface 800, a group of avatars (e.g., group 804) may be selected. Furthermore, the system may also receive a user selection of an object or position within the virtual environment to act as a conversation position. In some embodiments, the system may tag (e.g., using metadata) different objects within the virtual environment to act as conversation position and/or conversation join areas. For example, as shown in user interface 800, the system has received a user input select object 802 (e.g., a table) as a conversation position. Accordingly, group 804 is automatically (e.g., without further user input) included in a conversation, and the avatars of group 804 are automatically navigated to object 802.

For example, the system may receive manual user selections, cumulative selections of one or more avatars, selections of a group of avatars in a particular vicinity (e.g., by clicking or tapping on the avatars), and/or determine a group based on the selections. Alternatively or additionally, the system may receive a shape with pre-set properties (e.g., such as a selection box or selection ellipse) drawn on the screen by a user using a pointing device (e.g., mouse, stylus, finger, etc.), such that avatars within the shape are selected. The system may also receive a freeform shape that is drawn on the screen by the user using a pointing device, such that all avatars within a closed shape are selected. Additionally, the system may enable drawing a freeform shape, such that if the shape is not closed, a straight or curved line is inferred from the two ends of the line that was drawn to create a closed shape, within which all avatars will be selected. The system may also enable drawing a freeform line on the screen with a pointing device, such that any shapes representing avatars that the line touches (or passes within a small threshold distance of) are selected. The system may then allow a user to de-select of a subset of avatars that are already selected. The system may also allow for a combination of selection means. For example, all avatars in a current conversation may be selected by default when a conversation (or an avatar in a conversation) are selected.

Additionally, as shown in user interface 820, the system may provide interactive elements for maintaining the immersion of the user. For example, in response to object 802 being selected as a conversation point, the system may retrieve metadata for object 802. The metadata may include instructions for avatars that are using object 802 as a conversation position. The metadata may indicate sub-positions for arranging avatars at the conversation position and/or within a conversation join area. For example, the sub-positions may indicate predetermined spatial arrangements, densities, etc. The sub-positions may also correspond to other objects (or portions of an object) in the virtual environment. For example, as shown in user interface 820, the system may determine that object 802 includes various sub-positions (e.g., shown as chairs). The system may then automatically navigate the avatars (e.g., avatar 822 and avatar 824) to the sub-positions (e.g., including generating customized navigation instructions to allow each avatar to be automatically navigated to a respective sub-position). The system may also determine a number of sub-positions and correlate those sub-positions with the avatars in group 804. Accordingly, the number of sub-positions (e.g., as visualized in the virtual environment) may correspond to one or more conversation initiation criteria. That is, upon all chairs (i.e., sub-positions) being occupied by an avatar, the system may close the conversation and prevent other avatars/users from joining. Additionally, subsequent user inputs to allow for more users to join may also trigger corresponding animation and/or modification to the virtual environment (e.g., adding additional chairs, transitioning to a different virtual environment (e.g., a larger conference room setting), and/or allowing for standing participants).

Figure 9:
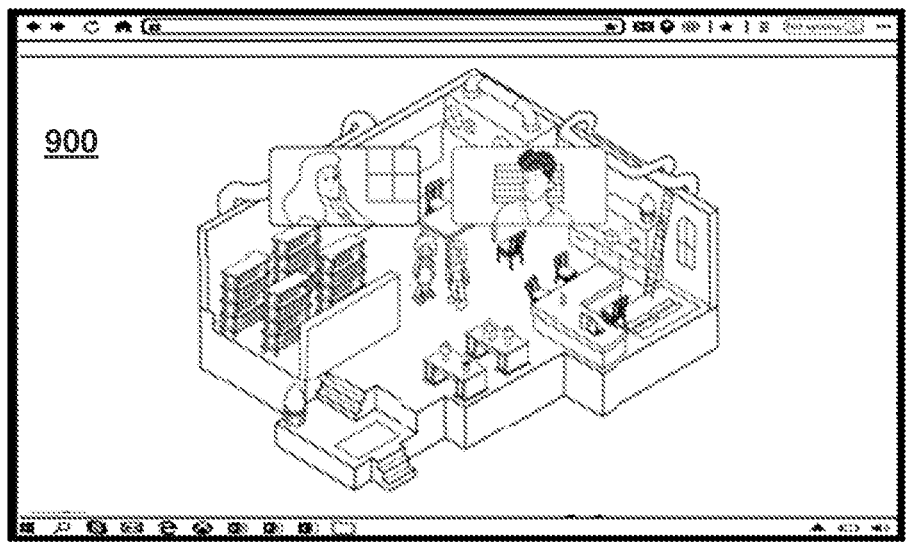
FIG. 9 shows illustrative user interfaces related to maintaining conversations between users, in accordance with one or more embodiments.
Figure 9:
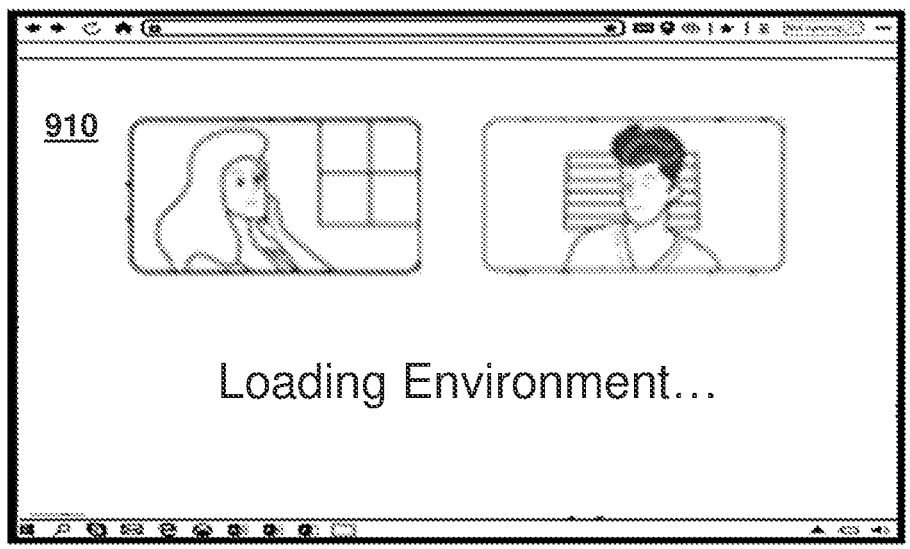
Figure 9:
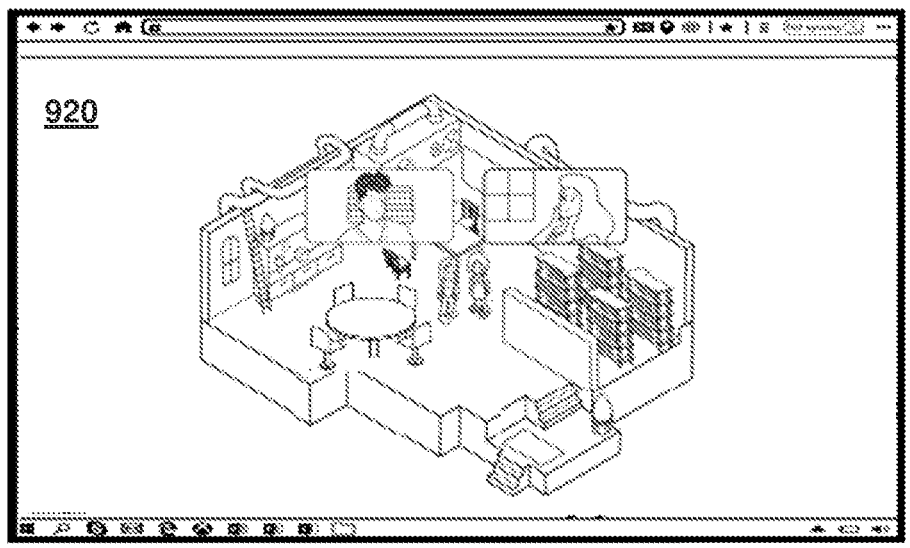

FIG. 9 shows illustrative user interfaces related to maintaining conversations between users, in accordance with one or more embodiments. FIG. 9 shows user interface 900, user interface 910, and user interface 920. For example, user interface 910 may represent a user interface after a conversation has been presented. That is, two users (as represented by the respective video windows) are currently engaged in a conversation (e.g., based on the proximity of the avatars of the two users). While connected in the conversation, the two users may exchange communications.

The system may also enable the users to make additional modifications to the virtual environment and/or switch to another virtual environment. For example, after initiating the conversation between the first user and the second user, the system may generate for display the peer-to-peer livestream communication between the first user and the second user. The peer-to-peer livestream communication between the first user and the second user may comprise a simultaneous display of a first video feed of the first user and a second video feed of a second user. The first video feed and the second video feed are overlaid on the first virtual environment.

During the conversation, the users may wish to transition to another virtual environment or may wish to generate modifications to the current virtual environment. For example, a first user may select (e.g., via a menu), through an inputted command, and/or a selection of an object within the virtual environment. The user input may cause the system to maintain the conversation and cause a transition to a second virtual environment or a modification to a current environment. For example, a first user may wish to add a table to a current virtual environment.

The transition to a different virtual environment or the modification to a current virtual environment may require loading of additional assets. For example, the system may generate a loading screen (or an icon corresponding to loading) when loading the second virtual environment as shown in user interface 910.

However, as opposed to conventional systems, the system maintains the first and second video feed while the second virtual environment is loading. Accordingly, the first and second user may continue to exchange communications while the second virtual environment is loading. The system may then generate for simultaneous display the second virtual environment (as shown in user interface 920) with the first and second video feeds maintained. For example, the first video feed and the second video feed are overlaid on the second virtual environment.

Figure 10:
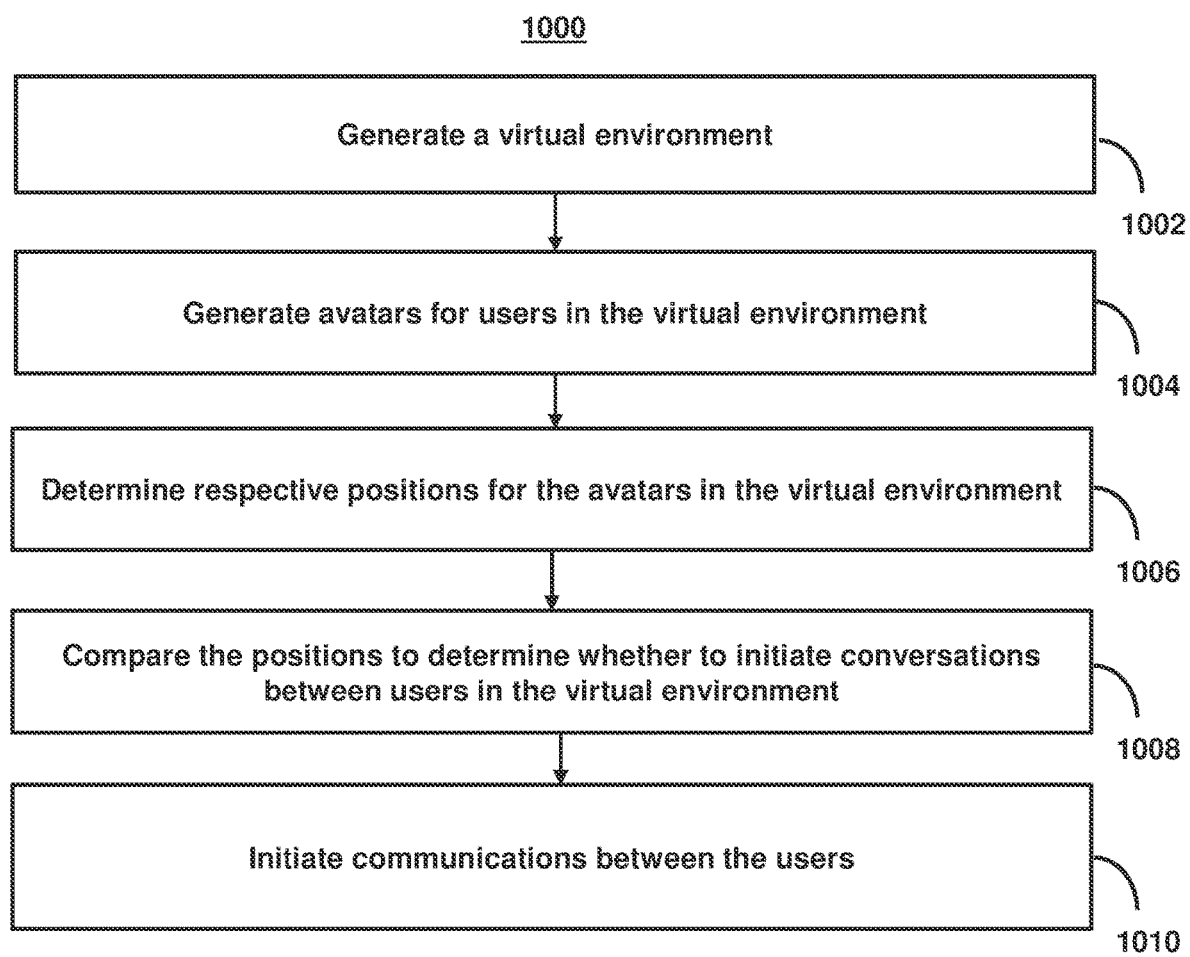
FIG. 10 shows a flowchart of the steps involved in generating communications between users in a virtual environment, in accordance with one or more embodiments.

FIG. 10 shows a flowchart of the steps involved in generating communications between users based on proximity-based criteria for avatars within a first virtual environment. For example, the system may trigger peer-to-peer livestream communications between users based on proximity-based criteria for avatars within a first virtual environment that correspond to the users.

At step 1002, process 1000 (e.g., using one or more components described in system 300 (FIG. 3)) generates a virtual environment. For example, the system may generate for simultaneous display a first virtual environment on a first user interface and a second user interface, wherein the first user interface corresponds to a first user, wherein the second user interface corresponds to a second user, and wherein the first user is located remotely from the second user. For example, the system may generate a virtual environment that multiple users in remote physical locations may access and interact with each other in real time.

At step 1004, process 1000 (e.g., using one or more components described in system 300 (FIG. 3)) generates avatars for users in the virtual environment. For example, the system may generate for display a first avatar in the first virtual environment, wherein the first avatar corresponds to the first user. The system may also generate for display a second avatar in the first virtual environment, wherein the second avatar corresponds to the second user. For example, the system may generate a plurality of avatars, in which each avatar corresponds to a user. The system may allow users to move their avatars through the virtual environment to interact with each other.

At step 1006, process 1000 (e.g., using one or more components described in system 300 (FIG. 3)) determines respective positions for the avatars in the virtual environment. For example, the system may determine, for the first avatar, a first position in the first virtual environment. The system may also determine, for the second avatar, a second position in the first virtual environment. The system may then determine one or more join areas based on the first position or the second position.

For example, the system may determine the one or more join areas based on the first position or the second position further by retrieving a first user profile for the first user, retrieving a first join area criterion for the first user, retrieving an environment rule for the first virtual environment, and determining a size or shape of a first join area based on the first join area criterion and the environment rule. In another example, the system may determine the one or more join areas based on the first position or the second position by determining a direction of movement for the first avatar, retrieving a first join area criterion for the first user, retrieving an environment rule for the first virtual environment, and determining a size or shape of a first join area based on the first join area criterion and the environment rule.

In another example, the system may determine the one or more join areas based on the first position or the second position by retrieving a first join area criterion for the first user; retrieving an environment rule for the first virtual environment; determining a grid map of the first virtual environment based on the environment rule, wherein the grid map defines a plurality of cells that comprise the first virtual environment and one or more cell properties for each cell of the plurality of cells; and determining a subset of cells in the grid map that comprise a first join area based on the first position, the first join area criterion, and the one or more cell properties for each cell of the plurality of cells in the grid map.

In some embodiments, determining a position of an avatar may also include determining a direction of the avatar and monitoring for whether the avatar has stopped moving. For example, the system may determine, for the first avatar, the first position in the first virtual environment by receiving a second user input, wherein the second user input causes the first avatar to navigate about the first virtual environment, determining that the first avatar is no longer navigating about the first virtual environment, and determining the first position in the first virtual environment in response to determining that the first avatar is no longer navigating about the first virtual environment.

At step 1008, process 1000 (e.g., using one or more components described in system 300 (FIG. 3)) compares the positions to determine whether to initiate conversations between users in the virtual environment. For example, the system may compare the one or more join areas to one or more conversation initiation criteria to determine whether to initiate a conversation between the first user and the second user. In some embodiments, the system may determine a distance between the avatars and/or whether join areas for avatars are overlapping. For example, the system may determine the one or more join areas based on the first position or the second position by determining a distance between the first position and the second position. The system may then compare the one or more join areas to the one or more conversation initiation criteria to determine whether to initiate the conversation between the first user and the second user. The system may retrieve a threshold distance for initiating the conversation. The system may then compare the distance to the threshold distance to determine whether the distance is equal to or within the threshold distance. In another example, the system may determine the one or more join areas based on the first position or the second position by determining a first radial-based join area about the first position and a second radial-based join area about the second position. The system may then compare the one or more join areas to the one or more conversation initiation criteria to determine whether to initiate the conversation between the first user and the second user further by retrieving a threshold overlap area for initiating the conversation, determining an overlap area between the first radial-based join area and the second radial-based join area, and determining whether the overlap area equals or exceeds the threshold overlap area.

At step 1010, process 1000 (e.g., using one or more components described in system 300 (FIG. 3)) initiates communications between the users. For example, the system may initiate the conversation between the first user and the second user, wherein the conversation comprises a peer-to-peer livestream communication between the first user and the second user in response to determining to initiate the conversation between the first user and the second user.

The system may also perform additional operations to either maintain the conversation or end the conversation. For example, after initiating the conversation between the first user and the second user, the system may generate for display the peer-to-peer livestream communication between the first user and the second user. The peer-to-peer livestream communication between the first user and the second user may comprise a simultaneous display of a first video feed of the first user and a second video feed of the second user, and the first video feed and the second video feed are overlaid on the first virtual environment. The system may then receive a user input, wherein the user input maintains the conversation and causes a transition to a second virtual environment. The system may then load the second virtual environment. While the second virtual environment is loading, the system may maintain the simultaneous display of the first video feed and the second video feed. The system may then generate for simultaneous display the second virtual environment on a first user interface and a second user interface, wherein the first video feed and the second video feed are overlaid on the second virtual environment.

Additionally or alternatively, after initiating the conversation between the first user and the second user, the system may receive a user input causing the first avatar to navigate about the first virtual environment. The system may then determine, for the first avatar, a new position in the first virtual environment. The system may determine one or more join areas based on the new position or the second position. The system may then compare the one or more join areas to one or more conversation maintenance criteria to determine whether to maintain the conversation between the first user and the second user.

Additionally or alternatively, the system may add additional users to the conversation via chaining. For example, the system may generate for simultaneous display the first virtual environment on a third user interface, wherein the third user interface corresponds to a third user. The system may then generate for display a third avatar in the first virtual environment, wherein the third avatar corresponds to the third user. The system may then determine, for the third avatar, a third position in the first virtual environment. The system may determine a third join area based on the third position. The system may then compare the third join area to the one or more conversation initiation criteria to determine whether to add the third user to the conversation.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to other embodiments described herein could be used to perform one or more of the steps in FIG. 10.

Figure 11:
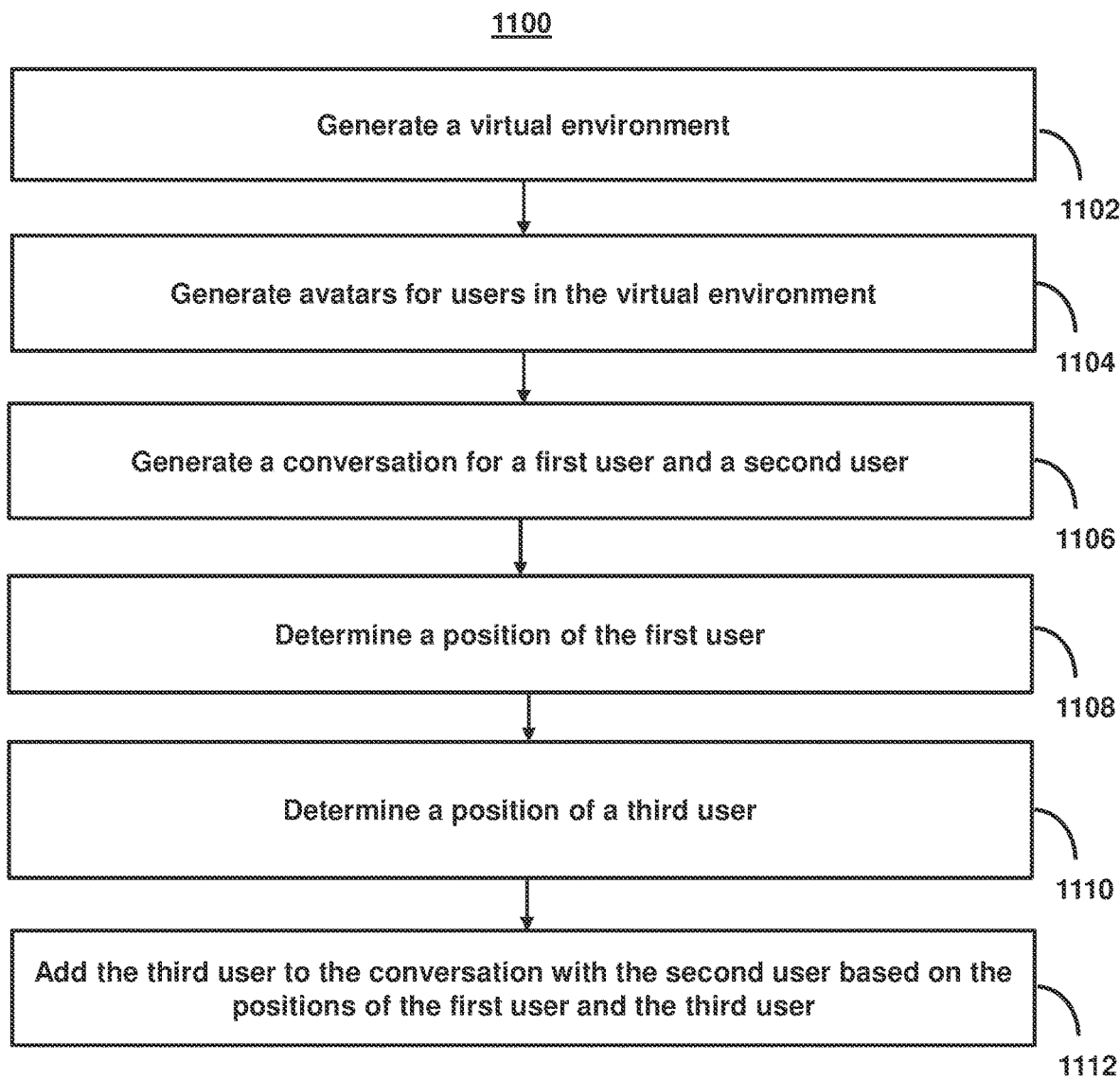
FIG. 11 shows a flowchart of the steps involved in chaining avatars together in a virtual environment to enable communications between users, in accordance with one or more embodiments.

FIG. 11 shows a flowchart of the steps involved in chaining avatars together in a virtual environment to enable communications between users, in accordance with one or more embodiments. For example, process 1100 may comprise steps for triggering peer-to-peer livestream communications between users based on preexisting relationships between avatars within virtual environments.

At step 1102, process 1100 (e.g., using one or more components described in system 300 (FIG. 3)) generates a virtual environment. For example, the system may generate for simultaneous display a first virtual environment on a plurality of user interfaces, wherein a respective user interface of the plurality of user interfaces is accessible to each of a first user, a second user, and a third user, wherein the first user, the second user, and the third user are located remotely from each other.

At step 1104, process 1100 (e.g., using one or more components described in system 300 (FIG. 3)) generates avatars for users in the virtual environment. For example, the system may generate for display, in the first virtual environment, a first avatar corresponding to the first user, a second avatar corresponding to the second user, and a third avatar corresponding to the third user.

At step 1106, process 1100 (e.g., using one or more components described in system 300 (FIG. 3)) generates a conversation for a first user and a second user. For example, the system may generate for display on the respective user interfaces for the first user and the second user a conversation, wherein the conversation comprises a peer-to-peer livestream communication between the first user and the second user.

At step 1108, process 1100 (e.g., using one or more components described in system 300 (FIG. 3)) determines a position of the first user. For example, the system may determine, for the first avatar, a first position in the first virtual environment.

At step 1110, process 1100 (e.g., using one or more components described in system 300 (FIG. 3)) determines a position of a third user. For example, the system may determine, for the third avatar, a third position in the first virtual environment.

At step 1112, process 1100 (e.g., using one or more components described in system 300 (FIG. 3)) adds the third user to the conversation with the second user based on the positions of the first user and the third user. For example, the system may add, without user input, the third user to the conversation based on the first position and the third position, wherein adding the third user to the conversation comprises generating for display, the peer-to-peer livestream communication, on the respective user interfaces for the first user, the second user, and the third user.

For example, the system may chain the third user to the other users in the conversation. The chaining may persist irrespective of whether or not one or more users leaves the conversation. For example, the system may determine that the first user has left the conversation. The system may then maintain, without user input, the conversation comprises generating for display, the peer-to-peer livestream communication, on the respective user interfaces for the second user and the third user.

The system may use one or more criteria for determining whether or not to add the third user. The system may, for example, add the third user irrespective of the position of the second user, or the system may use other metrics (e.g., whether or not the third avatar is within a threshold distance to one or more other avatars in the conversation). For example, the system may determine, for the second avatar, a second position in the first virtual environment. The system may retrieve a first threshold distance for adding the third user to the conversation, wherein the first threshold distance indicates a maximum distance from any avatars in the conversation for adding a new avatar to the conversation. The system may determine a first distance, wherein the first distance is between the third position and the second position. The system may then compare the first distance to the first threshold distance. The system may then determine that the first distance does not meet the first threshold distance. In response to determining that the first distance does not meet the first threshold distance, the system may not add the third user to the conversation. Instead, the system may prompt the third user to move closer to the second user or enter a conversation join area.

In some embodiments, the system may cycle through the various avatars in a virtual environment or in a given conversation. The system may determine if a respective avatar meets any criteria for being connected to other avatars. For example, if the system determines not to add a third user to a conversation based on a position of a second avatar (e.g., a second user) and a third avatar (e.g., the third user), the system may move on to another avatar (e.g., a first avatar for a first user). For example, the system may in response to not adding the third user to the conversation, the system may determine a second distance, wherein the second distance is between the third position and the first position. The system may compare the second distance to the first threshold distance. The system may determine that the second distance meets the first threshold distance. In response to determining that the second distance meets the first threshold distance, the system may determine to add the third user to the conversation. Additionally or alternatively, the system may determine, for a fourth avatar, a fourth position in the first virtual environment. The system may retrieve a second threshold distance for adding the fourth user to the conversation, wherein the second threshold distance indicates a minimum distance from any avatar in the conversation for maintaining avatars in the conversation. The system may determine a third distance, wherein the third distance is between the fourth position and the first position. The system may compare the third distance to the second threshold distance. The system may determine that third distance does not meet the second threshold distance. In response to determining that the third distance does not meet the second threshold distance, the system may not add the fourth user to the conversation.

In some embodiments, the system may use various thresholds (e.g., corresponding to one or more conversation initiation criteria) to determine whether or not to join users in a conversation. These thresholds may be based on avatar positions, join areas for avatars, join areas for conversation (or conversation positions), etc. That is, the thresholds may be based on distances (e.g., in a virtual environment) or the overlapping of one or more join areas with a position or another join area. Irrespective of the basis for the threshold, the system may also dynamically adjust the threshold based on the number of users, density, overall size, user settings, environment rules, etc. (e.g., in a conversation or virtual environment). For example, the system may determine a number of users in the conversation. The system may then determine the first threshold distance based on the number of users. Additionally or alternatively, the system may determine a density of avatars in the first environment. The system may determine the first threshold distance based on the density. Additionally or alternatively, the system may determine a size of the first virtual environment. The system may determine the first threshold distance based on the size of the first virtual environment. Additionally or alternatively, the system may retrieve a threshold conversation size for the conversation. The system may determine a number of users in the conversation. The system may compare the threshold conversation size to the number of users. The system may determine that the number of users meets the threshold conversation size. In response to determining that the number of users meets the threshold conversation size, the system may determine to add the third user to the conversation.

In some embodiments, a conversation initiation criterion may be time dependent. For example, the system may determine a distance based on the first position and the third position. The system may then determine a length of time at which the first avatar and the third avatar have maintained the distance. The system may retrieve a threshold length of time for adding users to a conversation. The system may compare the length of time to the threshold length of time. The system may determine that length of time meets the threshold length of time. In response to determining that length of time meets the threshold length of time, the system may determine to add the third user to the conversation.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to other embodiments described herein could be used to perform one or more of the steps in FIG. 11.

Figure 12:
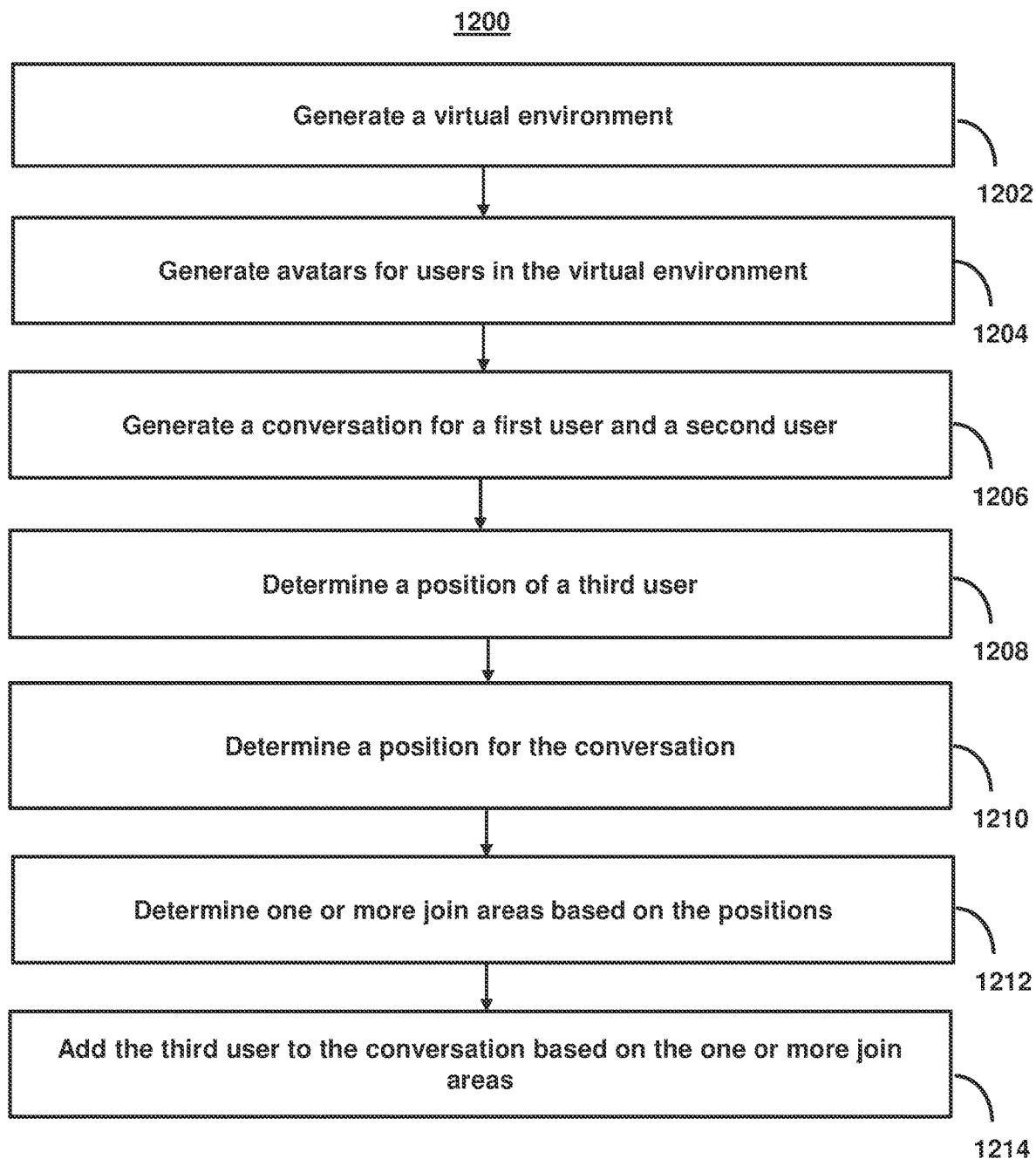
FIG. 12 shows a flowchart of the steps involved in generating join areas in a virtual environment to enable communications between users, in accordance with one or more embodiments.

FIG. 12 shows a flowchart of the steps involved in generating join areas in a virtual environment to enable communications between users, in accordance with one or more embodiments. For example, process 1200 may involve steps for triggering peer-to-peer livestream communications between users based on proximity-based criteria for avatars within virtual environments that correspond to the users.

At step 1202, process 1200 (e.g., using one or more components described in system 300 (FIG. 3)) generates a virtual environment. For example, the system may generate for simultaneous display a first virtual environment on a plurality of user interfaces, wherein a respective user interface of the plurality of user interfaces is accessible to each of a first user, a second user, and a third user, wherein the first user, the second user, and the third user are located remotely from each other.

At step 1204, process 1200 (e.g., using one or more components described in system 300 (FIG. 3)) generates avatars for users in the virtual environment. For example, the system may generate for display, in the first virtual environment, a first avatar corresponding to the first user, a second avatar corresponding to the second user, and a third avatar corresponding to the third user.

At step 1206, process 1200 (e.g., using one or more components described in system 300 (FIG. 3)) generates a conversation for a first user and a second user. For example, the system may generate for display on the respective user interfaces for the first user and the second user a conversation, wherein the conversation comprises a peer-to-peer livestream communication between the first user and the second user.

Additionally or alternatively, the system may generate for display on one or more user interfaces indicators of avatars that have joined a conversation and/or are available to join a conversation. The system may also dynamically determine characteristics of the indicators. For example, the system may determine a distance between the third position and the conversation position. The system may then generate for display on the respective user interfaces for the first user, the second user, and the third user, a join indicator, wherein the join indicator indicates that the third user is available to join the conversation, and wherein a characteristic of the join indicator is based on the distance.

At step 1208, process 1200 (e.g., using one or more components described in system 300 (FIG. 3)) determines a position of a third user. For example, the system may determine, for the third avatar, a third position in the first virtual environment.

At step 1210, process 1200 (e.g., using one or more components described in system 300 (FIG. 3)) determines a position for the conversation. For example, the system may determine, for the conversation, a conversation position in the first virtual environment. Furthermore, the size or shape of the conversation join area (or a position of a conversation position corresponding to the conversation) may be determined by the system based on the first position and the second position.

At step 1212, process 1200 (e.g., using one or more components described in system 300 (FIG. 3)) determines one or more join areas based on the positions. For example, the system may determine one or more join areas based on the third position or the conversation position, wherein the conversation position is based on a first position for the first avatar and a second position for the second avatar.

In some embodiments, determining the one or more join areas may involve determining threshold distances and/or whether or not a join area overlaps with a conversation join area. For example, determining the one or more join areas based on the third position or the conversation position may comprise determining, by the system, a distance between the first conversation position and the third position. Additionally, comparing the one or more join areas to one or more conversation initiation criteria to determine whether to allow the third user to join the conversation may comprise retrieving, by the system a threshold distance for allowing the third user to join the conversation, and comparing, by the system, the distance to the threshold distance to determine whether the distance is equal to or within the threshold distance.

Additionally or alternatively, the system may determine a third join area about the third position and a conversation join area about the conversation position. The system may then retrieve a threshold overlap area for allowing the third user to join the conversation. The system may determine an overlap area between the third join area and the conversation join area. The system may determine whether the overlap area equals or exceeds the threshold overlap area.

The system may additionally or alternatively determine one or more join areas based on user-specific criteria (e.g., retrieved from a user profile), environment rules (e.g., specific to the virtual environment), and/or other criteria. The system may use these criteria to determine a size or shape of a join area. For example, the system may retrieve a third user profile for the third user. The system may retrieve a third join area criterion from the third user profile. The system may retrieve an environment rule for the first virtual environment. The system may then determine a size or shape of a third join area, for the third avatar, based on the third join area criterion and the environment rule.

The system may also use velocity, trajectory, and/or other connection characteristics to determine join areas and/or characteristics of the join areas. For example, the system may determine a trajectory for the third avatar. The system may retrieve a third join area criterion for the third user. The system may retrieve an environment rule for the first virtual environment. The system may determine a size or shape of a third join area, for the third avatar, based on the third join area criterion and the environment rule.

When determining a join area, the system may map the join areas to the virtual environment. For example, the system may retrieve a third join area criterion for the third user. The system may retrieve an environment rule for the first virtual environment. The system may determine a grid map of the first virtual environment based on the environment rule, wherein the grid map defines a plurality of cells that comprise the first virtual environment and one or more cell properties for each cell of the plurality of cells. The system may then determine a subset of cells in the grid map that comprise a third join area, for the third avatar, based on the third position, third join area criterion, and the one or more cell properties for each of the plurality of cells in the grid map.

At step 1214, process 1200 (e.g., using one or more components described in system 300 (FIG. 3)) adds the third user to the conversation based on the one or more join areas. For example, the system may compare the one or more join areas to one or more conversation initiation criteria to determine whether to allow the third user to join the conversation. The system may then, in response to determining to allow the third user to join the conversation, add the third user to the conversation, wherein adding the third user to the conversation comprises generating for display, the peer-to-peer livestream communication, on the respective user interfaces for the first user, the second user, and the third user.

The system may also adjust the position of the conversation based on the position of avatars in the conversation. For example, the system may determine an initial conversation position based on the first position for the first avatar and the second position for the second avatar. The system may determine that the first avatar has navigated to a new position. The system may adjust the initial conversation position based on the new position and the second position.

The system may also monitor user inputs related to the avatars in the conversation to determine whether or not an avatar wishes to leave a conversation. For example, after adding the third user to the conversation, the system may receive a second user input, wherein the second user input causes the third avatar to navigate about the first virtual environment. The system may determine, for the third avatar, a new position in the first virtual environment. The system may determine one or more join areas based on the new position or the conversation position. The system may compare the one or more join areas to one or more conversation maintenance criteria to determine whether to maintain the third user in the conversation.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to other embodiments described herein could be used to perform one or more of the steps in FIG. 12.

Figure 13:
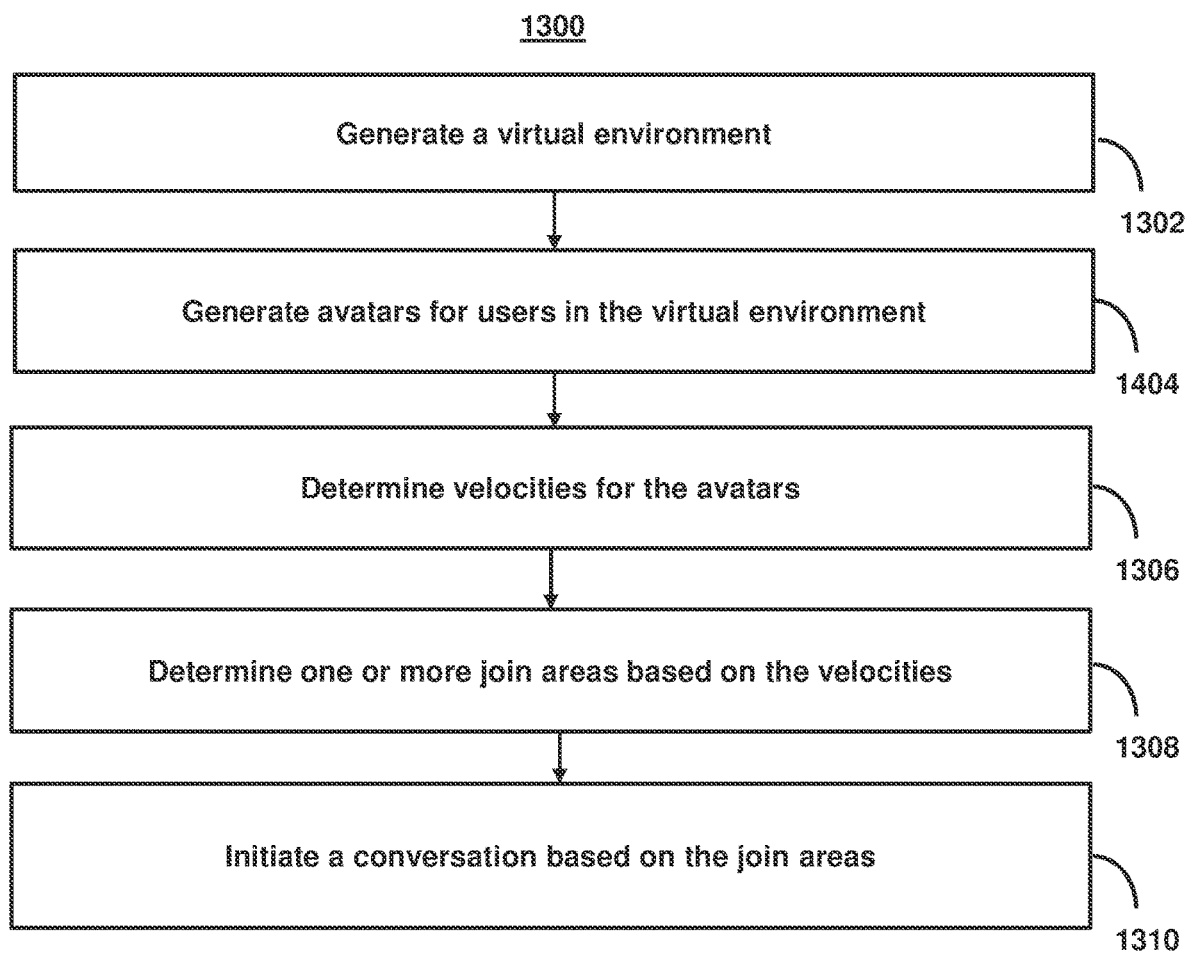
FIG. 13 shows a flowchart of the steps involved in using avatar motion to determine whether to provide communications between users in virtual environments, in accordance with one or more embodiments.

FIG. 13 shows a flowchart of the steps involved in using avatar motion to determine whether to provide communications between users in virtual environments, in accordance with one or more embodiments. For example, process 1300 may be used for triggering peer-to-peer livestream communications between users based on motions of avatars within the first virtual environment that correspond to the users.

At step 1302, process 1300 (e.g., using one or more components described in system 300 (FIG. 3)) generates a virtual environment. For example, the system may generate for simultaneous display a first virtual environment on a first user interface and a second user interface, wherein the first user interface corresponds to a first user, wherein the second user interface corresponds to a second user, and wherein the first user is located remotely from the second user.

At step 1304, process 1300 (e.g., using one or more components described in system 300 (FIG. 3)) generate avatars for users in the virtual environment. For example, the system may generate for display a first avatar in the first virtual environment, wherein the first avatar corresponds to the first user. The system may then generate for display a second avatar in the first virtual environment, wherein the second avatar corresponds to the second user.

At step 1306, process 1300 (e.g., using one or more components described in system 300 (FIG. 3)) determines velocities for the avatars. For example, the system may determine, for the first avatar, a first velocity in the first virtual environment. For example, the system may determine, for the second avatar, a second velocity in the first virtual environment.

For example, the system may determine one or more characteristics about an avatar (e.g., velocity, trajectory, position, user profile information, environment rules, etc.) to determine whether or not to add a user to a conversation. For example, the system may determine, for the first avatar, a first position in the first virtual environment. The system may determine, for the second avatar, a second position in the first virtual environment. The system may determine, based on the first position and the second position, a conversation join area for the conversation. The system may determine that the conversation join area overlaps with a second conversation join area. In response determining that the conversation join area overlaps with the second conversation join area, the system may modify the conversation join area.

Additionally or alternatively, the system may retrieve a first join area criterion for the first user. The system may retrieve an environment rule for the first virtual environment. The system may determine a grid map of the first virtual environment based on the environment rule, wherein the grid map defines a plurality of cells that comprise the first virtual environment and one or more cell properties for each cell of the plurality of cells. The system may determine a subset of cells in the grid map that comprise a first join area based on the first velocity, first join area criterion, and the one or more cell properties for each of the plurality of cells in the grid map.

At step 1308, process 1300 (e.g., using one or more components described in system 300 (FIG. 3)) determines one or more join areas based on the velocities. For example, the system may determine one or more join areas based on the first velocity or the second velocity. For example, the system may determine whether or not avatars are stationary (e.g., not moving) or near stationary (e.g., slowing down) before generating a join area.

For example, the system may retrieve a threshold velocity for initiating the conversation, wherein the threshold velocity indicates a maximum velocity for initiating the conversation. For example, the maximum velocity may correspond to a velocity of zero (e.g., indicating no movement). The velocity may be determined using various units (e.g., pixels per second). The system may then compare the first velocity to the threshold velocity. The system may then determine that the first velocity meets the threshold velocity.

The system may also use a direction of movement or trajectory of an avatar. For example, the system may only join avatars that are facing each other. For example, the system may determine, for the first avatar, a first trajectory in the first virtual environment. The system may determine, for the second avatar, a second trajectory in the first virtual environment. The system may determine the one or more join areas based on the first trajectory or the second trajectory. Similar, the system may use a direction of movement or trajectory of an avatar when determining whether or not to leave a join area or conversation. For example, after initiating the conversation between the first user and the second user, the system may determine, for the first avatar, a new velocity or a new trajectory. The system may compare the new velocity or the new trajectory to one or more conversation maintenance criteria to determine whether to maintain the conversation between the first user and the second user.

At step 1310, process 1300 (e.g., using one or more components described in system 300 (FIG. 3)) initiates a conversation based on the join areas. For example, the system may compare the one or more join areas to one or more conversation initiation criteria to determine whether to initiate a conversation between the first user and the second user. The system may then, in response to determining to initiate the conversation between the first user and the second user, initiating the conversation between the first user and the second user, wherein the conversation comprises a peer-to-peer livestream communication between the first user and the second user.

In some embodiments, the system may also maintain the spacing of avatars in a conversation that are in motion by monitoring and adjusting the movement of avatars relative to each other. For example, the system may determine, for the first avatar, a first position in the first virtual environment after initiating the conversation between the first user and the second user. The system may determine a movement, in the first virtual environment, of the first avatar to a new position. The system may determine a difference between the new position and the first position. The system may automatically move, without user input, the second avatar, in the first virtual environment, by the difference. Additionally or alternatively, the system may retrieve predetermined spatial arrangements. For example, the system may, after initiating the conversation between the first user and the second user, retrieve a predetermined spatial arrangement for a conversation join area for the conversation. The system may automatically move, without user input, the first avatar and the second avatar based on the predetermined spatial arrangement.

In some embodiments, the system may also maintain the spacing of avatars in a conversation that are in motion by monitoring and adjusting the movement of avatars relative to a conversation join area or a position in a conversation (e.g., a conversation position and/or center point of the conversation join area). For example, the system may determine, for the first avatar, a first position in the first virtual environment after initiating the conversation between the first user and the second user. The system may determine, for the second avatar, a second position in the first virtual environment after initiating the conversation between the first user and the second user. The system may determine a first difference, wherein the first difference comprises a distance between the first position and a conversation position in the first virtual environment. The system may determine a second difference, wherein the second difference comprises a distance between the second position and the conversation position in the first virtual environment. The system may determine a movement, in the first virtual environment, of the first avatar to a new position. The system may determine a first adjustment to first difference based on the movement. The system may then automatically move, without user input, the second avatar, in the first virtual environment, by the first adjustment. Additionally or alternatively, the system may determine, for the first avatar, a first position in the first virtual environment. The system may determine, for the second avatar, a second position in the first virtual environment. The system may determine, based on the first position and the second position, a conversation join area for the conversation. The system may determine a center point of the conversation join area. The system may automatically move, without user input, the first avatar and the second avatar towards the center point after initiating the conversation between the first user and the second user.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to other embodiments described herein could be used to perform one or more of the steps in FIG. 13.

Figure 14:
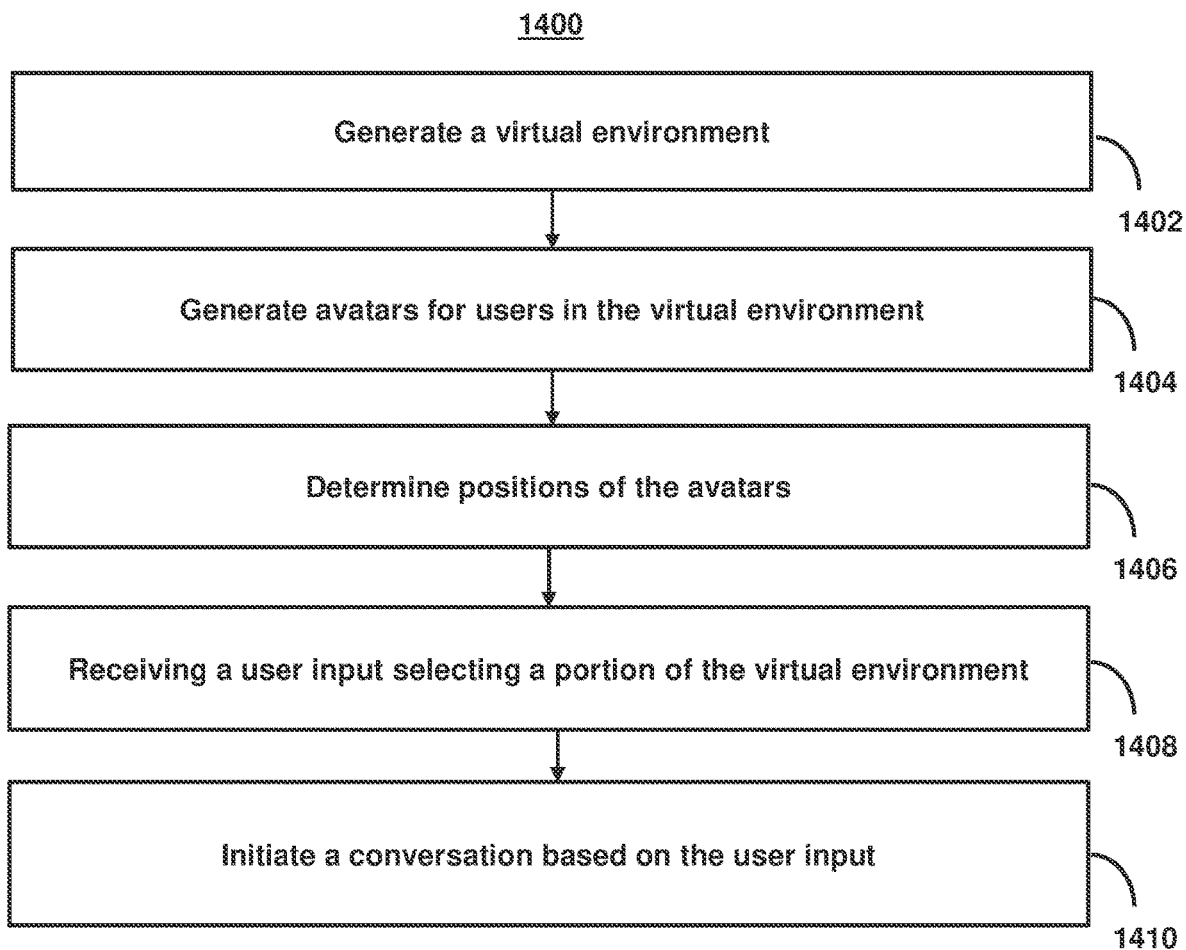
FIG. 14 shows a flowchart of the steps involved in facilitating external control of user-controlled avatars based on user-defined criteria, in accordance with one or more embodiments.

FIG. 14 shows a flowchart of the steps involved in facilitating external control of user-controlled avatars based on user-defined criteria, in accordance with one or more embodiments. For example, process 1400 may be used to facilitate external control of user-controlled avatars in a virtual environment in order to trigger peer-to-peer livestream communications between users.

At step 1402, process 1400 (e.g., using one or more components described in system 300 (FIG. 3)) generates a virtual environment. For example, the system may generate for simultaneous display a first virtual environment on a first user interface and a second user interface, wherein the first user interface corresponds to a first user, wherein the second user interface corresponds to a second user, and wherein the first user is located remotely from the second user.

At step 1404, process 1400 (e.g., using one or more components described in system 300 (FIG. 3)) generates avatars for users in the virtual environment. For example, the system may generate for display a first avatar in the first virtual environment, wherein the first avatar corresponds to the first user. The system may generate for display a second avatar in the first virtual environment, wherein the second avatar corresponds to the second user.

At step 1406, process 1400 (e.g., using one or more components described in system 300 (FIG. 3)) determines positions of the avatars. For example, the system may determine, for the first avatar, a first position in the first virtual environment. The system may determine, for the second avatar, a second position in the first virtual environment.

At step 1408, process 1400 (e.g., using one or more components described in system 300 (FIG. 3)) receives a user input selecting a portion of the virtual environment. For example, the system may receive a first user input, wherein the first user input selects a portion of the first virtual environment that includes the first position and the second position.

At step 1410, process 1400 (e.g., using one or more components described in system 300 (FIG. 3)) initiates a conversation based on the user input. For example, the system may initiate a conversation between the first user and the second user in response to the user input selecting the portion of the first virtual environment that includes the first position and the second position, wherein the conversation comprises a peer-to-peer livestream communication between the first user and the second user.

The system may then maintain the conversation as additional avatars join, virtual environments are transitioned to, and/or additional environment assets are loaded. For example, after initiating the conversation between the first user and the second user, the system may generate for display the peer-to-peer livestream communication between the first user and the second user, wherein the peer-to-peer livestream communication between the first user and the second user comprises a simultaneous display of a first video feed of the first user and a second video feed of a second user, and wherein the first video feed and the second video feed are overlaid on the first virtual environment. The system may receive a first user input, wherein the first user input maintains the conversation and causes a transition to a second virtual environment. The system may load the second virtual environment. While the second virtual environment is loading, the system may maintain the simultaneous display of the first video feed and the second video feed. The system may generate for simultaneous display the second virtual environment on a first user interface and a second user interface, wherein the first video feed and the second video feed are overlaid on the second virtual environment.

The system may also automatically move avatars (e.g., without user input) and/or navigate avatars to particular destinations. For example, after initiating the conversation between the first user and the second user, the system may retrieve a predetermined spatial arrangement for a conversation join area for the conversation. For example, the predetermined spatial arrangement may indicate particular positions for avatars to stand in a conversation. The system may automatically move, without user input, the first avatar and the second avatar based on the predetermined spatial arrangement.

The system may cause avatars to move closer together (e.g., in order to visually indicate that the avatars are in a conversation). For example, the system may determine, based on a second user input, a conversation join area for the conversation. The system may then determine a center point of the conversation join area. The system may automatically move, without user input, the first avatar and the second avatar towards the center point after initiating the conversation between the first user and the second user.

The system may also adjust the movement of avatars during a conversation. For example, the system may receive a second user input, wherein the second user input selects a conversation position for the conversation. The system may determine a first difference, wherein the first difference comprises a distance between the first position and the conversation position in the first virtual environment. The system may determine a second difference, wherein the second difference comprises a distance between the second position and the conversation position in the first virtual environment. The system may determine a movement, in the first virtual environment, of the first avatar to a new position. The system may determine a first adjustment to first difference based on the movement. The system may automatically move, without user input, the second avatar, in the first virtual environment, by the first adjustment.

In some embodiments, the system may also automatically move avatars in relation to other avatars in the conversation. For example, after initiating the conversation between the first user and the second user, the system may determine a movement, in the first virtual environment, of the first avatar to a new position. The system may determine a difference between the new position and the first position. The system may automatically move, without user input, the second avatar, in the first virtual environment, by the difference.

The system may also allow for users to leave a conversation. For example, after initiating the conversation between the first user and the second user, the system may receive a third user input, wherein the third user input causes the first avatar to navigate about the first virtual environment. The system may determine, for the first avatar, a new position in the first virtual environment. The system may determine one or more join areas based on the new position or the second position. The system may compare the one or more join areas to one or more conversation maintenance criteria to determine whether to maintain the conversation between the first user and the second user. Additionally or alternatively, the system may, after initiating the conversation between the first user and the second user, determine, for the first avatar, a new velocity or a new trajectory. The system may compare the new velocity or the new trajectory to one or more conversation maintenance criteria to determine whether to maintain the conversation between the first user and the second user.

The system may also allow for additional users to join a conversation initiated by an external user. The system may generate for simultaneous display the first virtual environment on a third user interface, wherein the third user interface corresponds to a third user. The system may generate for display a third avatar in the first virtual environment, wherein the third avatar corresponds to the third user. The system may determine, for the third avatar, a third position in the first virtual environment. The system may determine a third join area based on the third position. The system may automatically add, without user input, the third user to the conversation based on the third join area.

In some embodiments, the system may modify a conversation join area based on other conversation join areas in order to prevent congestion and/or overlap. For example, the system may determine, based on the first user input, a conversation join area for the conversation. The system may determine that the conversation join area overlaps with a second conversation join area. The system may, in response, determine that the conversation join area overlaps with the second conversation join area, and automatically modify the conversation join area without subsequent user input.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to other embodiments described herein could be used to perform one or more of the steps in FIG. 14.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for triggering peer-to-peer livestream communications between users based on proximity-based criteria for avatars within a first virtual environment that correspond to the users, the method comprising: generating for simultaneous display a first virtual environment on a first user interface and a second user interface, wherein the first user interface corresponds to a first user, wherein the second user interface corresponds to a second user, and wherein the first user is located remotely from the second user; generating for display a first avatar in the first virtual environment, wherein the first avatar corresponds to the first user; generating for display a second avatar in the first virtual environment, wherein the second avatar corresponds to the second user; determining, for the first avatar, a first position in the first virtual environment; determining, for the second avatar, a second position in the first virtual environment; determining one or more join areas based on the first position or the second position; comparing the one or more join areas to one or more conversation initiation criteria to determine whether to initiate a conversation between the first user and the second user; and, in response to determining to initiate the conversation between the first user and the second user, initiating the conversation between the first user and the second user, wherein the conversation comprises a peer-to-peer livestream communication between the first user and the second user.

2. The method of any of the preceding embodiments, wherein determining the one or more join areas based on the first position or the second position comprises determining a distance between the first position and the second position, and wherein comparing the one or more join areas to the one or more conversation initiation criteria to determine whether to initiate the conversation between the first user and the second user further comprises: retrieving a threshold distance for initiating the conversation; and comparing the distance to the threshold distance to determine whether the distance is equal to or within the threshold distance.

3. The method of any of the preceding embodiments, wherein determining the one or more join areas based on the first position or the second position comprises determining a first radial-based join area about the first position and a second radial-based join area about the second position, and wherein comparing the one or more join areas to the one or more conversation initiation criteria to determine whether to initiate the conversation between the first user and the second user further comprises: retrieving a threshold overlap area for initiating the conversation; determining an overlap area between the first radial-based join area and the second radial-based join area; and determining whether the overlap area equals or exceeds the threshold overlap area.

4. The method of any of the preceding embodiments, wherein determining the one or more join areas based on the first position or the second position further comprises: retrieving a first user profile for the first user; retrieving a first join area criterion for the first user; retrieving an environment rule for the first virtual environment; and determining a size or shape of a first join area based on the first join area criterion and the environment rule.

5. The method of any of the preceding embodiments, wherein determining the one or more join areas based on the first position or the second position further comprises: determining a direction of movement for the first avatar; retrieving a first join area criterion for the first user; retrieving an environment rule for the first virtual environment; and determining a size or shape of a first join area based on the first join area criterion and the environment rule.

6. The method of any of the preceding embodiments, wherein determining the one or more join areas based on the first position or the second position further comprises: retrieving a first join area criterion for the first user; retrieving an environment rule for the first virtual environment; determining a grid map of the first virtual environment based on the environment rule, wherein the grid map defines a plurality of cells that comprise the first virtual environment and one or more cell properties for each cell of the plurality of cells; and determining a subset of cells in the grid map that comprise a first join area based on the first position, the first join area criterion, and the one or more cell properties for each cell of the plurality of cells in the grid map.

7. The method of any of the preceding embodiments, further comprising: after initiating the conversation between the first user and the second user, generating for display the peer-to-peer livestream communication between the first user and the second user, wherein the peer-to-peer livestream communication between the first user and the second user comprises a simultaneous display of a first video feed of the first user and a second video feed of a second user, and wherein the first video feed and the second video feed are overlaid on the first virtual environment; receiving a first user input, wherein the first user input maintains the conversation and causes a transition to a second virtual environment; loading the second virtual environment; while the second virtual environment is loading, maintaining the simultaneous display of the first video feed and the second video feed; and generating for simultaneous display the second virtual environment on a first user interface and a second user interface, wherein the first video feed and the second video feed are overlaid on the second virtual environment.

8. The method of any of the preceding embodiments, wherein determining, for the first avatar, the first position in the first virtual environment further comprises: receiving a second user input, wherein the second user input causes the first avatar to navigate about the first virtual environment; determining that the first avatar is no longer navigating about the first virtual environment; and determining the first position in the first virtual environment in response to determining that the first avatar is no longer navigating about the first virtual environment.

9. The method of any of the preceding embodiments, further comprising: after initiating the conversation between the first user and the second user, receiving a third user input, wherein the third user input causes the first avatar to navigate about the first virtual environment; determining, for the first avatar, a new position in the first virtual environment; determining one or more join areas based on the new position or the second position; and comparing the one or more join areas to one or more conversation maintenance criteria to determine whether to maintain the conversation between the first user and the second user.

10. The method of any of the preceding embodiments, further comprising generating for simultaneous display the first virtual environment on a third user interface, wherein the third user interface corresponds to a third user; generating for display a third avatar in the first virtual environment, wherein the third avatar corresponds to the third user; determining, for the third avatar, a third position in the first virtual environment; determining a third join area based on the third position; and comparing the third join area to the one or more conversation initiation criteria to determine whether to add the third user to the conversation.

11. A method for triggering peer-to-peer livestream communications between users based on preexisting relationships between avatars within virtual environments, the method comprising: generating for simultaneous display a first virtual environment on a plurality of user interfaces, wherein a respective user interface of the plurality of user interfaces is accessible to each of a first user, a second user, and a third user, wherein the first user, the second user, and the third user are located remotely from each other; generating for display, in the first virtual environment, a first avatar corresponding to the first user, a second avatar corresponding to the second user, and a third avatar corresponding to the third user; generated for display on the respective user interfaces for the first user and the second user a conversation, wherein the conversation comprises a peer-to-peer livestream communication between the first user and the second user; determining, for the first avatar, a first position in the first virtual environment; determining, for the third avatar, a third position in the first virtual environment; and adding, without user input, the third user to the conversation based on the first position and the third position, wherein adding the third user to the conversation comprises generating for display, the peer-to-peer livestream communication, on the respective user interfaces for the first user, the second user, and the third user.

12. The method of any of the proceeding embodiments, further comprising: determining that the first user has left the conversation; and maintaining, without user input, the conversation comprises generating for display, the peer-to-peer livestream communication, on the respective user interfaces for the second user and the third user.

13. The method of any of the proceeding embodiments, wherein adding the third user to the conversation based on the first position and the third position further comprises: determining, for the second avatar, a second position in the first virtual environment; retrieving a first threshold distance for adding the third user to the conversation, wherein the first threshold distance indicates a maximum distance from any avatars in the conversation for adding a new avatar to the conversation; determining a first distance, wherein the first distance is between the third position and the second position; comparing the first distance to the first threshold distance; determining that the first distance does not meet the first threshold distance; and in response to determining that the first distance does not meet the first threshold distance, not adding the third user to the conversation.

14. The method of any of the proceeding embodiments, wherein adding the third user to the conversation based on the first position and the third position further comprises: in response to not adding the third user to the conversation, determining a second distance, wherein the second distance is between the third position and the first position; comparing the second distance to the first threshold distance; determining that the second distance meets the first threshold distance; and in response to determining that the second distance meets the first threshold distance, determining to add the third user to the conversation.

15. The method of any of the proceeding embodiments, further comprising: determining a number of users in the conversation; and determining the first threshold distance based on the number of users.

16. The method of any of the proceeding embodiments, further comprising: determining a density of avatars in the first environment; and determining the first threshold distance based on the density.

17. The method of any of the proceeding embodiments, further comprising: determining a size of the first virtual environment; and determining the first threshold distance based on the size of the first virtual environment.

18. The method of claim 3, wherein adding the third user to the conversation based on the first position and the third position further comprises: retrieving a threshold conversation size for the conversation; determining a number of users in the conversation; comparing the threshold conversation size to the number of users; determining that the number of users meets the threshold conversation size; and in response to determining that the number of users meets the threshold conversation size, determining to add the third user to the conversation.

19. The method of any of the proceeding embodiments, wherein adding the third user to the conversation based on the first position and the third position further comprises: determining, for a fourth avatar, a fourth position in the first virtual environment; retrieving a second threshold distance for adding the fourth user to the conversation, wherein the second threshold distance indicates a minimum distance from any avatar in the conversation for maintaining avatars in the conversation; determining a third distance, wherein the third distance is between the fourth position and the first position; comparing the third distance to the second threshold distance; determining that third distance does not meet the second threshold distance; and in response to determining that the third distance does not meet the second threshold distance, not adding the fourth user to the conversation.

20. The method of any of the proceeding embodiments, wherein adding the third user to the conversation based on the first position and the third position further comprises: determining a distance based on the first position and the third position; determining a length of time at which the first avatar and the third avatar have maintained the distance; retrieving a threshold length of time for adding users to a conversation; comparing the length of time to the threshold length of time; determining that length of time meets the threshold length of time; and in response to determining that length of time meets the threshold length of time, determining to add the third user to the conversation.

21. A method for facilitating external control of user-controlled avatars in a virtual environment in order to triggering peer-to-peer livestream communications between users, the method comprising: generating for simultaneous display a first virtual environment on a first user interface and a second user interface, wherein the first user interface corresponds to a first user, wherein the second user interface corresponds to a second user, and wherein the first user is located remotely from the second user; generating for display a first avatar in the first virtual environment, wherein the first avatar corresponds to the first user; generating for display a second avatar in the first virtual environment, wherein the second avatar corresponds to the second user; determining, for the first avatar, a first position in the first virtual environment; determining, for the second avatar, a second position in the first virtual environment; receiving a first user input, wherein the first user input selects a portion of the first virtual environment that includes the first position and the second position; and in response to the user input selecting the portion of the first virtual environment that includes the first position and the second position, initiating a conversation between the first user and the second user, wherein the conversation comprises a peer-to-peer livestream communication between the first user and the second user.

22. The method of any of the proceeding embodiments, further comprising: after initiating the conversation between the first user and the second user, generating for display the peer-to-peer livestream communication between the first user and the second user, wherein the peer-to-peer livestream communication between the first user and the second user comprises a simultaneous display of a first video feed of the first user and a second video feed of a second user, and wherein the first video feed and the second video feed are overlaid on the first virtual environment; receiving a first user input, wherein the first user input maintains the conversation and causes a transition to a second virtual environment; loading the second virtual environment; while the second virtual environment is loading, maintaining the simultaneous display of the first video feed and the second video feed; and generating for simultaneous display the second virtual environment on a first user interface and a second user interface, wherein the first video feed and the second video feed are overlaid on the second virtual environment.

23. The method of any of the proceeding embodiments, further comprising: after initiating the conversation between the first user and the second user, retrieving a predetermined spatial arrangement for a conversation join area for the conversation; and automatically moving, without user input, the first avatar and the second avatar based on the predetermined spatial arrangement.

24. The method of any of the proceeding embodiments, further comprising: determining, based on a second user input, a conversation join area for the conversation; determining a center point of the conversation join area; and automatically moving, without user input, the first avatar and the second avatar towards the center point after initiating the conversation between the first user and the second user.

25. The method of any of the proceeding embodiments, further comprising: receiving a second user input, wherein the second user input selects a conversation position for the conversation; determining a first difference, wherein the first difference comprises a distance between the first position and the conversation position in the first virtual environment; determining a second difference, wherein the second difference comprises a distance between the second position and the conversation position in the first virtual environment; determining a movement, in the first virtual environment, of the first avatar to a new position; determining a first adjustment to first difference based on the movement; and automatically moving, without user input, the second avatar, in the first virtual environment, by the first adjustment.

26. The method of any of the proceeding embodiments, further comprising: after initiating the conversation between the first user and the second user, determining a movement, in the first virtual environment, of the first avatar to a new position; determining a difference between the new position and the first position; and automatically moving, without user input, the second avatar, in the first virtual environment, by the difference.

27. The method of any of the proceeding embodiments, further comprising: after initiating the conversation between the first user and the second user, receiving a third user input, wherein the third user input causes the first avatar to navigate about the first virtual environment; determining, for the first avatar, a new position in the first virtual environment; determining one or more join areas based on the new position or the second position; and comparing the one or more join areas to one or more conversation maintenance criteria to determine whether to maintain the conversation between the first user and the second user.

28. The method of any of the proceeding embodiments, further comprising: generating for simultaneous display the first virtual environment on a third user interface, wherein the third user interface corresponds to a third user; generating for display a third avatar in the first virtual environment, wherein the third avatar corresponds to the third user; determining, for the third avatar, a third position in the first virtual environment; determining a third join area based on the third position; and automatically adding, without user input, the third user to the conversation based on the third join area.

29. The method of any of the proceeding embodiments, further comprising: after initiating the conversation between the first user and the second user, determining, for the first avatar, a new velocity or a new trajectory; and comparing the new velocity or the new trajectory to one or more conversation maintenance criteria to determine whether to maintain the conversation between the first user and the second user.

30. The method of any of the proceeding embodiments, further comprising: determining, based on the first user input, a conversation join area for the conversation; determining that the conversation join area overlaps with a second conversation join area; and in response determining that the conversation join area overlaps with the second conversation join area, automatically modifying the conversation join area without subsequent user input.

31. A method for triggering peer-to-peer livestream communications between users based on motions of avatars within the first virtual environment that corresponds to the users, the method comprising: generating for simultaneous display a first virtual environment on a first user interface and a second user interface, wherein the first user interface corresponds to a first user, wherein the second user interface corresponds to a second user, and wherein the first user is located remotely from the second user; generating for display a first avatar in the first virtual environment, wherein the first avatar corresponds to the first user; generating for display a second avatar in the first virtual environment, wherein the second avatar corresponds to the second user; determining, for the first avatar, a first velocity in the first virtual environment; determining, for the second avatar, a second velocity in the first virtual environment; determining one or more join areas based on the first velocity or the second velocity; comparing the one or more join areas to one or more conversation initiation criteria to determine whether to initiate a conversation between the first user and the second user; and in response to determining to initiate the conversation between the first user and the second user, initiating the conversation between the first user and the second user, wherein the conversation comprises a peer-to-peer livestream communication between the first user and the second user.

32. The method of any of the proceeding embodiments, wherein determining the one or more join areas based on the first velocity or the second velocity comprises: retrieving a threshold velocity for initiating the conversation, wherein the threshold velocity indicates a maximum velocity for initiating the conversation; comparing the first velocity to the threshold velocity; and determining that the first velocity meets the threshold velocity.

33. The method of any of the proceeding embodiments, wherein determining the one or more join areas based on the first velocity or the second velocity further comprises: determining, for the first avatar, a first trajectory in the first virtual environment; determining, for the second avatar, a second trajectory in the first virtual environment; and determining the one or more join areas based on the first trajectory or the second trajectory.

34. The method of any of the proceeding embodiments, further comprising: after initiating the conversation between the first user and the second user, determining, for the first avatar, a new velocity or a new trajectory; and comparing the new velocity or the new trajectory to one or more conversation maintenance criteria to determine whether to maintain the conversation between the first user and the second user.

35. The method of any of the proceeding embodiments, further comprising: determining, for the first avatar, a first position in the first virtual environment after initiating the conversation between the first user and the second user; determining a movement, in the first virtual environment, of the first avatar to a new position; determining a difference between the new position and the first position; and automatically moving, without user input, the second avatar, in the first virtual environment, by the difference.

36. The method of any of the proceeding embodiments, further comprising: determining, for the first avatar, a first position in the first virtual environment after initiating the conversation between the first user and the second user; determining, for the second avatar, a second position in the first virtual environment after initiating the conversation between the first user and the second user; determining a first difference, wherein the first difference comprises a distance between the first position and a conversation position in the first virtual environment; determining a second difference, wherein the second difference comprises a distance between the second position and the conversation position in the first virtual environment; determining a movement, in the first virtual environment, of the first avatar to a new position; determining a first adjustment to first difference based on the movement; and automatically moving, without user input, the second avatar, in the first virtual environment, by the first adjustment.

37. The method of any of the proceeding embodiments, further comprising: determining, for the first avatar, a first position in the first virtual environment; determining, for the second avatar, a second position in the first virtual environment; determining, based on the first position and the second position, a conversation join area for the conversation; determining a center point of the conversation join area; and automatically moving, without user input, the first avatar and the second avatar towards the center point after initiating the conversation between the first user and the second user.

38. The method of any of the proceeding embodiments, further comprising: after initiating the conversation between the first user and the second user, retrieving a predetermined spatial arrangement for a conversation join area for the conversation; and automatically moving, without user input, the first avatar and the second avatar based on the predetermined spatial arrangement.

39. The method of any of the proceeding embodiments, further comprising: determining, for the first avatar, a first position in the first virtual environment; determining, for the second avatar, a second position in the first virtual environment; determining, based on the first position and the second position, a conversation join area for the conversation; determining that the conversation join area overlaps with a second conversation join area; and in response determining that the conversation join area overlaps with the second conversation join area, modifying the conversation join area.

40. The method of any of the proceeding embodiments, wherein determining the one or more join areas based on the first velocity or the second velocity further comprises: retrieving a first join area criterion for the first user; retrieving an environment rule for the first virtual environment; determining a grid map of the first virtual environment based on the environment rule, wherein the grid map defines a plurality of cells that comprise the first virtual environment and one or more cell properties for each cell of the plurality of cells; and determining a subset of cells in the grid map that comprise a first join area based on the first velocity, first join area criterion, and the one or more cell properties for each of the plurality of cells in the grid map.

41. A method for triggering peer-to-peer livestream communications between users based on proximity-based criteria for avatars within virtual environments that correspond to the users, the method comprising: generating for simultaneous display a first virtual environment on a plurality of user interfaces, wherein a respective user interface of the plurality of user interfaces is accessible to each of a first user, a second user, and a third user, wherein the first user, the second user, and the third user are located remotely from each other; generating for display, in the first virtual environment, a first avatar corresponding to the first user, a second avatar corresponding to the second user, and a third avatar corresponding to the third user; generating for display on the respective user interfaces for the first user and the second user a conversation, wherein the conversation comprises a peer-to-peer livestream communication between the first user and the second user; determining, for the third avatar, a third position in the first virtual environment; determining, for the conversation, a conversation position in the first virtual environment; determining one or more join areas based on the third position or the conversation position, wherein the conversation position is based on a first position for the first avatar and a second position for the second avatar; comparing the one or more join areas to one or more conversation initiation criteria to determine whether to allow the third user to join the conversation; and in response to determining to allow the third user to join the conversation, adding the third user to the conversation, wherein adding the third user to the conversation comprises generating for display, the peer-to-peer livestream communication, on the respective user interfaces for the first user, the second user, and the third user.

42. The method of any of the proceeding embodiments, wherein determining the one or more join areas based on the third position or the conversation position comprises determining a distance between the first conversation position and the third position, and wherein comparing the one or more join areas to one or more conversation initiation criteria to determine whether to allow the third user to join the conversation further comprises: retrieving a threshold distance for allowing the third user to join the conversation; and comparing the distance to the threshold distance to determine whether the distance is equal to or within the threshold distance.

43. The method of any of the proceeding embodiments, wherein determining one or more join areas based on the third position or the conversation position comprises determining a third join area about the third position and a conversation join area for the conversation position, and wherein comparing the one or more join areas to one or more conversation initiation criteria to determine whether to allow the third user to join the conversation further comprises: retrieving a threshold overlap area for allowing the third user to join the conversation; determining an overlap area between the third join area and the conversation join area; and determining whether the overlap area equals or exceeds the threshold overlap area.

44. The method of any of the proceeding embodiments, wherein determining one or more join areas based on the third position or the conversation position further comprises: retrieving a third user profile for the third user; retrieving a third join area criterion from the third user profile; retrieving an environment rule for the first virtual environment; and determining a size or shape of a third join area, for the third avatar, based on the third join area criterion and the environment rule.

45. The method of any of the proceeding embodiments, wherein determining one or more join areas based on the third position or the conversation position further comprises: determining a trajectory for the third avatar; retrieving a third join area criterion for the third user; retrieving an environment rule for the first virtual environment; and determining a size or shape of a third join area, for the third avatar, based on the third join area criterion and the environment rule.

46. The method of any of the proceeding embodiments, wherein determining one or more join areas based on the third position or the conversation position further comprises: retrieving a third join area criterion for the third user; retrieving an environment rule for the first virtual environment; determining a grid map of the first virtual environment based on the environment rule, wherein the grid map defines a plurality of cells that comprise the first virtual environment and one or more cell properties for each cell of the plurality of cells; and determining a subset of cells in the grid map that comprise a third join area, for the third avatar, based on the third position, third join area criterion, and the one or more cell properties for each of the plurality of cells in the grid map.

47. The method of any of the proceeding embodiments, wherein determining, for the conversation, the conversation position in the first virtual environment further comprises: determining an initial conversation position based on the first position for the first avatar and the second position for the second avatar; determining that the first avatar has navigated to a new position; and adjusting the initial conversation position based on the new position and the second position.

48. The method of any of the proceeding embodiments, wherein determining one or more join areas based on the third position or the conversation position further comprises determining a size or shape of a conversation join area based on the first position and the second position.

49. The method of any of the proceeding embodiments, further comprising: determining a distance between the third position and the conversation position; and generating for display on the respective user interfaces for the first user, the second user, and the third user, a join indicator, wherein the join indicator indicates that the third user is available to join the conversation, and wherein a characteristic of the join indicator is based on the distance.

50. The method of any of the proceeding embodiments, further comprising: after adding the third user to the conversation, receiving a second user input, wherein the second user input causes the third avatar to navigate about the first virtual environment; determining, for the third avatar, a new position in the first virtual environment; determining one or more join areas based on the new position or the conversation position; and comparing the one or more join areas to one or more conversation maintenance criteria to determine whether to maintain the third user in the conversation.

51. A tangible, non-transitory, machine-readable medium storing instructions that, when executed by a data processing apparatus, cause the data processing apparatus to perform operations comprising those of any of the preceding embodiments.

52. A system comprising: one or more processors; and memory storing instructions that, when executed by the processors, cause the processors to effectuate operations comprising those of any of the preceding embodiments.

53. A system comprising means for performing of any of the preceding embodiments.

What is claimed:

1. A system for triggering livestream communications between users based on motions of avatars within first virtual environment that correspond to the users, the system comprising:
    a first computer terminal comprising a first user interface and a first webcam;
    a second computer terminal comprising a second user interface and a second webcam;
    a server configured to:
        generate for simultaneous display a first virtual environment on a first user interface and a second user interface, wherein the first user interface corresponds to a first user, wherein the second user interface corresponds to a second user, and wherein the first user is located remotely from the second user;
        generate for display a first avatar in the first virtual environment, wherein the first avatar corresponds to the first user, wherein the first avatar corresponds to the first user, and wherein the first avatar comprises a virtual representation of the first user that may be navigated about the first virtual environment;
        generate for display a second avatar in the first virtual environment, wherein the second avatar corresponds to the second user, wherein the second avatar corresponds to the second user, and wherein the second avatar comprises a virtual representation of the second user that may be navigated about the first virtual environment;
        receive, for the first avatar, a first navigational input in the first virtual environment;
        receive, for the second avatar, a second navigational input in the first virtual environment;
        determine one or more join areas based on the first navigational input or the second navigational input;
        compare the one or more join areas to one or more conversation initiation criteria to determine whether to initiate a conversation between the first user and the second user;
        in response to determining to initiate the conversation between the first user and the second user, initiate the conversation between the first user and the second user, wherein the conversation comprises a livestream communication using the first webcam and the second webcam;
        determining, for the first avatar, a first position in the first virtual environment after initiating the conversation between the first user and the second user;
        determining a movement, in the first virtual environment, of the first avatar to a new position;
        determining a difference between the new position and the first position; and
        automatically moving, without user input, the second avatar, in the first virtual environment, by the difference.

2. A method for triggering livestream communications between users based on motions of avatars within first virtual environment that correspond to the users, the method comprising:
    generating for simultaneous display a first virtual environment on a first user interface and a second user interface, wherein the first user interface corresponds to a first user, wherein the second user interface corresponds to a second user, and wherein the first user is located remotely from the second user;
    generating for display a first avatar in the first virtual environment, wherein the first avatar corresponds to the first user;
    generating for display a second avatar in the first virtual environment, wherein the second avatar corresponds to the second user;
    determining, for the first avatar, a first navigational input in the first virtual environment;
    determining, for the second avatar, a second navigational input in the first virtual environment;
    determining one or more join areas based on the first navigational input or the second navigational input;
    comparing the one or more join areas to one or more conversation initiation criteria to determine whether to initiate a conversation between the first user and the second user;
    in response to determining to initiate the conversation between the first user and the second user, initiating the conversation between the first user and the second user, wherein the conversation comprises a livestream communication between the first user and the second user;
    determining, for the first avatar, a first position in the first virtual environment after initiating the conversation between the first user and the second user;
    determining a movement, in the first virtual environment, of the first avatar to a new position;
    determining a difference between the new position and the first position; and
    automatically moving, without user input, the second avatar, in the first virtual environment, by the difference.

3. The method of claim 2, wherein determining the one or more join areas based on the first navigational input or the second navigational input further comprises:
    determining, for the first avatar, a first trajectory in the first virtual environment;
    determining, for the second avatar, a second trajectory in the first virtual environment; and
    determining the one or more join areas based on the first trajectory or the second trajectory.

4. The method of claim 2, further comprising:
after initiating the conversation between the first user and the second user, receiving, for the first avatar, a new navigational input; and
comparing the new navigational input to one or more conversation maintenance criteria to determine whether to maintain the conversation between the first user and the second user.

5. The method of claim 2, further comprising:
after initiating the conversation between the first user and the second user, determining, for the first avatar, a new trajectory; and
comparing the new trajectory to one or more conversation maintenance criteria to determine whether to maintain the conversation between the first user and the second user.

6. The method of claim 2, further comprising:
determining, for the first avatar, a first position in the first virtual environment after initiating the conversation between the first user and the second user;
determining, for the second avatar, a second position in the first virtual environment after initiating the conversation between the first user and the second user;
determining a first difference, wherein the first difference comprises a distance between the first position and a conversation position in the first virtual environment;
determining a second difference, wherein the second difference comprises a distance between the second position and the conversation position in the first virtual environment;
determining a movement, in the first virtual environment, of the first avatar to a new position;
determining a first adjustment to first difference based on the movement; and
automatically moving, without user input, the second avatar, in the first virtual environment, by the first adjustment.

7. The method of claim 2, further comprising:
determining, for the first avatar, a first position in the first virtual environment;
determining, for the second avatar, a second position in the first virtual environment;
determining, based on the first position and the second position, a conversation join area for the conversation;
determining a center point of the conversation join area; and
automatically moving, without user input, the first avatar and the second avatar towards the center point after initiating the conversation between the first user and the second user.

8. The method of claim 2, further comprising:
after initiating the conversation between the first user and the second user, retrieving a predetermined spatial arrangement for a conversation join area for the conversation; and
automatically moving, without user input, the first avatar and the second avatar based on the predetermined spatial arrangement.

9. The method of claim 2, further comprising:
determining, for the first avatar, a first position in the first virtual environment;
determining, for the second avatar, a second position in the first virtual environment;
determining, based on the first position and the second position, a conversation join area for the conversation;
determining that the conversation join area overlaps with a second conversation join area; and
in response determining that the conversation join area overlaps with the second conversation join area, modifying the conversation join area.

10. The method of claim 2, wherein determining the one or more join areas based on the first navigational input or the second navigational input further comprises:
retrieving a first join area criterion for the first user;
retrieving an environment rule for the first virtual environment;
determining a grid map of the first virtual environment based on the environment rule, wherein the grid map defines a plurality of cells that comprise the first virtual environment and one or more cell properties for each cell of the plurality of cells; and
determining a subset of cells in the grid map that comprise a first join area based on the first navigational input, first join area criterion, and the one or more cell properties for each of the plurality of cells in the grid map.

11. A non-transitory, computer readable medium for triggering livestream communications between users based on motions of avatars within first virtual environment that correspond to the users comprising instructions that when executed on one or more processors cause operations comprising:
generating for simultaneous display a first virtual environment on a first user interface and a second user interface, wherein the first user interface corresponds to a first user, wherein the second user interface corresponds to a second user, and wherein the first user is located remotely from the second user;
generating for display a first avatar in the first virtual environment, wherein the first avatar corresponds to the first user;
generating for display a second avatar in the first virtual environment, wherein the second avatar corresponds to the second user;
receiving, for the first avatar, a first navigational input in the first virtual environment;
receiving, for the second avatar, a second navigational input in the first virtual environment;
determining one or more join areas based on the first navigational input or the second navigational input;
comparing the one or more join areas to one or more conversation initiation criteria to determine whether to initiate a conversation between the first user and the second user;
in response to determining to initiate the conversation between the first user and the second user, initiating the conversation between the first user and the second user, wherein the conversation comprises a livestream communication between the first user and the second user
determining, for the first avatar, a first position in the first virtual environment after initiating the conversation between the first user and the second user;
determining a movement, in the first virtual environment, of the first avatar to a new position;
determining a difference between the new position and the first position; and
automatically moving, without user input, the second avatar, in the first virtual environment, by the difference.

12. The non-transitory, computer readable medium of claim 11, wherein determining the one or more join areas based on the first navigational input or the second navigational input further comprises:

determining, for the first avatar, a first trajectory in the first virtual environment;

determining, for the second avatar, a second trajectory in the first virtual environment; and determining the one or more join areas based on the first trajectory or the second trajectory.

13. The non-transitory, computer readable medium of claim 11, wherein the instructions further cause operations comprising:

after initiating the conversation between the first user and the second user, determining, for the first avatar, a new navigational input or a new trajectory; and comparing the new navigational input or the new trajectory to one or more conversation maintenance criteria to determine whether to maintain the conversation between the first user and the second user.

14. The non-transitory, computer readable medium of claim 11, wherein the instructions further cause operations comprising:

after initiating the conversation between the first user and the second user, determining, for the first avatar, a new trajectory; and comparing the new trajectory to one or more conversation maintenance criteria to determine whether to maintain the conversation between the first user and the second user.

15. The non-transitory, computer readable medium of claim 11, wherein the instructions further cause operations comprising:

determining, for the first avatar, a first position in the first virtual environment after initiating the conversation between the first user and the second user;

determining, for the second avatar, a second position in the first virtual environment after initiating the conversation between the first user and the second user;

determining a first difference, wherein the first difference comprises a distance between the first position and a conversation position in the first virtual environment;

determining a second difference, wherein the second difference comprises a distance between the second position and the conversation position in the first virtual environment;

determining a movement, in the first virtual environment, of the first avatar to a new position;

determining a first adjustment to first difference based on the movement; and automatically moving, without user input, the second avatar, in the first virtual environment, by the first adjustment.

16. The non-transitory, computer readable medium of claim 11, wherein the instructions further cause operations comprising:

determining, for the first avatar, a first position in the first virtual environment;

determining, for the second avatar, a second position in the first virtual environment;

determining, based on the first position and the second position, a conversation join area for the conversation;

determining a center point of the conversation join area; and automatically moving, without user input, the first avatar and the second avatar towards the center point after initiating the conversation between the first user and the second user.

17. The non-transitory, computer readable medium of claim 11, wherein the instructions further cause operations comprising:

after initiating the conversation between the first user and the second user, retrieving a predetermined spatial arrangement for a conversation join area for the conversation; and automatically moving, without user input, the first avatar and the second avatar based on the predetermined spatial arrangement.

18. The non-transitory, computer readable medium of claim 11, wherein the instructions further cause operations comprising:

determining, for the first avatar, a first position in the first virtual environment;

determining, for the second avatar, a second position in the first virtual environment;

determining, based on the first position and the second position, a conversation join area for the conversation;

determining that the conversation join area overlaps with a second conversation join area; and in response determining that the conversation join area overlaps with the second conversation join area, modifying the conversation join area.

* * * * *